US007587685B2

(12) United States Patent
Wallace

(10) Patent No.: US 7,587,685 B2
(45) Date of Patent: Sep. 8, 2009

(54) DATA EXPLORATION SYSTEM

(76) Inventor: James H. Wallace, 18 Orchard Hill, Harvard, MA (US) 01451

( * ) Notice: Subject to any disclaimer, the term of this patent is extended or adjusted under 35 U.S.C. 154(b) by 771 days.

(21) Appl. No.: 11/059,432

(22) Filed: Feb. 16, 2005

(65) Prior Publication Data

US 2005/0179684 A1    Aug. 18, 2005

Related U.S. Application Data

(60) Provisional application No. 60/545,150, filed on Feb. 17, 2004.

(51) Int. Cl.
*G06F 3/00*     (2006.01)
*G06F 9/00*     (2006.01)
*G06F 17/00*    (2006.01)
(52) U.S. Cl. .................. 715/854; 715/853; 715/851
(58) Field of Classification Search ............... 715/853, 715/854, 851
See application file for complete search history.

(56) References Cited

U.S. PATENT DOCUMENTS 5,999,192 A    12/1999  Selfridge et al. ............ 345/440
6,307,573 B1 *  10/2001  Barros ........................ 715/764
6,496,832 B2   12/2002  Chi et al. .................... 707/102
6,601,058 B2    7/2003  Forster et al. .................. 707/3
6,650,326 B1   11/2003  Huber et al. ................ 345/428
6,845,376 B1    1/2005  Johnson .................... 707/100

OTHER PUBLICATIONS

USGS Geographic Information Systems' pp. 1-33, http://mac.usgs.gov/isb/pubs/gis_poster/, Undated.

* cited by examiner

*Primary Examiner*—Kieu Vu
*Assistant Examiner*—Sabrina Greene
(74) *Attorney, Agent, or Firm*—Weingarten, Schurgin, Gagnebin & Lebovici LLP

(57) ABSTRACT

An improved data exploration system and method that can be used to analyze and to explore complex data sets involving multiple data dimensions and multi-variable data presentations. The data exploration system generates visual representations of complex data sets in map, table, and tree view formats. In each of these view formats, both the appearance and the arrangement of the symbols representing the data sets are based on the data itself to facilitate the comprehension of patterns and information relationships within the data sets. Further, the data can be viewed at different levels of density to perform detailed analysis of the data, and to detect the presence of overall trends within the data. Moreover, the data exploration system performs a suite of calculation operations to cast the data in different forms, and to facilitate the acquisition, integration, and analysis of the data.

20 Claims, 48 Drawing Sheets

Table Cities

| City | Region | Gateway | Traffic | RegionCityIndex |
|---|---|---|---|---|
| ATL | SouthEast | false | 2143 | 1 |
| BOI | Mountain | false | 110 | 1 |
| BOS | NorthEast | false | 1487 | 1 |
| CHI | Central | true | 2801 | 1 |
| CHR | SouthEast | false | 761 | 2 |
| DAL | Mountain | false | 943 | 2 |
| DC | NorthEast | true | 1776 | 2 |
| DEN | Mountain | false | 1791 | 3 |
| HOU | Mountain | false | 1104 | 4 |
| LA | SouthWest | true | 2791 | 1 |
| MIA | SouthEast | true | 2641 | 3 |
| MIN | Central | false | 438 | 2 |
| NO | SouthEast | false | 973 | 4 |
| NY | NorthEast | true | 3134 | 3 |
| PHI | NorthEast | false | 1891 | 4 |
| POR | NorthWest | false | 542 | 1 |
| SAC | NorthWest | false | 236 | 2 |
| SDG | SouthWest | false | 1204 | 2 |
| SEA | NorthWest | false | 791 | 3 |
| SF | NorthWest | true | 1702 | 4 |
| SJO | NorthWest | false | 981 | 5 |
| SLC | Mountain | false | 341 | 5 |
| STL | Central | false | 643 | 3 |
| TUL | Mountain | false | 478 | 6 |

Layers    Start edit    Attach    Remove

FIG. 5

Table CityTree

```
CityTree
 ATL
 |_ATL   MIA  01
 BOI
 |_BOI   DEN  01
 BOS
 |_BOS   NY   01
 CHI
 |_CHI   NY   01
 |_CHI   MIA  01
 |_CHI   LA   01
 |_CHI   DEN  02
 |_CHI   SF   01
 |_CHI   MIN  01
 |_CHI   STL  01
 CHR
 |_CHR   MIA  01
 DAL
 |_DAL   DEN  01
 DC
 DEN
 HOU
 LA
 MIA
 MIN
 NO
 NY
 PHI
 POR
 SAC
 SDG
 SEA
 SF
 SJO
 SLC
 STL
 TUL
```

Layers    Start edit
Attach    Remove

FIG. 4

Table Cities

| City | Region | Gateway | Traffic | RegionCityIndex |
|---|---|---|---|---|
| CHI | Central | true | 2801 | 1 |
| LA | SouthWest | true | 2791 | 1 |
| ATL | SouthEast | false | 2143 | 1 |
| BOS | NorthEast | false | 1487 | 1 |
| POR | NorthWest | false | 542 | 1 |
| BOI | Mountain | false | 110 | 1 |
| DC | NorthEast | false | 1776 | 2 |
| SDG | SouthWest | false | 1204 | 2 |
| DAL | Mountain | false | 943 | 2 |
| CHR | SouthEast | false | 761 | 2 |
| MIN | Central | false | 438 | 2 |
| SAC | NorthWest | false | 236 | 2 |
| NY | NorthEast | true | 3134 | 3 |
| MIA | SouthEast | true | 2641 | 3 |
| DEN | Mountain | true | 1791 | 3 |
| SEA | NorthWest | false | 791 | 3 |
| STL | Central | false | 643 | 3 |
| PHI | NorthEast | false | 1891 | 4 |
| SF | NorthWest | true | 1702 | 4 |
| HOU | Mountain | false | 1104 | 4 |
| NO | SouthWest | false | 973 | 4 |
| SJO | NorthWest | false | 981 | 5 |
| SLC | Mountain | false | 341 | 5 |
| TUL | Mountain | false | 478 | 6 |

Layers | Start Edit | Attach | Remove

*FIG. 36*

Table Cities

| City | Region | Gateway | Traffic | RegionCityIndex |
|---|---|---|---|---|
| NY | NorthEast | true | 3134 | 3 |
| CHI | Central | true | 2801 | 1 |
| LA | SouthWest | true | 2791 | 1 |
| MIA | SouthEast | true | 2641 | 3 |
| ATL | SouthEast | false | 2143 | 1 |
| PHI | NorthEast | false | 1891 | 4 |
| DEN | Mountain | true | 1791 | 3 |
| DC | NorthEast | false | 1776 | 2 |
| SF | NorthWest | true | 1702 | 4 |
| BOS | NorthEast | false | 1487 | 1 |
| SDG | SouthWest | false | 1204 | 2 |
| HOU | Mountain | false | 1104 | 4 |
| SJO | NorthWest | false | 981 | 5 |
| NO | SouthWest | false | 973 | 4 |
| DAL | Mountain | false | 943 | 2 |
| SEA | NorthWest | false | 791 | 3 |
| CHR | SouthEast | false | 761 | 2 |
| STL | Central | false | 643 | 3 |
| POR | NorthWest | false | 542 | 1 |
| TUL | Mountain | false | 478 | 6 |
| MIN | Central | false | 438 | 2 |
| SLC | Mountain | false | 341 | 5 |
| SAC | NorthWest | false | 236 | 2 |
| BOI | Mountain | false | 110 | 1 |

Layers | Start Edit | Attach | Remove

*FIG. 37*

Table Cities

| City | Region | Gateway | Traffic | RegionCityIndex |
|---|---|---|---|---|
| NY | NorthEast | true | 3134 | 3 |
| CHI | Central | true | 2801 | 1 |
| LA | SouthWest | true | 2791 | 1 |
| MIA | SouthEast | true | 2641 | 3 |
| ATL | SouthEast | false | 2143 | 1 |
| PHI | NorthEast | false | 1891 | 4 |
| DEN | Mountain | true | 1791 | 3 |
| DC | NorthEast | false | 1776 | 2 |
| SF | NorthWest | true | 1702 | 4 |
| BOS | NorthEast | false | 1487 | 1 |
| SDG | SouthWest | false | 1204 | 2 |
| HOU | Mountain | false | 1104 | 4 |
| SJO | NorthWest | false | 981 | 5 |
| NO | SouthEast | false | 973 | 4 |
| DAL | Mountain | false | 943 | 2 |
| SEA | NorthWest | false | 791 | 3 |
| CHR | SouthEast | false | 761 | 2 |
| STL | Central | false | 643 | 3 |
| POR | NorthWest | false | 542 | 1 |
| TUL | Mountain | false | 478 | 6 |
| MIN | Central | false | 438 | 2 |
| SLC | Mountain | false | 341 | 5 |
| SAC | NorthWest | false | 236 | 2 |
| BOI | Mountain | false | 110 | 1 |

Layers    Start Edit    Attach    Remove

*FIG. 38*

DATA EXPLORATION SYSTEM

CROSS REFERENCE TO RELATED APPLICATIONS

This application claims priority of U.S. Provisional Patent Application No. 60/545,150 filed Feb. 17, 2004 entitled DATA EXPLORATION SYSTEM.

STATEMENT REGARDING FEDERALLY SPONSORED RESEARCH OR DEVELOPMENT

N/A

BACKGROUND OF THE INVENTION

The present application relates generally to systems and methods of analyzing and exploring data, and more specifically to an improved system and method of analyzing, exploring, and comprehending information relationships in data.

In recent years, computer systems have enabled individuals and organizations to capture and store vast quantities of data. The existence of such large quantities of data has lead to an ever increasing need for improved systems and methods of analyzing and exploring data. For example, spreadsheets have traditionally been employed as a tool for interacting with and analyzing data. Spreadsheets typically organize data in rows and columns. When implemented as a computer program running on a computer system, spreadsheets are typically operative to manipulate the rows and columns of data, to apply algebraic operations to the data, and to explore various "what if" scenarios based on the data analysis requirements of a user. Further, spreadsheet computer programs typically allow the user to generate graphical representations of the data for subsequent display on a video monitor.

Traditional spreadsheets and spreadsheet computer programs have drawbacks, however, in that they are limited in the complexity of the data that can be manipulated. For example, spreadsheet computer programs typically operate on data stored in flat files, and are generally unable to handle complex data sets involving multiple data dimensions and/or multi-variable data presentations. The graphical data representations that can be generated by traditional spreadsheet computer programs also suffer significant limitations.

More recently, a number of computerized visualization techniques have been developed for analyzing and displaying data acquired by computer systems. For example, geographic information system (GIS) technology can be employed on a computer system to capture, store, analyze, and display visual representations of geographically referenced data, i.e., data that is identified according to its geographic location. In a typical geographic information system, data can be captured and plotted on a map to relate various groups of data (e.g., the levels of rainfall occurring at fixed geographic locations, and the locations of marshes) in a spatial context, thereby allowing a user to draw conclusions about the data (e.g., which marshes are likely to dry up) and to extract new information from the data relationships (e.g., information relating to how humans might best interact with the various marsh locations to protect fragile ecosystems). A typical GIS can organize different groups of data in respective map layers or overlays. Geographic information systems are also typically capable of rendering symbols used on maps (e.g., the symbols used to represent the data corresponding to the rainfall levels and the marshes) based on information relating to the data group that the symbols represent. For example, a GIS can vary the size, the shape, and/or the color/shade of particular symbols based on the rainfall levels in particular locations and/or the likelihood of the marshes in those locations to dry up.

Geographic information systems also have drawbacks, however, in that they are typically unsuited for use as a general data analysis tool. For example, as explained above, a conventional GIS is designed to handle data identified according to its fixed geographic location. For this reason, data that does not have corresponding geographic references normally cannot be analyzed by a GIS. Even if representative location references were derived for a set of data before providing the data to a GIS for analysis, the mapping of the data by the GIS would likely be constrained by the fixed nature of the data locations, thereby limiting the number of possible visual data representations that can be presented to a user, and in turn, limiting the user's ability to comprehend new information from the data relationships.

It would therefore be desirable to have an improved system and method of analyzing, exploring, and comprehending information relationships within various groups of data. Such an improved data exploration system would provide multiple visual data representations that are adaptable to the needs of a system user, while avoiding the drawbacks of conventional data analysis systems and techniques.

BRIEF SUMMARY OF THE INVENTION

In accordance with the present invention, an improved data exploration system and method are provided that can be used to analyze and to explore complex data sets involving multiple data dimensions and multi-variable data presentations. The presently disclosed data exploration system and method enable a system user to generate multiple visual representations of the complex data sets, in which symbols are rendered and/or plotted based on the data underlying the various symbols, thereby facilitating the user's analysis and comprehension of information relationships within the data sets.

In one embodiment, the data exploration system is operative to generate visual representations of complex data sets in map, table, and tree view formats. In each of these view formats, both the appearance and the arrangement of the symbols representing the data sets are based on the data itself, thereby facilitating the comprehension of patterns and information relationships within the data sets. Further, the data can be viewed at different levels of density for performing detailed analysis of the data, and for detecting the presence of overall trends within the data. Moreover, the data exploration system is operative to perform a suite of calculation operations to cast the data in different forms, and to facilitate the acquisition, integration, and analysis of the data.

In the presently disclosed embodiment, each one of the symbols employed in the map, table, and tree visual data representations has underlying data directly associated therewith. Moreover, the underlying data associated with each symbol corresponds to a named group of data units having the same data structure. For example, the data exploration system can access each named group of data from a respective spreadsheet. Further, in a map representation of the data, a first data group can be represented by a point symbol, and a second data group can be represented by a connection line symbol disposed between two or more points. The first data group and the second data group typically represent the rows of data in the respective spreadsheets, while the columns of data within the respective spreadsheets include additional information about the particular data groups. It is this additional information relating to the data groups included within the spreadsheet data columns that can be viewed and explored at different density levels while performing detailed data analysis.

The data exploration system and method organizes each group of data units having the same data structure in a respective layer. Moreover, the data exploration system acquires and manipulates the data units within each layer together as a group. For example, the data groups included within the spreadsheets described above can be made to correspond to respective layers, i.e., one layer for the first data group and another layer for the second data group. Further, when displayed in a display window on a video monitor, one data layer is conceptually stacked on top of the other data layer to generate the map representation of the data. As a result, the point and connection line symbols representing the first and second data groups, respectively, appear to be superimposed. In the presently disclosed embodiment, each layer includes either point symbols or connection line symbols, but not both.

The symbols employed in the map, table, and tree visual data representations can be rendered based on the data underlying the various symbols. Specifically, rendering attributes such as the color/shade, shape, size, or font corresponding to each symbol can be determined based on at least a portion of the symbol's underlying data. For example, in the event the data exploration system accesses each named data group from a respective spreadsheet, a plurality of data binning levels can be defined for the respective layer data columns within the spreadsheet. Each binning level for a respective layer data column associates a level number with a data range or match criteria to determine whether a particular data value within that data column is in the corresponding bin. For each data layer in the map, table, or tree view, the binning levels for a respective data column can be associated with the appearance of a particular rendering attribute, e.g., the color/shade, shape, size, or font, for the data symbol within that layer.

The symbols employed in the map visual data representation can also be plotted based on the data underlying the various symbols. For example, the positions of point symbols relative to a first axis within the map representation can be plotted based on at least a portion of the underlying data associated with each point symbol, and index numbers corresponding to the connection line symbols may be plotted along a second axis orthogonal to the first axis, thereby facilitating the visual comparison and comprehension of selected characteristics of the underlying data.

By enabling a user to generate multiple visual data representations in which symbols are rendered and/or plotted based on the data underlying the various symbols, the presently disclosed data exploration system significantly enhances the user's ability to analyze, explore, and comprehend information relationships within large quantities of data.

Other features, functions, and aspects of the invention will be evident from the Detailed Description of the Invention that follows.

BRIEF DESCRIPTION OF THE SEVERAL VIEWS OF THE DRAWINGS

The invention will be more fully understood with reference to the following Detailed Description of the Invention in conjunction with the drawings of which:

FIGS. 3-45*b* are display windows of an illustrative session in which the data exploration system of FIG. 1 is employed.

DETAILED DESCRIPTION OF THE INVENTION

U.S. Provisional Patent Application No. 60/545,150 filed Feb. 17, 2004 entitled DATA EXPLORATION SYSTEM is incorporated herein by reference.

An improved data exploration system and method are disclosed that can be used to analyze and to explore complex data sets. In a preferred embodiment, the data exploration system and method are implemented on a computer system configurable to capture, to store, to analyze, to explore, and to display multiple visual representations of the complex data sets, in which symbols are rendered and/or plotted based on the data underlying the various symbols. In the preferred embodiment, the data exploration system includes a data storage system, at least one processor, and at least one output device such as a printer or a video monitor or display. The data storage system includes at least one memory configured with a data structure to maintain and to store complex data sets in multiple dimensions and involving multi-variable data presentations. The processor is operative to execute at least one software program out of the memory for organizing the data sets in a plurality of layers, and for arranging attributes of the data sets into visual data representations in map, table, and tree view formats. In an alternative embodiment, the software program executed by the processor is encoded on a computer readable medium such as a CD-ROM, a hard disk, or a floppy disk. The output device is configured to display the visual data representations in the map, table, and tree view formats for subsequent analysis by a system user. The presently disclosed data exploration system and method significantly enhance the ability of the system user to comprehend relationships in large quantities of data, to draw conclusions about the data, and to extract new information from the data relationships.

In the preferred embodiment, the software program directing the functionality of the data exploration system is implemented using the Java programming language, or any other suitable programming language. Such software programs are generally designed to run on computer systems that include one or more input devices, one or more processing systems, one or more memory systems, and one or more output devices. For example, such a computer system can include one or more computers such as a client computer and a server computer, at least one central processing unit (CPU) with a memory system, and a user interface including at least one input device such as a keyboard, a mouse, or any other suitable input device, and at least one output device such as a printer, a video monitor or display, or any other suitable output device.

Figure 1:
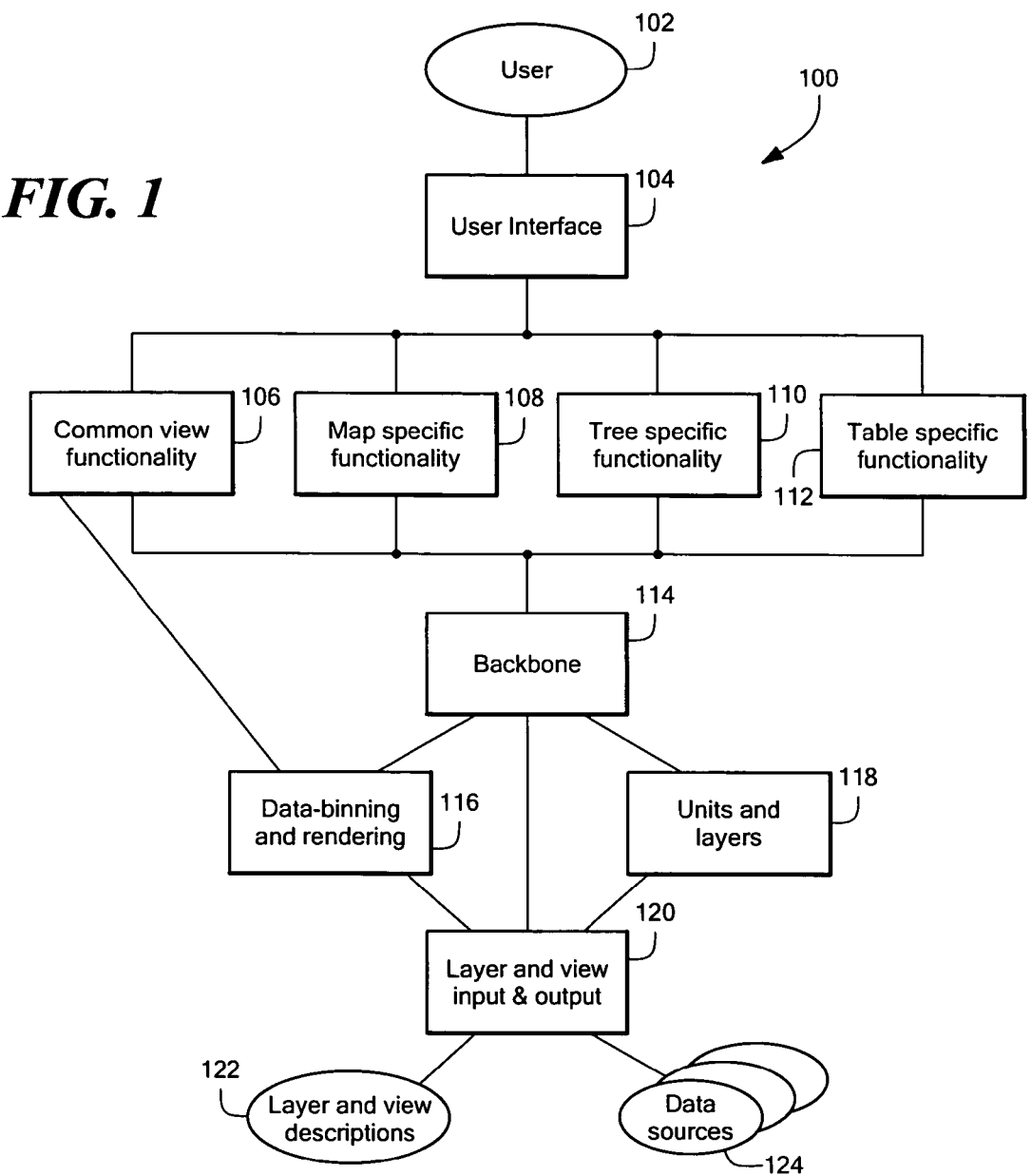
FIG. 1 is a block diagram of a data exploration system according to the present invention.

FIG. 1 depicts an illustrative embodiment of a data exploration system 100, in accordance with the present invention. In the illustrated embodiment, a user 102 such as a human operator interacts with the data exploration system through a user interface 104. Specifically, the user interface 104 allows the user 102 to control the operation of the system 100 via one or more input devices, to examine results via one or more output devices, and to control system and default parameters. It is understood that the user 102 may alternatively comprise a separate computer system configured and arranged to interact with the user interface 104.

It should be noted that during system initialization, the data exploration system 100 reads a configuration file that defines properties controlling various aspects of the system's behavior and corresponding property default values or settings. In the preferred embodiment, the properties defined in the configuration file include custom add-on properties, e.g., custom Java classes, to support the exploration of specific data applications.

In the presently disclosed embodiment, the user 102 employs the functionality of the data exploration system to analyze and to explore complex data sets obtained from one or more data sources 124, which can comprise one or more databases. Specifically, the data exploration system 100 is configured to provide functionality 108, 110, and 112 specifically related to the map, table, and tree view formats for the data sets to be explored, and functionality 106 common to the map, table, and tree views of the data. The data exploration system 100 is also configured to provide backbone functions 114, data binning and rendering functions 116, functions related to data units and layers 118, layer and view input and output functions 120, and functions related to layer and view descriptions 122. As shown in FIG. 1, the user interface 104 interacts directly with the system functionality depicted in blocks 106, 108, 110, and 112, which in turn interact with the backbone 114 of the system. Further, the backbone 114 interacts with the functionality related to the data binning and rendering 116, the data units and layers 118, and the layers and view input and output 120. It is noted that the common view functionality 106 also interacts with the data binning and rendering functions 116. Moreover, the layer and view input and output functions 120 are operative to access the layer and view descriptions 122 and the data sources 124.

Specifically, the common view functionality 106 comprises all of the functionality of the data exploration system 100 that is the same for the map, table, and tree formats for viewing the data. The common view functionality 106 directs the operation of control buttons used on display windows in all views (e.g., layers, edit, attach/detach, and remove control buttons), allows layers to be maintained on the respective views, allows data units displayed on the views to be edited, allows the views to be displayed as a tab panel on a master display window (attach) or in a standalone display window (detach), allows data units selected on one view to have these selections propagated to other views displaying the same data unit, and allows the data values themselves to be displayed on a popup display window adjacent to its visual representation in the respective view.

The map specific functionality 108 pertains to views of the data in the map format. In the presently disclosed embodiment, the map specific functionality 108 allows data units to be displayed on the maps as point symbols and connection line symbols, allows the symbols for points and connections to be displayed or hidden depending on the layer hierarchy and the layer collapse/expand functionality, handles map background images, allows data unit labels to be displayed or hidden, allows map positions and scale to be controlled (e.g., by zoom, transform, and plotting operations), and allows data units and their positions to be changed via editing operations driven by mouse commands.

The tree specific functionality 110 pertains to views of the data in the tree format. Specifically, the tree specific functionality 110 allows data units to be rendered as nodes in a tree (including having multiple occurrences, if warranted, by the tree hierarchy), and allows the tree hierarchical structure to be predetermined by data unit parent/child relationships between data units in the layer hierarchy and the relationship between the connection symbols and their endpoint point symbols.

The table specific functionality 112 pertains to views of the data in the table format. Specifically, the table specific functionality 112 allows data units to be rendered as rows in a table showing field values as cells in the table columns, allows the table to be sorted by values in the table columns, and allows field values to be modified by editing the table.

The backbone functionality 114 handles the data units, the data layers that group the data units and associate them with the data fields, the views that visually present the data units to the user 102, and the symbolic representations of the data units in the various views.

The data binning and rendering functionality 116 allows data field columns to be defined for the various data layers, allows data field values to be maintained for each data unit in the respective layer, allows binning levels to be defined for field columns controlling how a data unit's field value for that column should be treated when the unit is rendered, and allows rendering attributes to be defined and tied to the binning levels.

The data unit functionality 118 allows the data units to maintain positioning information so they can be placed on maps, and to reference other data units to support connections and parent/child relationships. The data unit functionality 118 also allows the data units to be maintained in layers on the various views. The data layer functionality 118 allows the data layers to maintain groups of data units by tying them to their data fields. The data layer functionality 118 also allows the layers to be maintained in views in a hierarchy so that each view can act on its data units as a group and can control hierarchical parent/child relationships between the data units in different layers within the hierarchy.

The layer and view input and output functionality 120 allows layer definitions and data to be read from the data sources 124. In the preferred embodiment, the layer and view input/output functionality 120 includes secure access and reading from the databases and spreadsheets. In addition, the layer and view input/output functionality 120 allows layer definitions and data to be saved to spreadsheets, and allows view definitions to be read from and saved to the spreadsheets.

Figure 2:
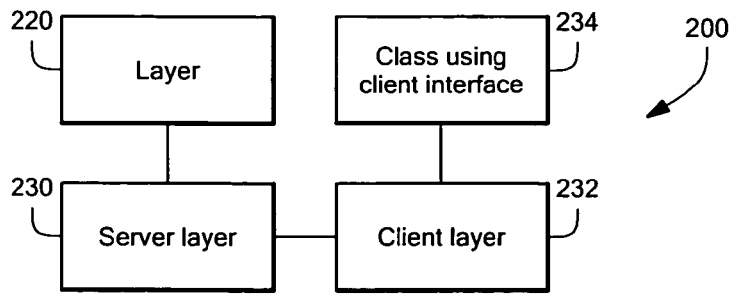
FIG. 2 is a block diagram of a client/server interface to the data exploration system of FIG. 1.

As described above, the presently disclosed data exploration system 100 can comprise a computer system including one or more computers such as a client computer and a server computer. FIG. 2 depicts a client/server interface 200 to the layer and view input and output 120 of the data exploration system 100 (see FIG. 1). It is noted that the data exploration system 100 is configured to incorporate customized add-on Java classes written with specific knowledge of the data to be explored, thereby allowing the system to perform special manipulations using that data. In the illustrated embodiment, the layer and view input and output 120 is configured to act as a data server to client classes 234 using the client/server interface 200. Specifically, layers in the layer and view input and output 120 (see FIG. 1) are configured to act as servers to the clients attaching to them via layers 220 of the client/server interface 200 (see FIG. 2).

As shown in FIG. 2, the client/server interface 200 has a client/server class architecture providing two interfaces, namely, a first interface 230 for the server (layer) side, and a second interface 232 for the client (layer) side. The client/server interface 200 allows clients to access the server layer directly, to listen for layer events, to add and to remove data units from the layer, to maintain a set of data units including all units that span all layers attached to the client and have them be kept up-to-date by the server (much like a view maintaining a set of data units), and to have changes in the data units made by the client to be picked up by the backbone of the data exploration system 100. It should be appreciated, however, that the data exploration system 100 can operate without the client/server interface 200 by inputting and outputting layers of data from/to the data sources 124.

Figure 3:
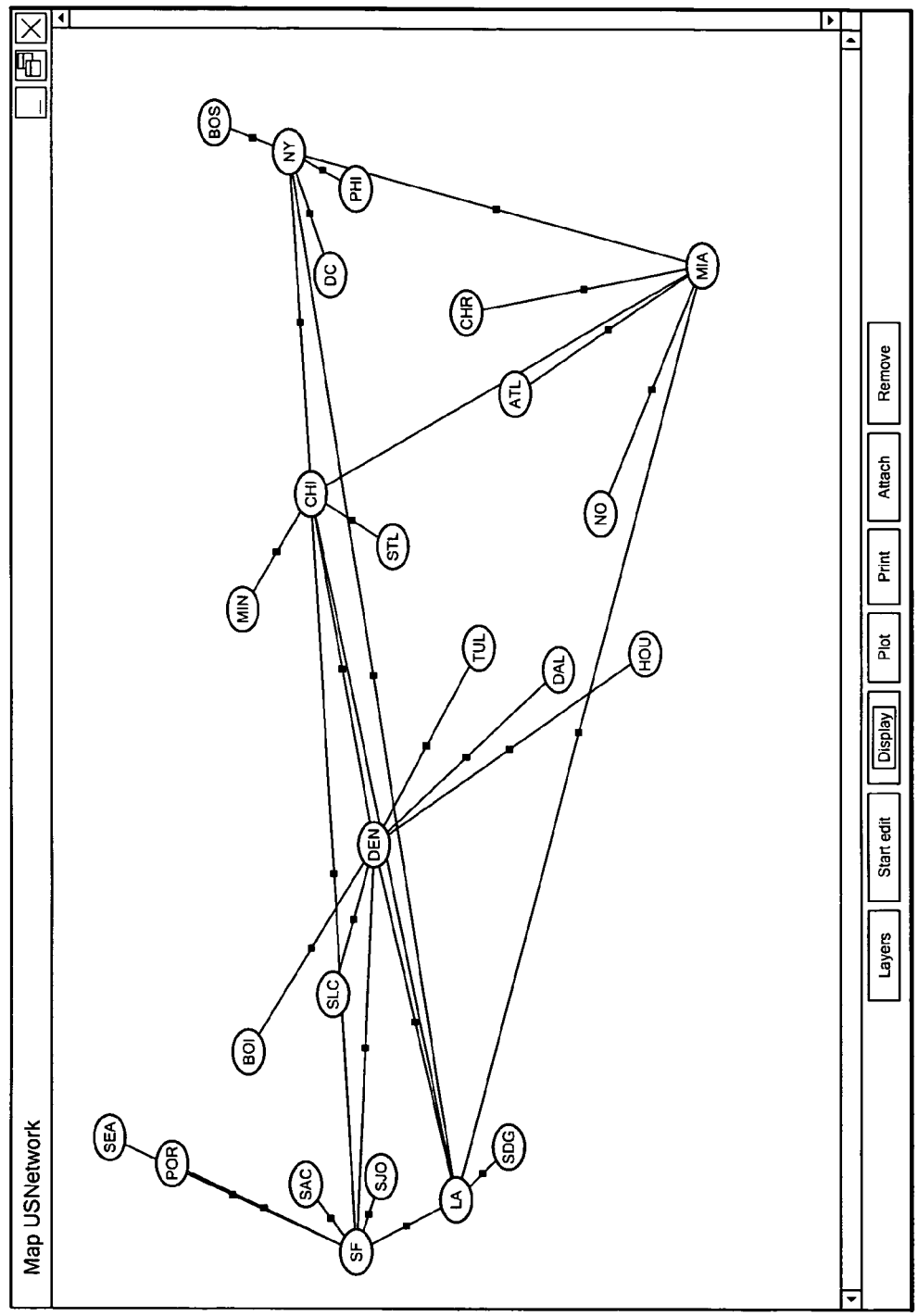

The operation of the presently disclosed data exploration system 100 (see FIG. 1) will be better understood with reference to the following illustrative example and FIGS. 3-45*b*, which depict various display windows generated by the system. In this example, the data exploration system 100 employs data derived from a hypothetical national data communications network (the "USNetwork") to illustrate the functionality of the system. FIG. 3 depicts a map view of the USNetwork, showing representations of 24 cities and communications trunks that connect them.

It is noted that the term "data unit" (or unit) is used herein for data entities represented by the data exploration system 100. There are two kinds of units, namely, point units (or points) and connection units (or connections). On map views, point units are represented as symbols at distinct positions. On the map of the USNetwork (see FIG. 3), the cities are represented by point units shown as ovals. Connection units connect two point units. On map views, connection units are shown as lines joining the point units they connect. On the USNetwork map, the trunks are represented by connection units shown as lines connecting the cities. Each unit has a unique name, called the "unit name".

FIG. 4 depicts a tree view of the USNetwork city and trunk units. Units on a tree view are represented as nodes. Tree views can be arranged to show the hierarchical relationship of the data units they contain. The tree view of FIG. 4 is arranged to show the trunks that are connected to each city.

It should be understood that data units in a layer can have information associated with them. The term "data field" (or field) refers to a single piece of information associated with a unit. FIG. 5 depicts a table view of the cities in the USNetwork. As shown in FIG. 5, the data fields for the cities are represented as columns in the table (e.g., Region, Gateway, Traffic, RegionCityIndex). It should also be understood that individual data units can reside in more than one layer. When in multiple layers, each layer can associate different information with the unit.

In the preferred embodiment, the data exploration system 100 supports several types of data fields. The data field types supported by the system include the following:

Unit—the name of the unit itself.

String—text.

Integer—whole numbers.

Double—numbers with decimal points.

Boolean—true/false.

Date—a calendar designation including year, month, day.

Time—a time specification including hour, minute, second.

DateTime—a calendar and time specification including year, month, day, hour, minute, second.

Parent—the name of a unit that is the parent of this unit when performing hierarchical operations on map and tree views.

Owner—the same as Parent, but in addition the name of the parent unit is used as the prefix of the name of this unit.

Relative—the same as Parent, but in addition the position of this unit on map views is relative to that of the parent unit.

OwnerRelative—a combination of Owner and Relative data types.

RelativeOwner—the same as OwnerRelative.

EndPoint—the name of one of the two endpoints of a connection unit.

EndOwner—the name of a unit used as the prefix of the name of a unit in the next EndPoint column.

EastPos—the East (horizontal) position coordinate of the unit on the display window.

NorthPos—the North (vertical) position coordinate of the unit on the display window.

The data exploration system 100 organizes data units in layers. A layer is a group of data units having the same data column structure, and that is acquired and manipulated together by the system. Each layer has a unique name, called the "layer name". An individual layer includes a single kind of unit, e.g., point layers include point units, and connection layers include connection units.

When presented on a map view, symbols for each layer appear as though they are drawn on a sheet of clear plastic, and the clear plastic sheets are conceptually stacked on top of each other to form the complete map. This stacking of the data units is the origin of the term "layer", which is also employed in CAD/CAM and geographical information systems (GIS) technologies. The USNetwork described in this illustrative example has two layers, designated as the Cities and Trunks layers.

A significant portion of the functionality of the data exploration system 100 is related to the system's handling of the data layers. Such data layer handling is controlled at the layer level, affecting all units in the layer and how they appear relative to other units on the views that show them. Specifically, it is on a per layer basis that— a. The unit data column structure (data type and column name) is defined.

b. Data is acquired by the system from an outside source (e.g., a database or a spreadsheet).

c. Data is added to individual views (maps, trees, tables).

d. The appearance (e.g., color/shade, size, symbol, font) of the data within individual views is controlled, for all units in a layer or based on the layer's data fields.

e. The hierarchical relationship between units in different layers is shown. Placing a view's layers in a hierarchical relationship relative to each other (the layer hierarchy) causes the units on the view to change, based on the Parent data type relationships between adjacent layers in the hierarchy.

f. Layer fields and units are calculated and generated by the system, based on other data in the same layer or in other layers, as controlled by, e.g., spreadsheet style formulae.

g. Data map scale and unit positioning are controlled by transform and plotting layer specifications.

h. Data modified by the system is saved.

An individual view (map, tree, or table) displays one or more layers of data. When a view includes multiple layers, several system features utilize the relationship between the layers to control how the units they contain appear on the view. The relationship between the layers in a view is called the "layer hierarchy", which allows the system to explore containment relationships present in the layer's data.

Figure 9:
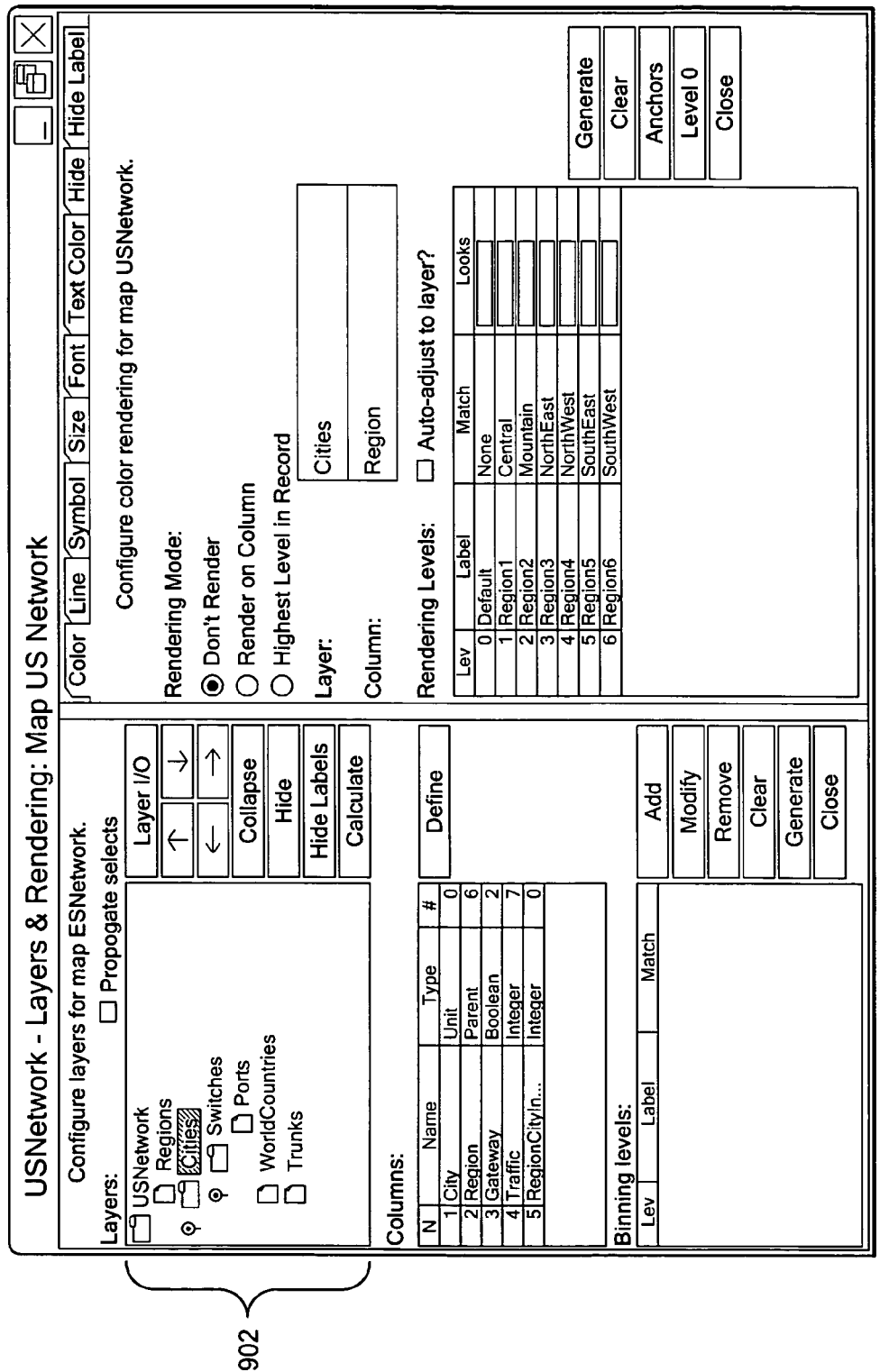

The layer hierarchy is controlled on a Layers & Rendering display window for the view via a layer tree, such as the layer tree 902 of FIG. 9. The layer tree has a node for each layer included in the view. The structure of the tree shows the relationship of the layers in the view. The layer tree's structure (and hence the layer hierarchy) is controlled by the four arrow buttons to the right of the layer tree (↑, ↓, ←, →; see FIG. 9).

An overview of the system features controlled by the layer hierarchy is described below. For example, a view's layers can be positioned both vertically and horizontally in the layer hierarchy. The vertical layer hierarchy position controls the precedence of units in the layers. The ↑ and ↓ arrow buttons are used to set the vertical position.

On map views, point and connection unit symbols are drawn in the order of the layers. This means that if symbols overlap, or if the same unit is in multiple layers, units in the upper layers will be drawn last, and will therefore appear to be "on top". It is noted that because all connections are drawn before all points, the layer precedence ordering affects points relative to other points and connections relative to other connections.

On tree and table views, a unit's representation (e.g., a tree node or a table row) is associated with a single layer. If a unit is in more than one layer in the view, then the layer that is used is the one that is higher in the layer hierarchy.

The horizontal layer hierarchy position controls the parent/child relationship of the layers. The ← and → arrow buttons are used to set horizontal position (see FIG. 9). By way of the parent data types, the data columns in a layer can express one or more parent units for a unit in that layer. The parent data types do this by containing references to units that reside in other layers. The map and tree views can use these parent/child relationships to control the presentation of the units, but it does not have to do this all the time. In fact, it may not even be possible in cases where a unit has multiple parents because typically one parent/child relationship can be expressed at a time. The layer hierarchy is used to control the presentation of parent/child relationships. For example, a parent/child relationship is used by a map or tree when the layer including the child unit is immediately subordinate to the layer including the parent unit in the layer hierarchy.

Map views display units as symbols in a two-dimensional map format. As shown in FIG. 3, point units are displayed as symbols at distinct positions, and connection units are displayed as lines connecting the point units. When multiple connection units connect the same point units, the connecting lines that represent them on maps are offset from each other so each connection unit is visible.

Figure 6:
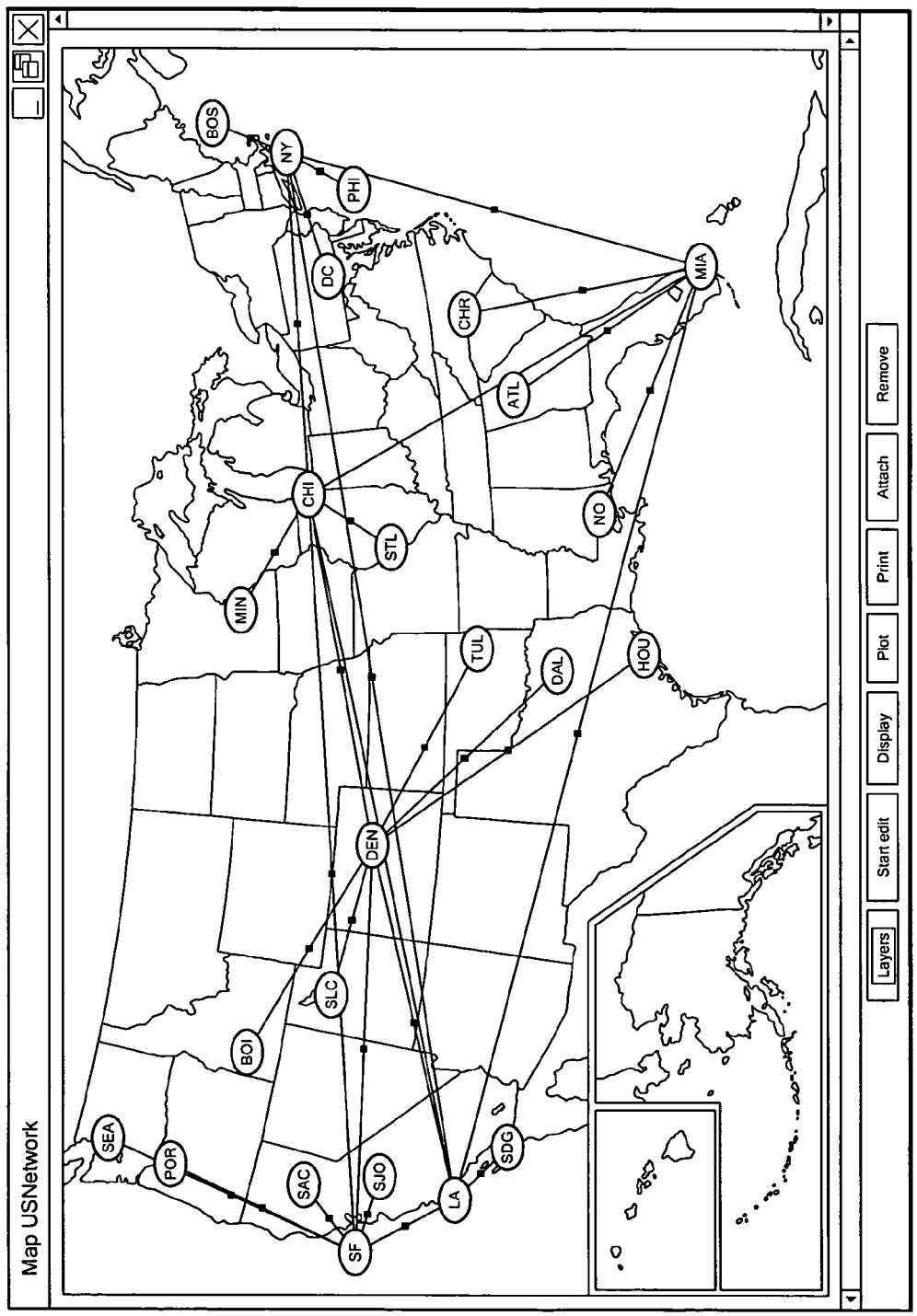

Map views can have either a plain background or a background image. When the background is plain, its color/shade can be chosen by the user. For example, FIG. 3 depicts a plain white background. Background images originate from image files, which can be provided to the system via normal Java functionality. The background image can be hidden or displayed. When displayed, the background image provides a backdrop behind the symbols representing the units displayed on the map. The image can be displayed in its original color, or in gray scale. For example, FIG. 6 depicts the same map as FIG. 3, except it has a background image.

It should be noted that the data exploration system 100 can flexibly position the unit symbols, while making no assumptions about what the symbols represent. The system utilizes coordinates that are not tied to any physical units or to the graphical display coordinate system used to display the maps. Coordinates in this system can be generated by several different techniques. Further, unit positions can be applied globally to units on all maps, or can be locally applied to units on a single map, allowing alternative positioning of the same data to coexist on different maps so they can be simultaneously compared.

The unit coordinate system origin (i.e., point 0.0, 0.0) is normally at the lower left-hand corner of the map. A position is represented by the coordinates EastPos and NorthPos, representing offsets to the East (right) and to the North (above) of the origin. EastPos and NorthPos are unit-less decimal numbers representing fractional portions of the map panel. In this example, EastPos=0.0 is the left side of the panel, eastPos=10.0 is the right side of the panel, NorthPos=0.0 is the bottom of the panel, and NorthPos=10.0 it the top of the panel.

The map panel size in each dimension is the larger of the corresponding dimensions of the display window on which the panel is displayed. This causes the map dimensions to be stretched to fill the display window on which it is displayed when that window's dimension is larger than the minimum map size. When the window's dimension is smaller than the minimum map size, only a portion of the map is visible, and a scrollbar is used to browse that dimension.

In this illustrative example, the minimum map panel size is set as follows. If the map has no background image, the minimum map panel size is 500 pixels in each dimension. If the map has a background image (either visible or hidden), then the minimum map panel size is the original size of the background image.

The map panel is spanned by the EastPos and NorthPos coordinates ranging from 0.0 to 10.0. It is noted, however, that the EastPos and NorthPos coordinates are not limited to that range. Symbols having coordinates outside of that range will simply not appear on the map.

It should be appreciated that this general coordinate scheme is typically not the same as the graphics pixel coordinate scheme used to display the map. This means that unit coordinates are converted to graphics coordinates during the process of displaying the map. Unit coordinates are converted to graphics coordinates to display unit symbols on the map. Graphics coordinates are the normal pixel coordinates Java uses for panels, i.e., X corresponds to pixels to the right of the panel's left border, and Y corresponds to pixels down from the top of the panel.

The conversion from unit to graphics coordinates can be expressed as $$X = \text{MapPanelWidth} * (\text{EastPos}/10.0) \tag{1}$$

$$Y = \text{MapPanelHeight} * ((1.0 - \text{NorthPos})/10.0). \tag{2}$$

The conversion from graphics to unit coordinates can be expressed as $$\text{EastPos} = X * (10.0/\text{MapPanelWidth}) \tag{3}$$

$$\text{NorthPos} = 1.0 - ((Y/\text{MapPanelHeight}) * 10.0). \tag{4}$$

Figure 7:
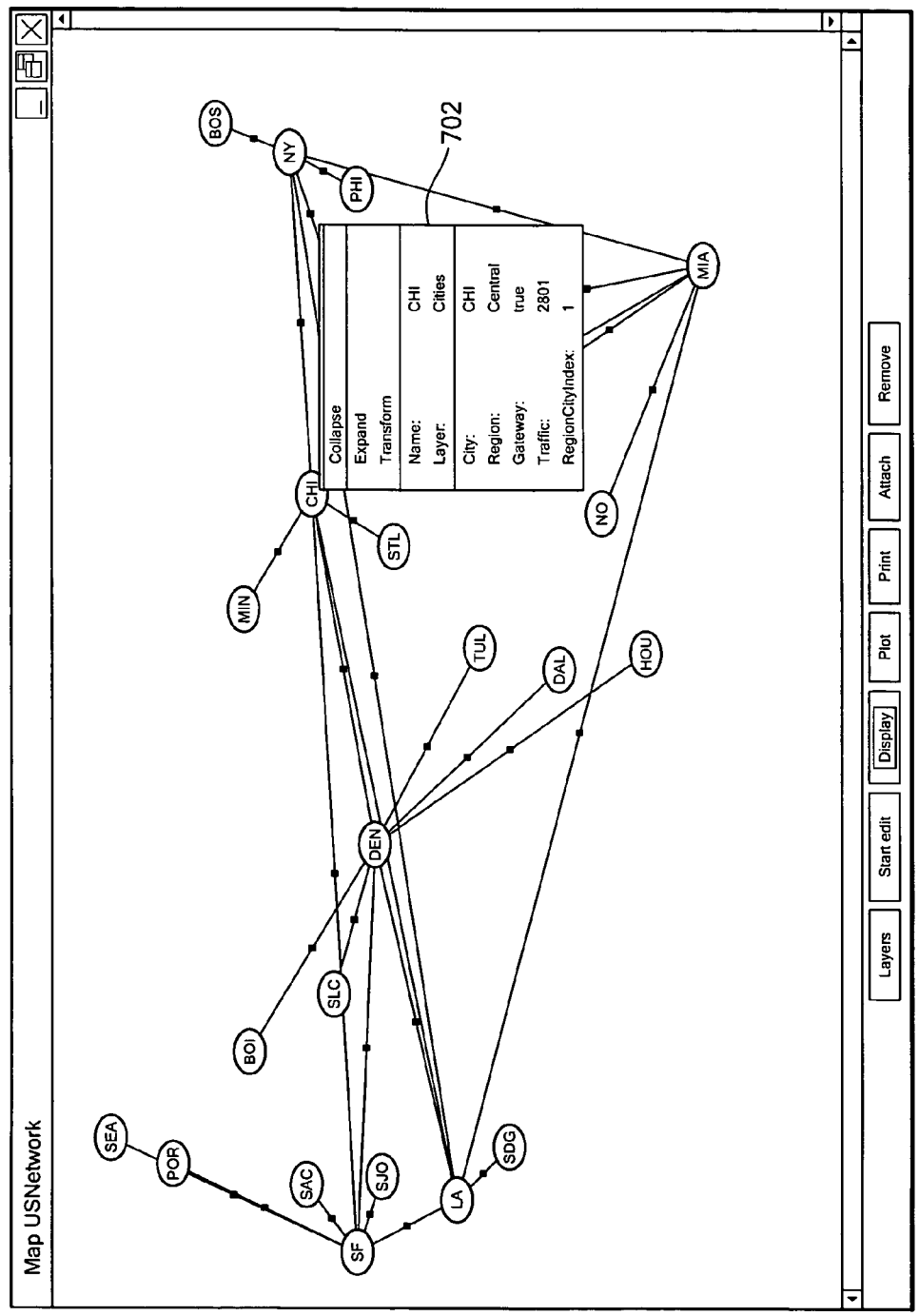

Right clicking the mouse on a unit's map symbol causes its associated data to be displayed on a popup menu window, such as the popup menu window 702 (see FIG. 7). For point units, the mouse is positioned over the unit symbol itself. For connection units, the mouse is positioned over the connection's control point, which is a small box located at the connection's midpoint. This popup window includes the unit's name, layer, and name/value pair for each data field. FIG. 7 depicts the USNetwork map with the popup data window 702 displaying the data associated with city "CHI". The popup menu window for point units on maps includes three menu buttons, namely, Collapse, Expand, and Transform. The purpose of these menu buttons is described below. It is noted that popup data windows are also available on tree views. Right clicking on a node displays the data associated with the unit the node represents.

Unit symbols on map views can be completely hidden, or have their labels hidden, on a layer-by-layer basis. This is controlled by the Hide/Show button and Hide Labels/Show Labels button located to the right of the layer tree 902 on the Layers & Rendering window (see FIG. 9). The Hide/Show button and Hide Labels/Show Labels button operate on the layer that is selected in the layer tree 902.

Figure 8:
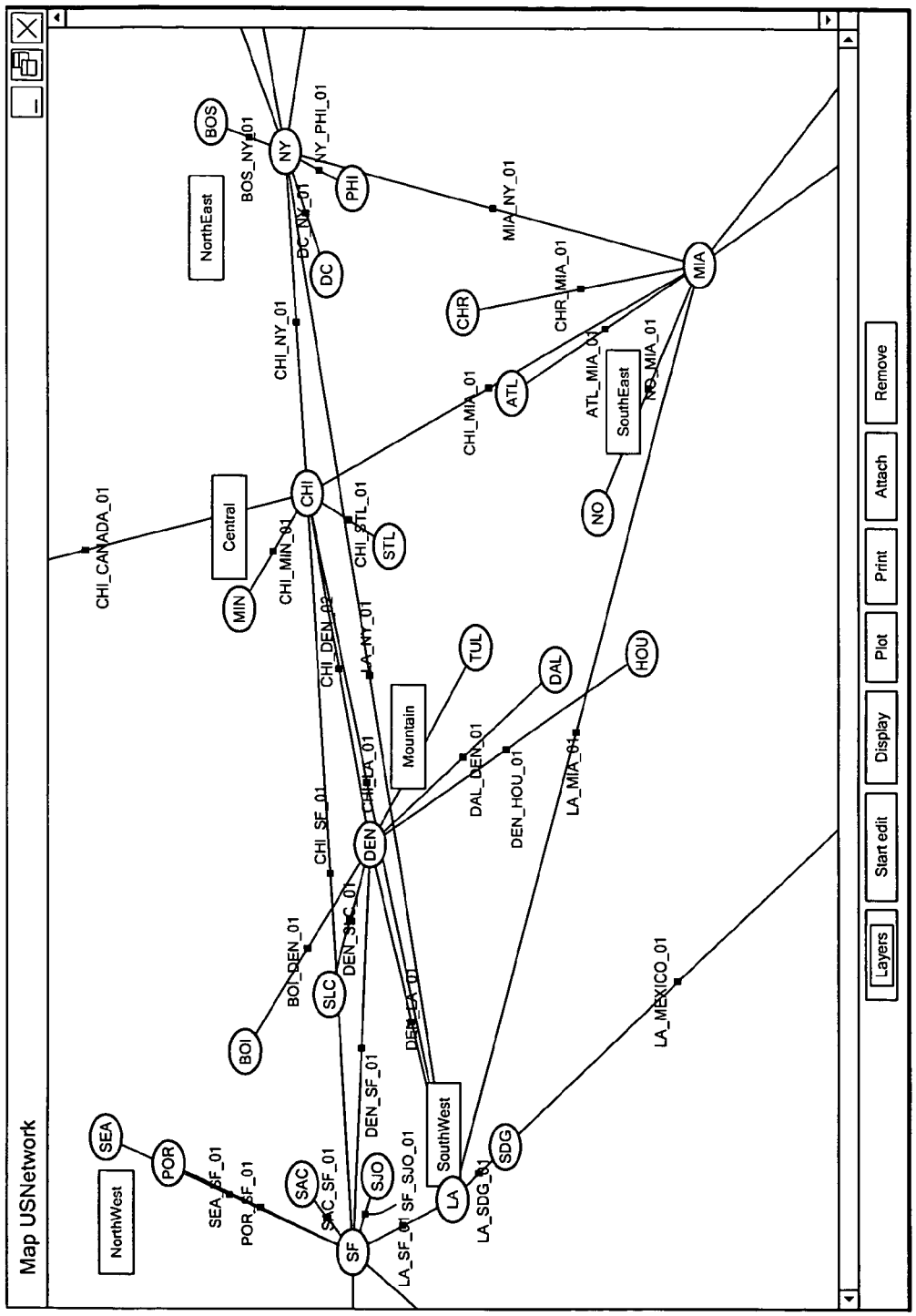

FIG. 8 is the USNetwork map whose appearance has been changed using the Hide/Show Layers and Hide/Show Labels. The Regions layer is a point layer including six units representing regions of the United States (NorthEast, SouthEast, Central, Mountain, NorthWest, and SouthWest). Up to now, this layer had been hidden. The six regions are indicated by rectangular symbols. The trunks layer includes the labels for the trunk connection units, which had previously been hidden. They are now shown (e.g., BOS_NY_01 between BOS and NY, MIA_NY_01 between MIA and NY, etc.) in FIG. 8.

On map views, point units can be collapsed under other point units when their associated data expresses a parent/child relationship. This is done by manipulating the map's layer hierarchy. This can be done when point units in one layer (childLayer) use one of the parent data types (Parent, Owner, Relative, OwnerRelative) to designate parent point units in another layer (parentLayer). The ← and → arrow buttons on the Layers & Rendering window (see FIG. 9) can be used to arrange the layer tree. The right arrow button is used to make the selected point layer (childLayer) subordinate to the layer immediately above it in the layer tree (the parentLayer). This causes all of the units in childLayer (the child units) to be collapsed under any units in the parent layer that are defined as parent units in the child layer's data (the parent units). The collapsed child units are hidden. In addition, connections to the child units are adjusted. All connections between a child unit and a unit not having the same parent unit are now connected to the parent unit. Further, all connections between child units having the same parent unit are hidden. The ← arrow is used to promote the selected child layer, making it no longer subordinate to the parent layer. It undoes the collapsing of the child units.

When collapsed, the child units of individual parent units can be expanded. Right clicking the mouse on the parent unit causes its associated data to be displayed on a popup menu window, as described above (see, e.g., the popup menu window 702 of FIG. 7). This popup menu includes the menu buttons Collapse and Expand. The Expand button "uncollapses" the child units associated with this parent unit, including the connection to them. After expanding the child units in this way, the Collapse popup menu button can be used to "re-collapse" the child units of this parent unit. Accordingly, in response to predetermined events such as actuating the Collapse and Expand buttons, the child units of respective parent units can be alternately collapsed and expanded as herein described.

FIG. 9 depicts the Layers & Rendering window for the USNetwork map. The layer tree 902 is in the upper left corner. It shows that the USNetwork map includes additional layers besides the Cities and Trunks layers described above. For example, a layer called Switches is collapsed under Cities. Another layer called Ports is collapsed under Switches. This means that the USNetwork map described above utilizes the Collapse/Expand functionality. Trunks are attached to specific ports on individual switches. Collapsing these layers as shown hides both the ports and the switches. Trunks that connect ports on switches in different cities are shown as being connected to the city itself. Trunks between ports on switches in the same city are hidden. The Switches and Ports layers are described below (see, e.g., FIGS. 18-21).

Figure 10:
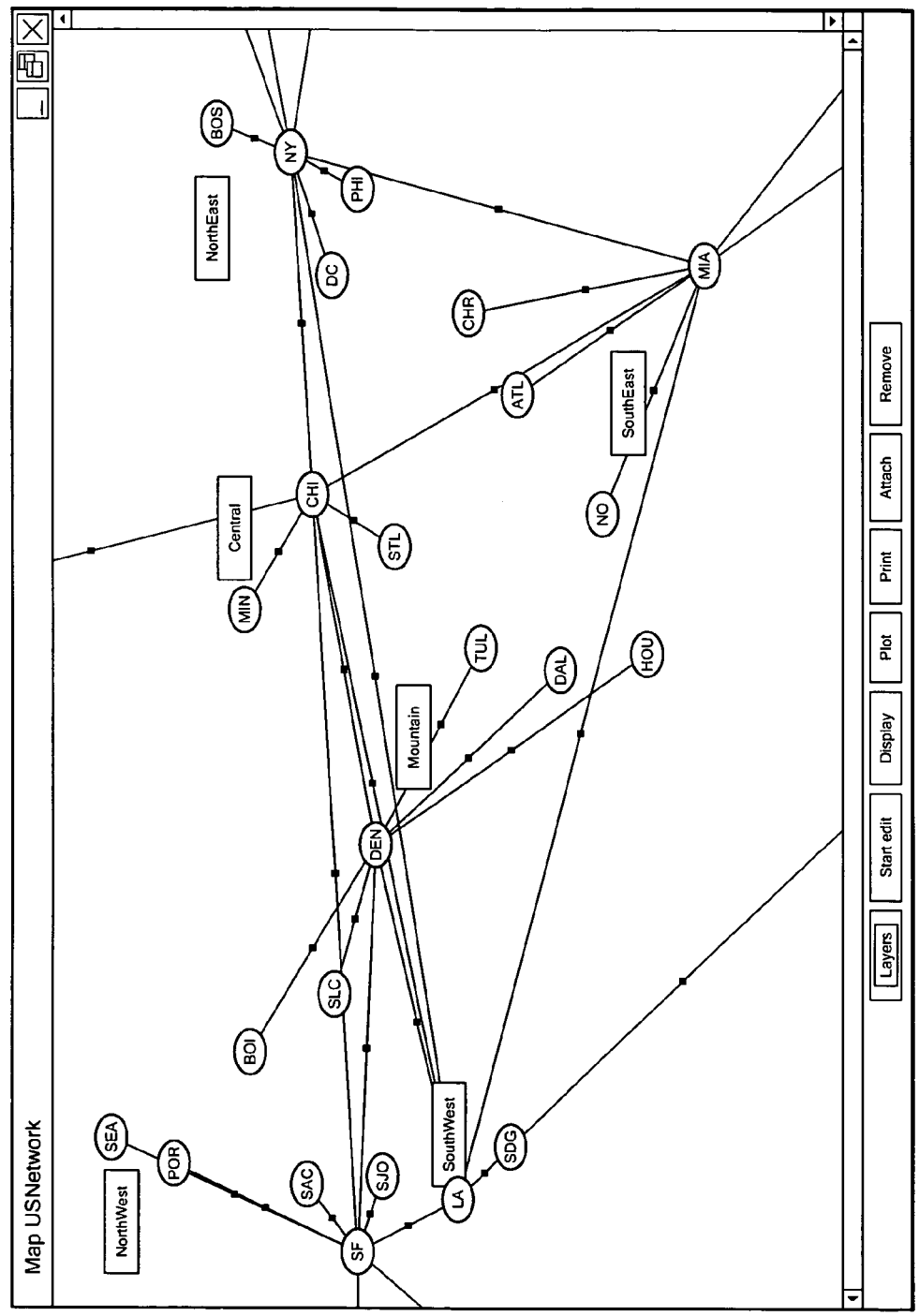

Another layer is called the Regions layer (see FIG. 9). The Regions layer includes six units representing regions of the United States (NorthEast, SouthEast, Central, Mountain, NorthWest, and SouthWest). Each city is in a region, as identified by the parent column called Region. FIG. 10 depicts the USNetwork with the Regions layer shown as rectangular symbols (see also FIG. 8).

Figure 11:
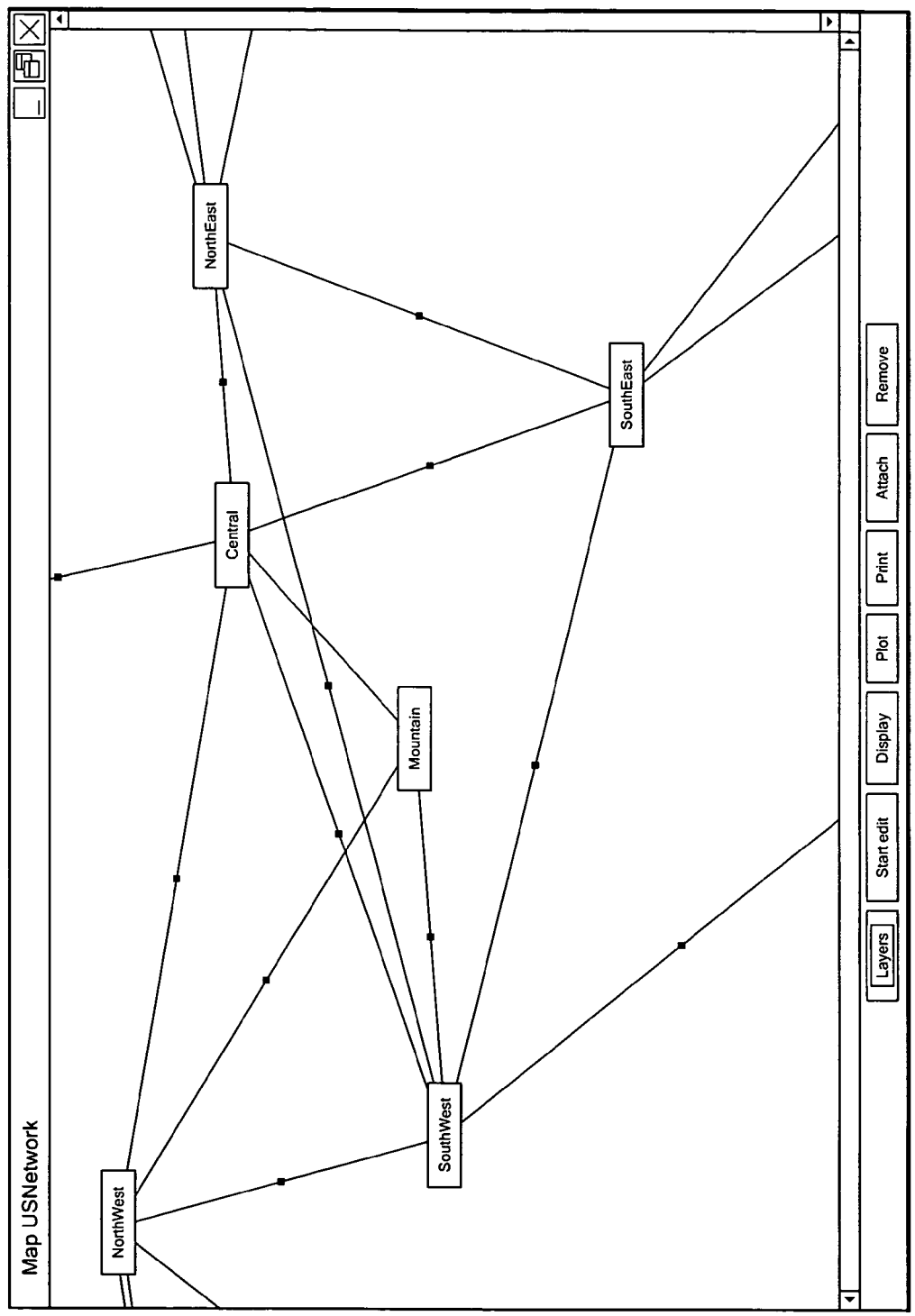
Figure 12:
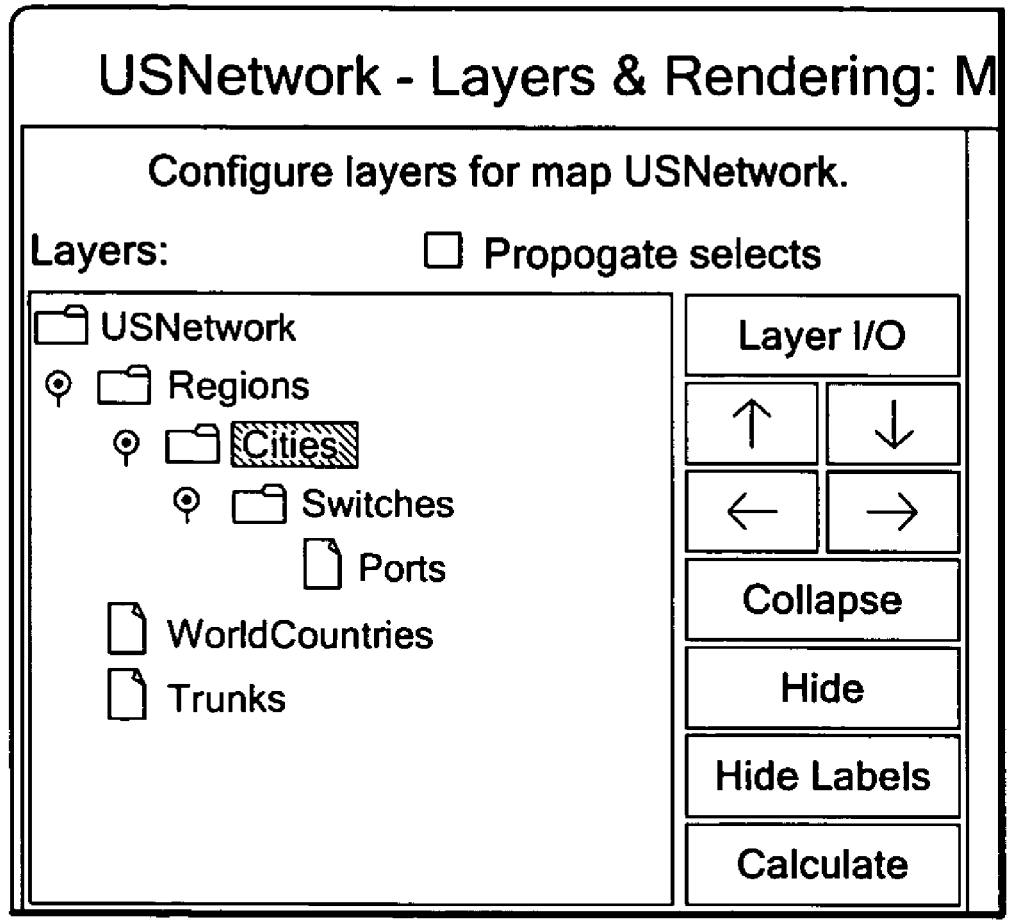

Adjusting the layer tree to collapse the Cities layer under the Regions layer causes the city symbols to be hidden, along with any trunks that connect cities within the same regions. Trunks that connect different regions are now depicted as connecting the regions, as shown in FIG. 11. The corresponding layer tree is depicted in FIG. 12.

Figure 13:
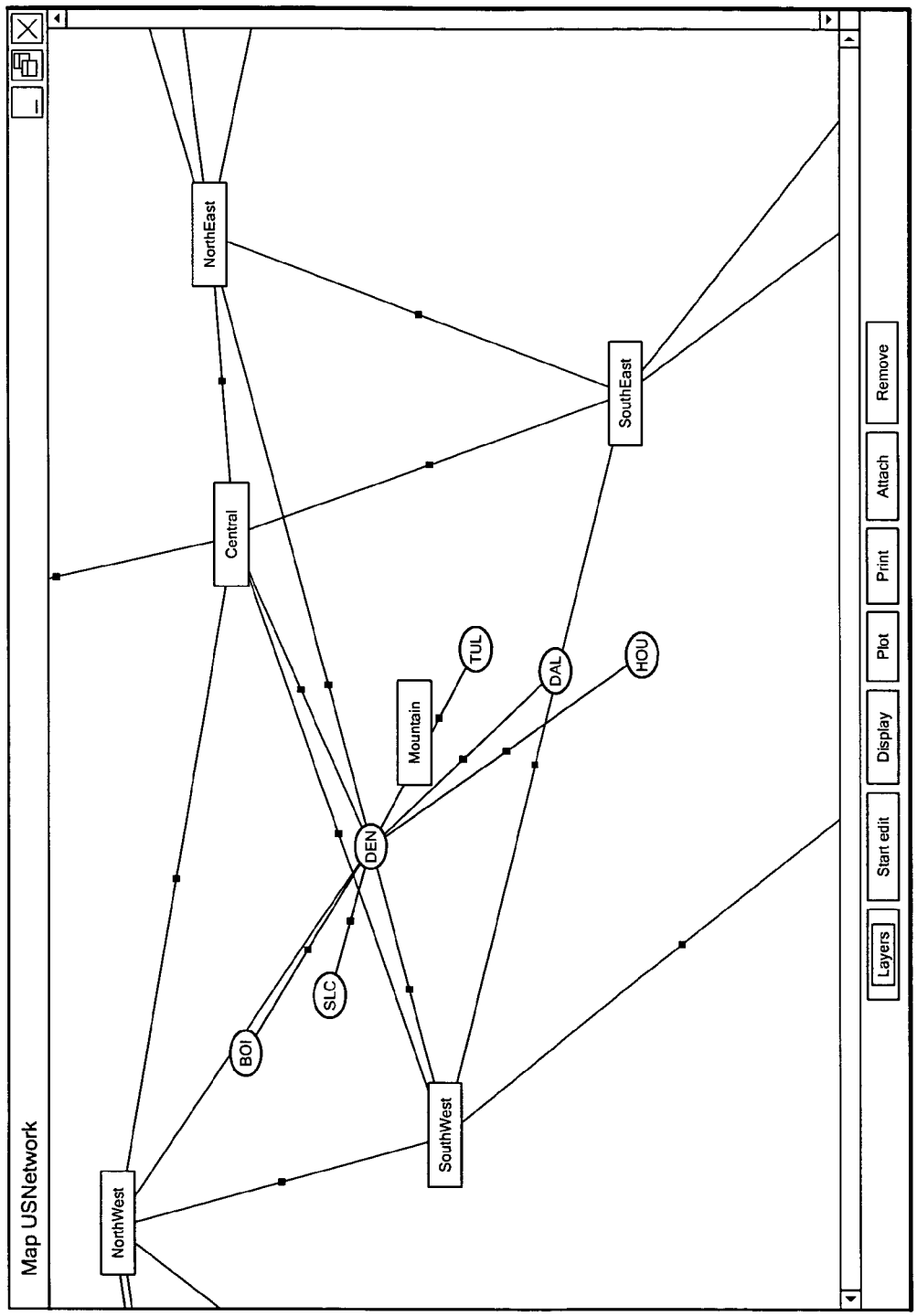

Right clicking the Mountain region symbol and invoking the Expand menu button on the resulting popup menu causes the cities in the Mountain region to be expanded, as shown in FIG. 13. Invoking the Collapse menu button on the Mountain region popup collapses the cities in the Mountain region, returning the map appearance back to that shown in FIG. 11.

Figure 14A:
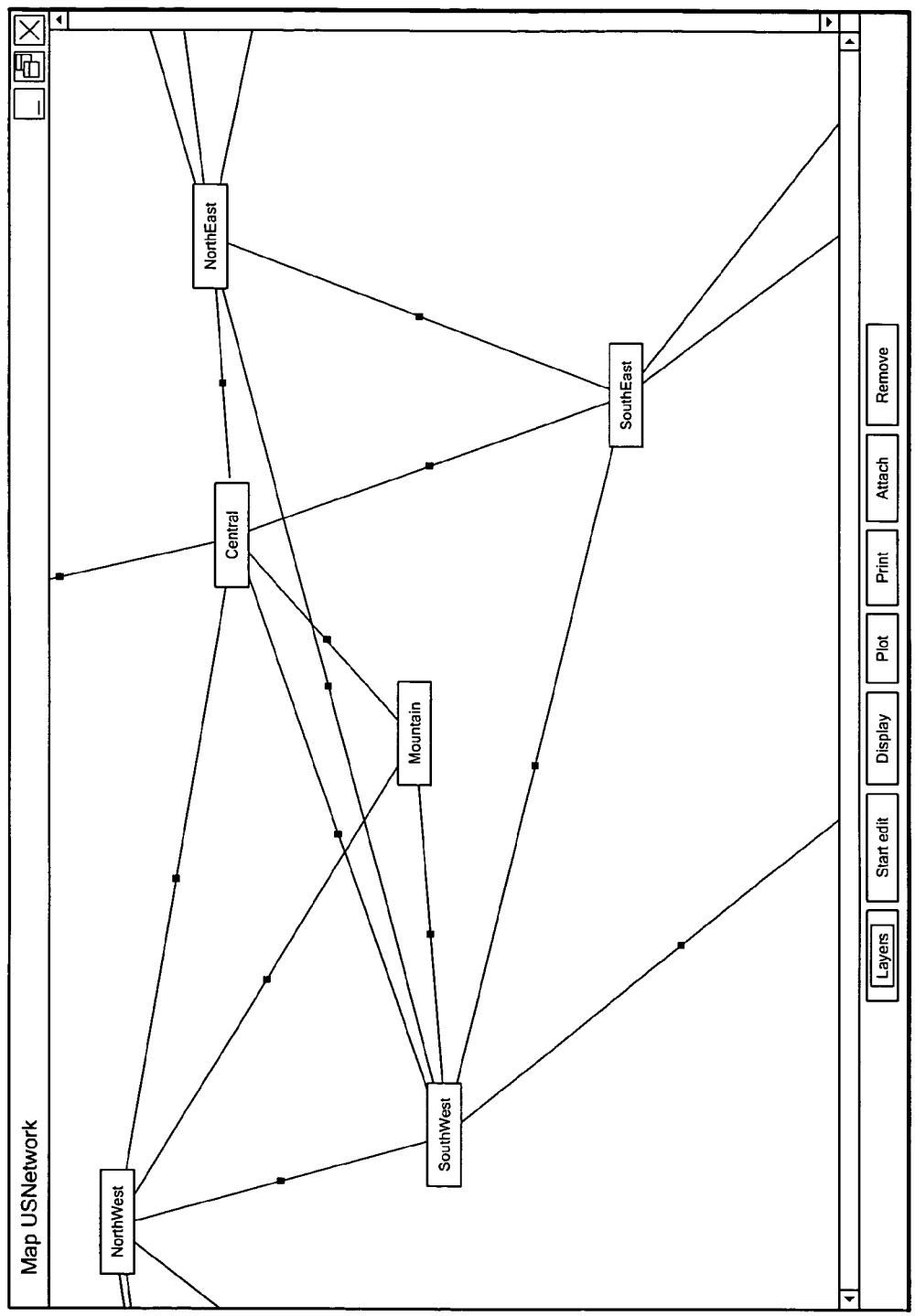
Figure 14B:
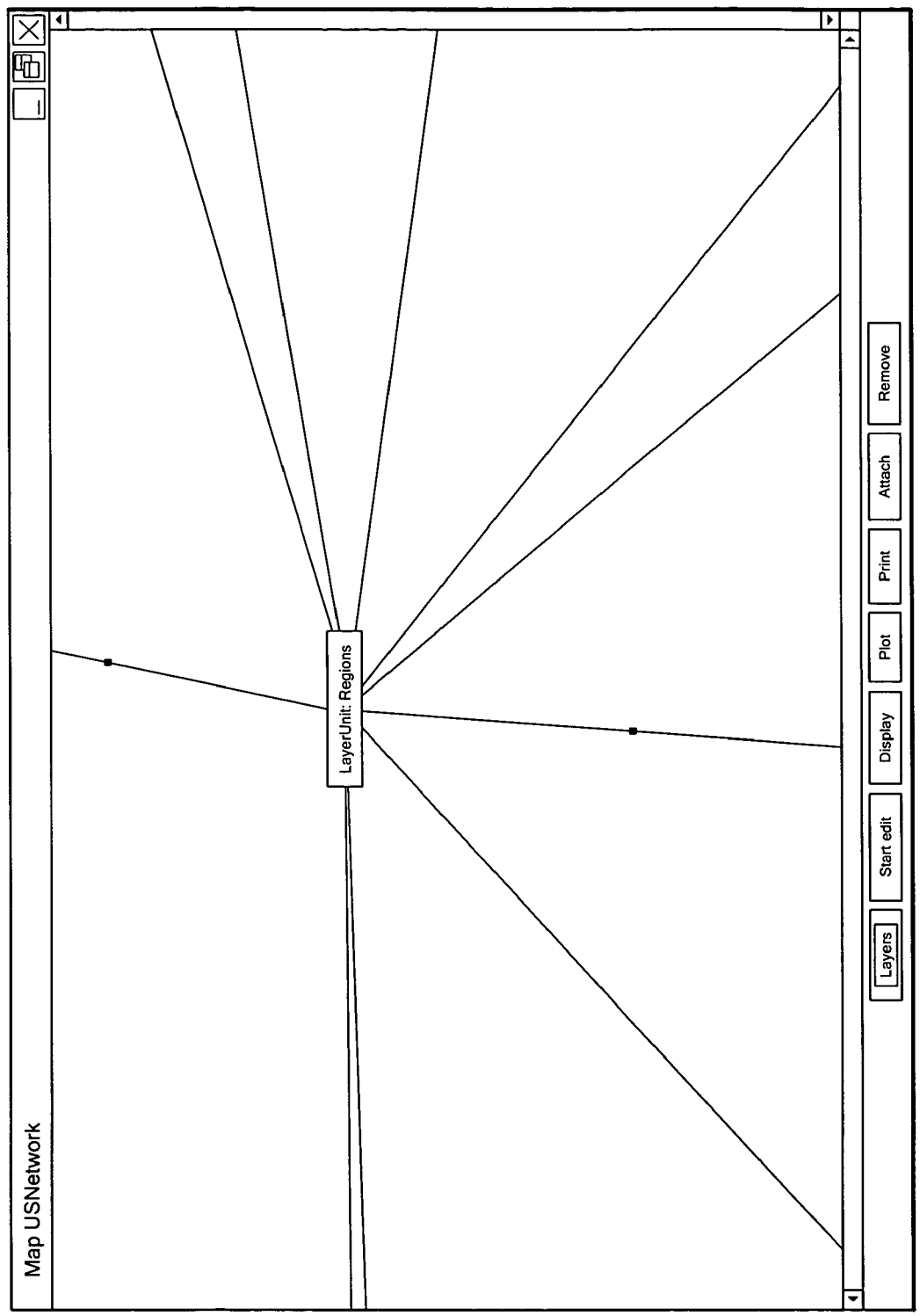

On map views, entire point layers can be collapsed to a single symbol representing the entire layer. An entire point layer can be collapsed onto a single symbol using the Collapse/Expand button to the right of the layer tree 902 on the Layers and Rending window (see FIG. 9). This symbol is called the "layer unit". The layer selected on the layer tree is collapsed. All symbols for point units in the layer are hidden. They are replaced by the layer unit. All connections between units in the selected layer and units in other layers are now connected to the layer unit. All connections between units within the collapsed layer are hidden. Expanding the collapsed layer undoes the collapse. FIGS. 14a-14b depict an example of collapsing an entire layer.

Figure 15:
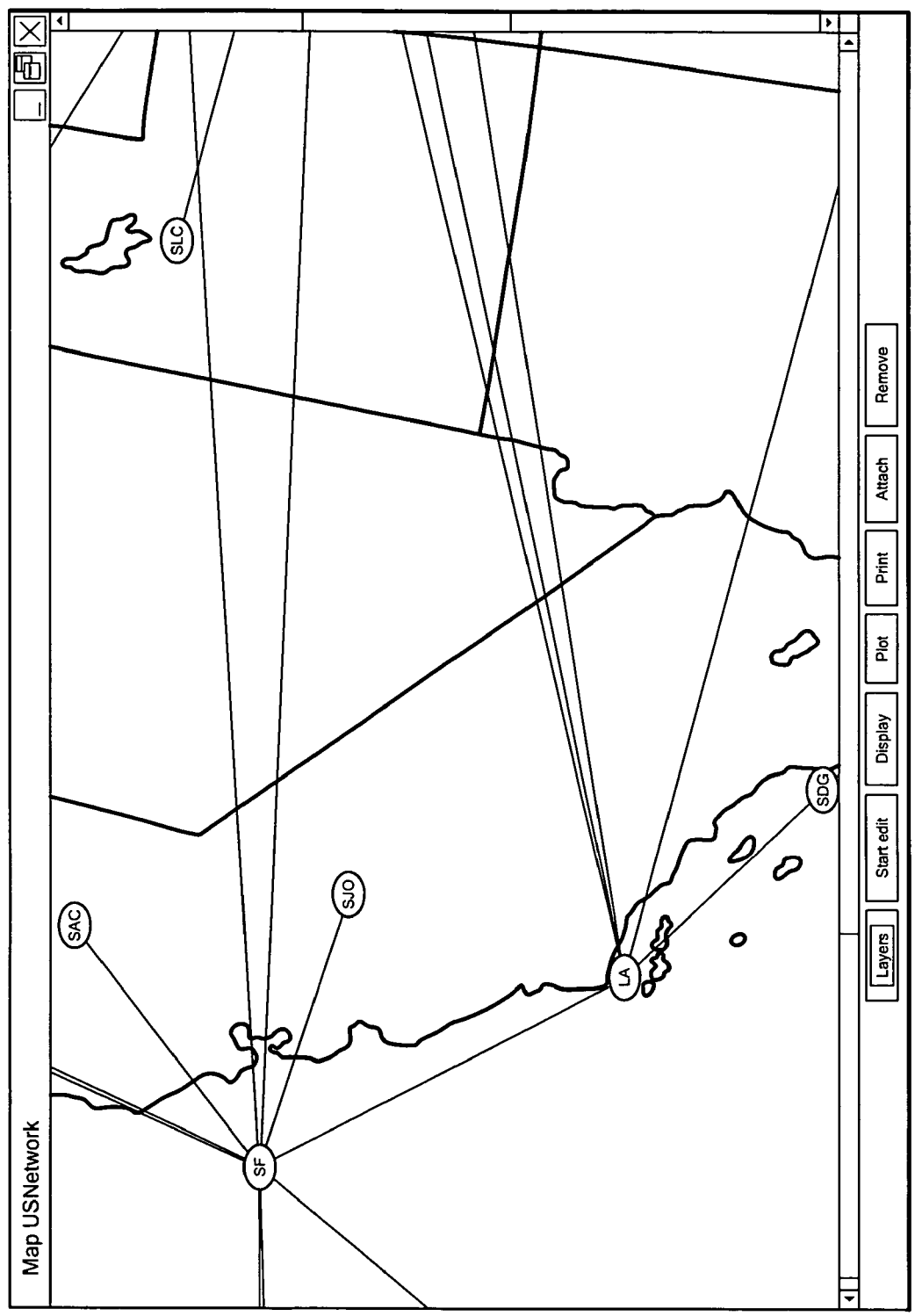

The scale of a map's field of view can be adjusted by zooming, which is controlled by a zoom factor. In this illustrative example, a factor of 1.0 means no zoom. Smaller factors "zoom out", giving a wider field of view. Larger factors "zoom in", giving a more detailed field of view. Both unit symbol positions and the background image (if any) are "zoomed". Unit symbol sizes remain unchanged during zooming. FIG. 15 depicts an example of "zooming in".

In the presently disclosed embodiment, a "transform" is defined as a linear transform operation on point unit positions in map views. Transforms permit convenient examination of data at different levels of detail, adjusting to different map background images and centering on designated units. The linear transform is based on predetermined scale and offset factors for each axis. The general formulae for a linear transform from untransformed to transformed unit coordinates can be expressed as $$\text{EastTransform} = (\text{eastScale} * \text{eastPos}) + \text{eastOffset} \quad (5)$$

$$\text{NorthTransform} = (\text{northScale} * \text{northPos}) + \text{northOffset}, \quad (6)$$

in which "EastTransform", "eastScale", "eastPos", and "eastOffset" correspond to a horizontal axis of the map view, and "NorthTransform", "northScale", "northPos", and "northOffset" correspond to a vertical axis of the map view.

The data exploration system 100 supports two kinds of transform, namely, a layer transform and a unit transform. Scale and offset parameters for each may be defined for point layers. Specifically, a layer transform can be used to transform each point unit position on a map by applying the scale and offset parameters to each unit directly, according to equations (5)-(6). The actual parameters used are taken from a point layer in the map that the user designates as the layer transform layer. A unit transform can be used to transform each point unit position on the map, centering the display on a designated unit. This unit is called the transform unit. Transform units are designated via the Transform menu button on the popup menu window displayed by right-clicking on a point symbol (see, e.g., the popup menu window 702 of FIG. 7). The layer that includes the transform unit is called the unit transform layer. Its unit transform scale and offset parameters are used to perform the transform. In unit transforms, the offset parameters specify the position of the transform unit in the transformed map display. In this example, the default offset parameters are eastOffset=5.0 and northOffset=5.0, which position the transform unit at the center of the transformed map. The formulae for unit transforms to go from untransformed to transformed unit coordinates can be expressed as $$EastTransform = (eastScale*(eastPos - eastUnit)) + eastOffset \quad (7)$$

$$NorthTransform = (northScale*(northPos - northUnit)) + northOffset \quad (8)$$

in which "EastTransform", "eastScale", "eastPos", "eastUnit", and "eastOffset" correspond to the horizontal axis of the map view, and "NorthTransform", "northScale", "northPos", "northUnit", and "northOffset" correspond to the vertical axis of the map view.

Figure 16A:
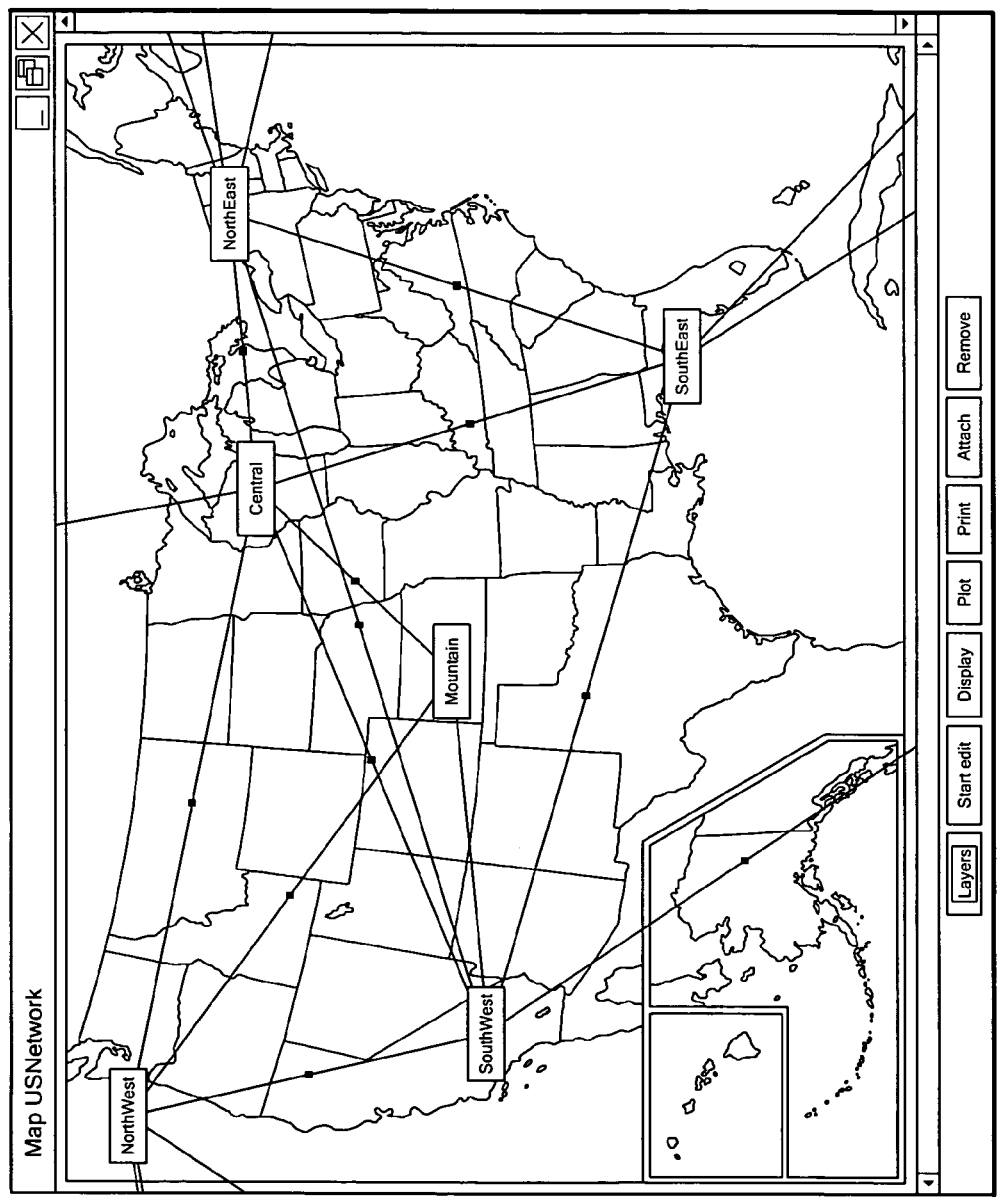
Figure 16B:
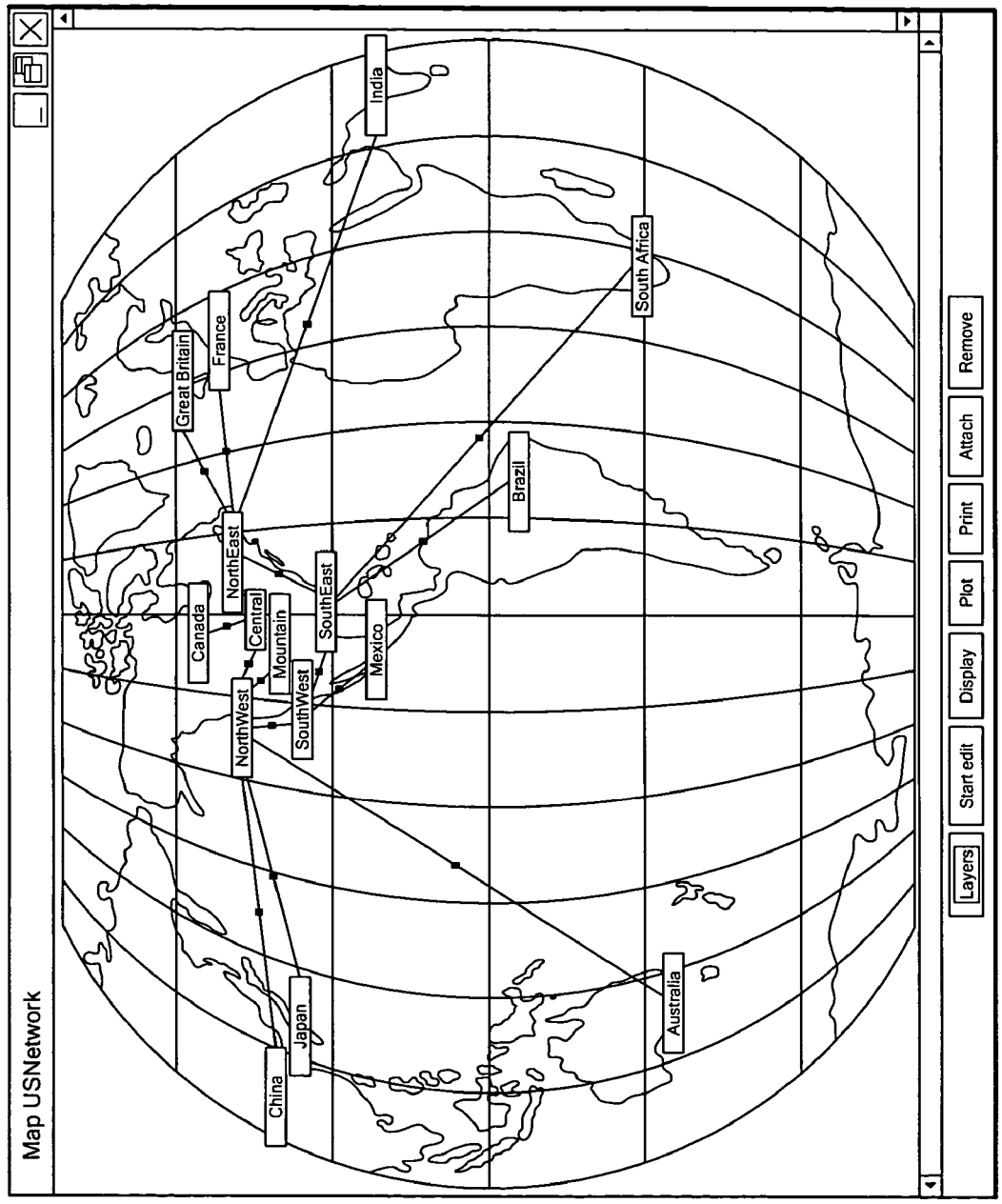
Figure 17:
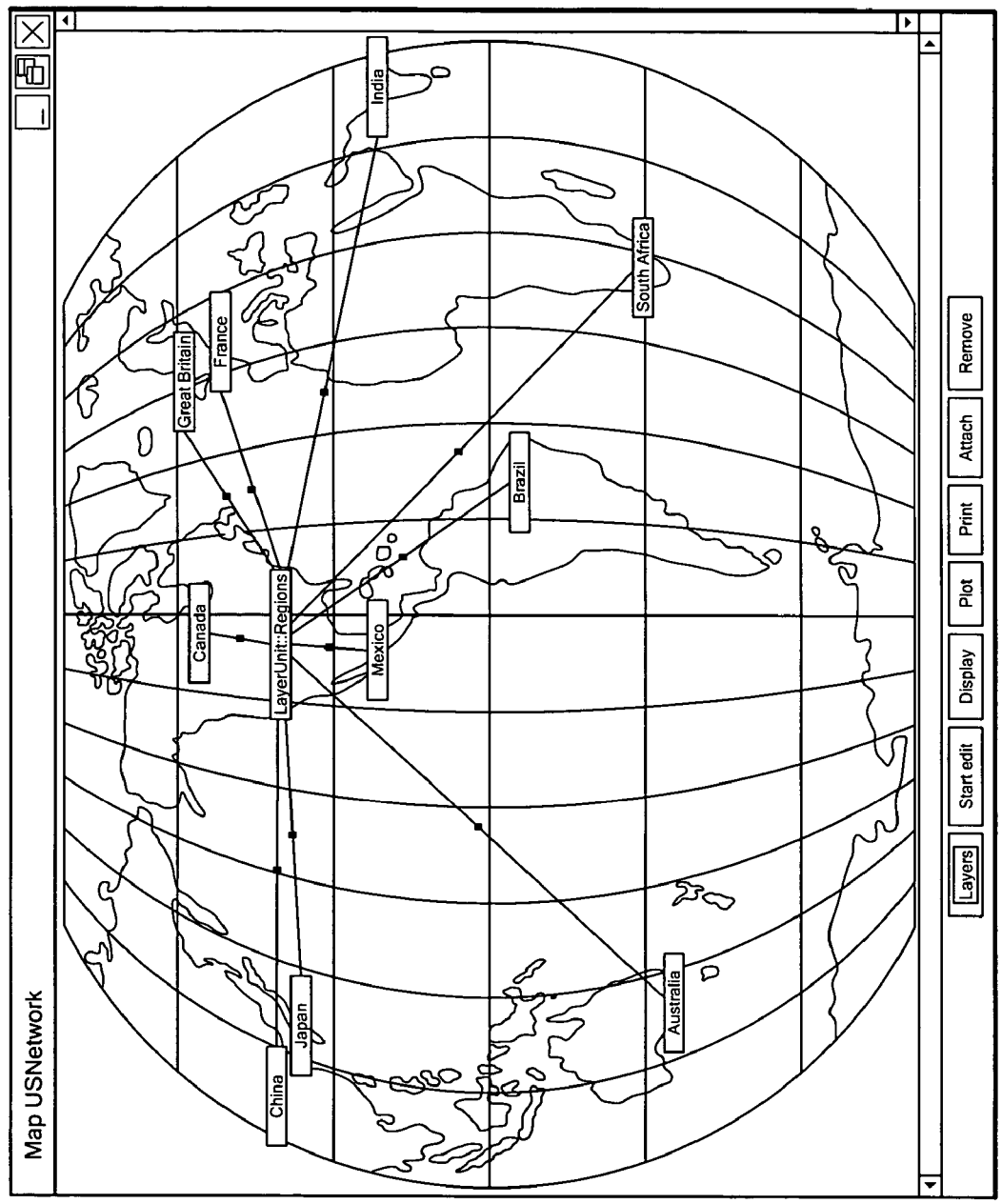

FIGS. 16a-16b and 17 depict an example of using a layer transform. FIG. 16a shows the USNetwork map with all units collapsed under the Regions layer. The background image is exposed, showing a map of the United States. FIG. 16b depicts the application of a layer transform to this view, transforming unit positions so that the "rest of the world" is now exposed. For clarity, a different background image, e.g., a world map, has been substituted for the map of the United States. Unit symbols for different countries are now in the field of view. These units are in the layer whose layer transform was applied. These units are the endpoints of trunks going to these countries from the USNetwork. It should be noted that FIGS. 16a-16b depict two views of the same map. Just the scaling and background images have been changed. FIG. 17 depicts the effect of collapsing the Regions layer. Having the entire USNetwork represented by a single symbol illustrates the relationship of the USNetwork to networks in other countries.

Figure 18:
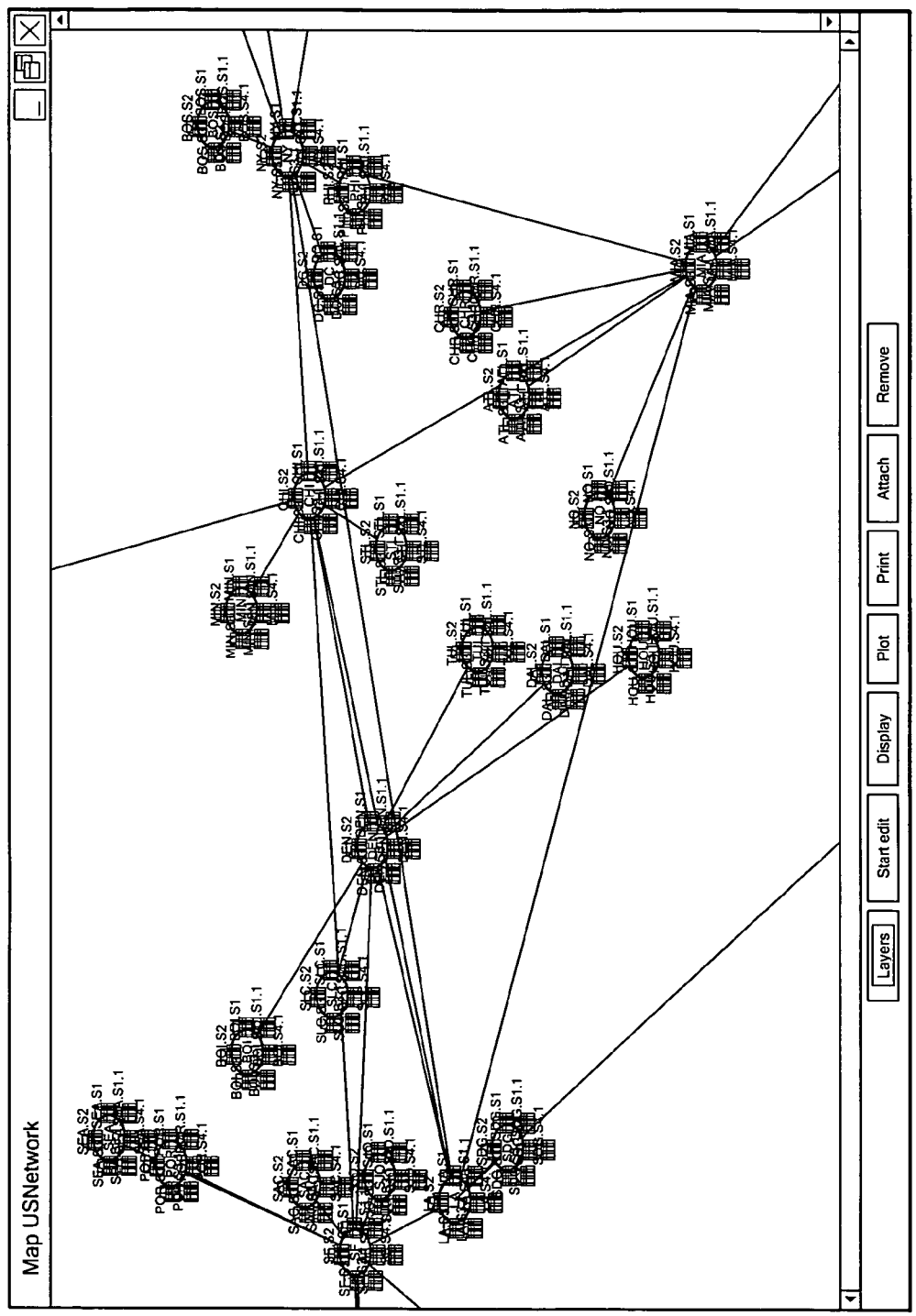
Figure 19:
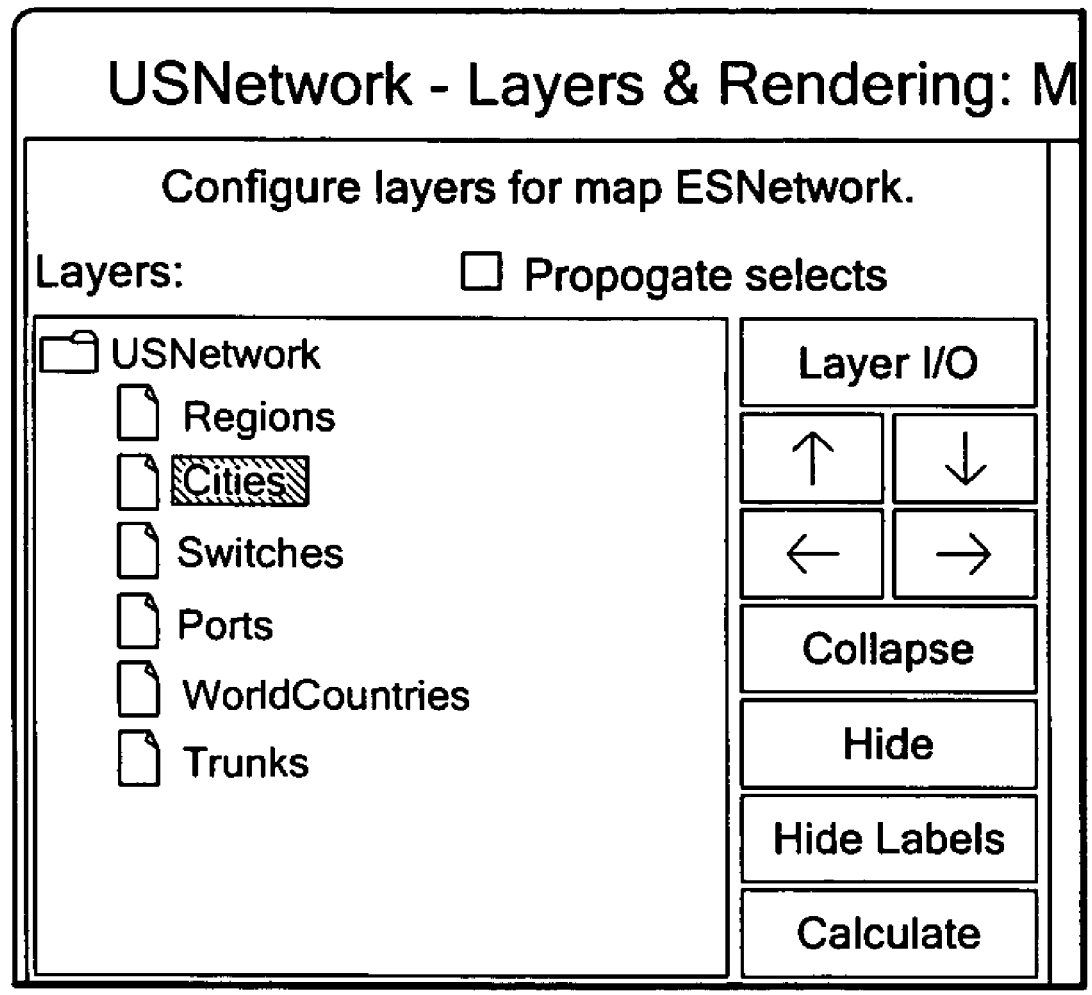

FIGS. 18-21 depict an example of using a unit transform. FIG. 18 depicts the USNetwork, and FIG. 19 depicts the corresponding layer tree in the Layers and Rendering window. The depiction of the USNetwork in FIG. 18 is similar to that in FIG. 3 (i.e., the Regions layer is hidden, and the Cities and Trunks layers are shown), but the Switches and Ports layers have now been promoted in the layer hierarchy so that their units are no longer collapsed under their cities. There are seven switches in each city. They are depicted as small square symbols surrounding each city symbol. Each switch has 40 ports, located just below each switch symbol. The map is too cluttered at this scale—the switches overlap the cities and the ports are piled on top of each other.

Figure 20:
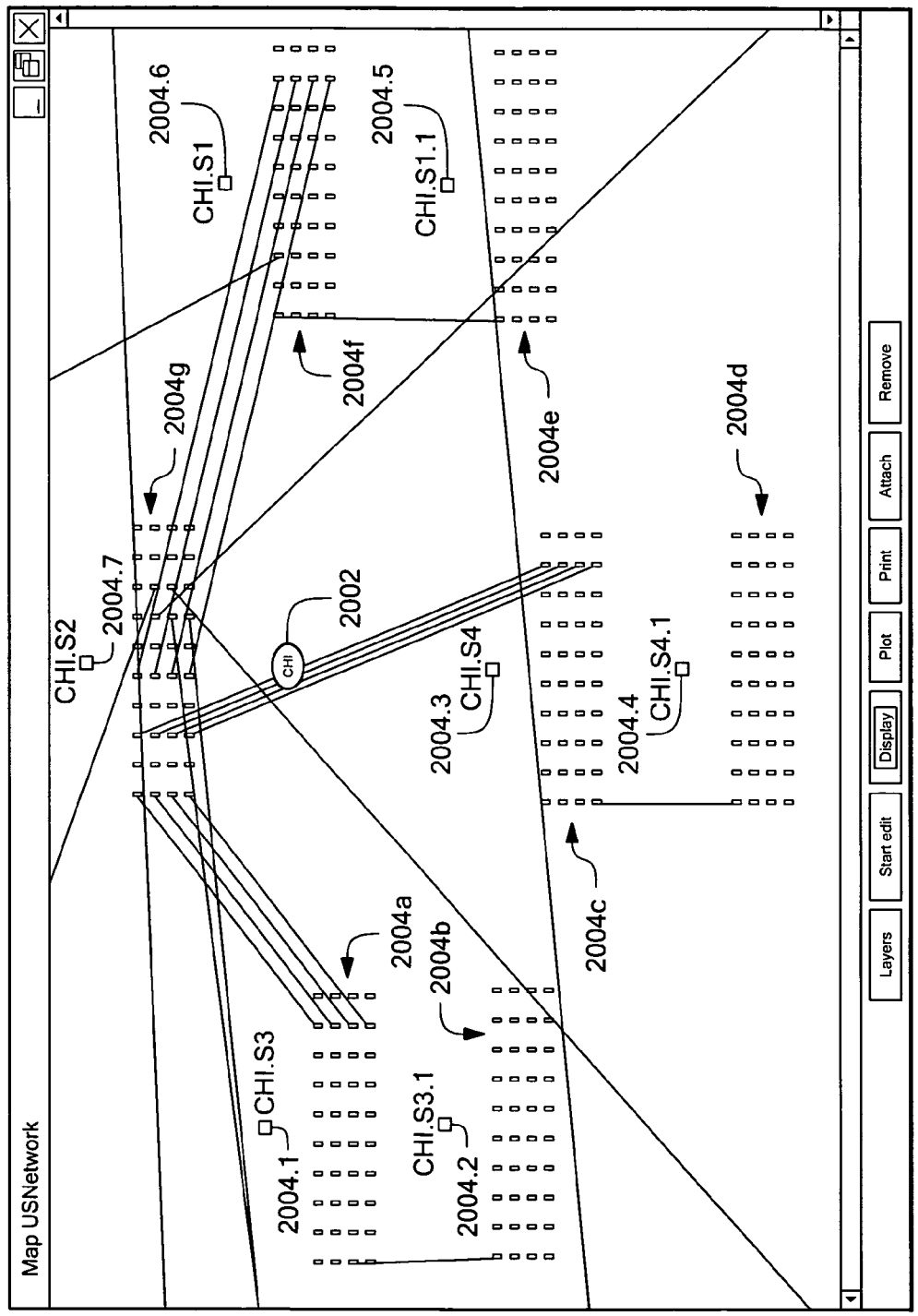

FIG. 20 depicts the same map as FIG. 18 after a unit transform has been applied, using CHI 2002 as the transform unit. This makes the Cities layer the unit transform layer. The map has been re-scaled to show just the region around CHI. The CHI symbol 2002 is centered towards the top of the map. Its seven switches 2004.1-2004.7 are arranged around it, and each switch's 40 port symbols 2004a-2004g are now clearly distinguishable. Trunks are clearly shown to terminate on individual ports, including trunks between switches within the same city (CHI).

Figure 21:
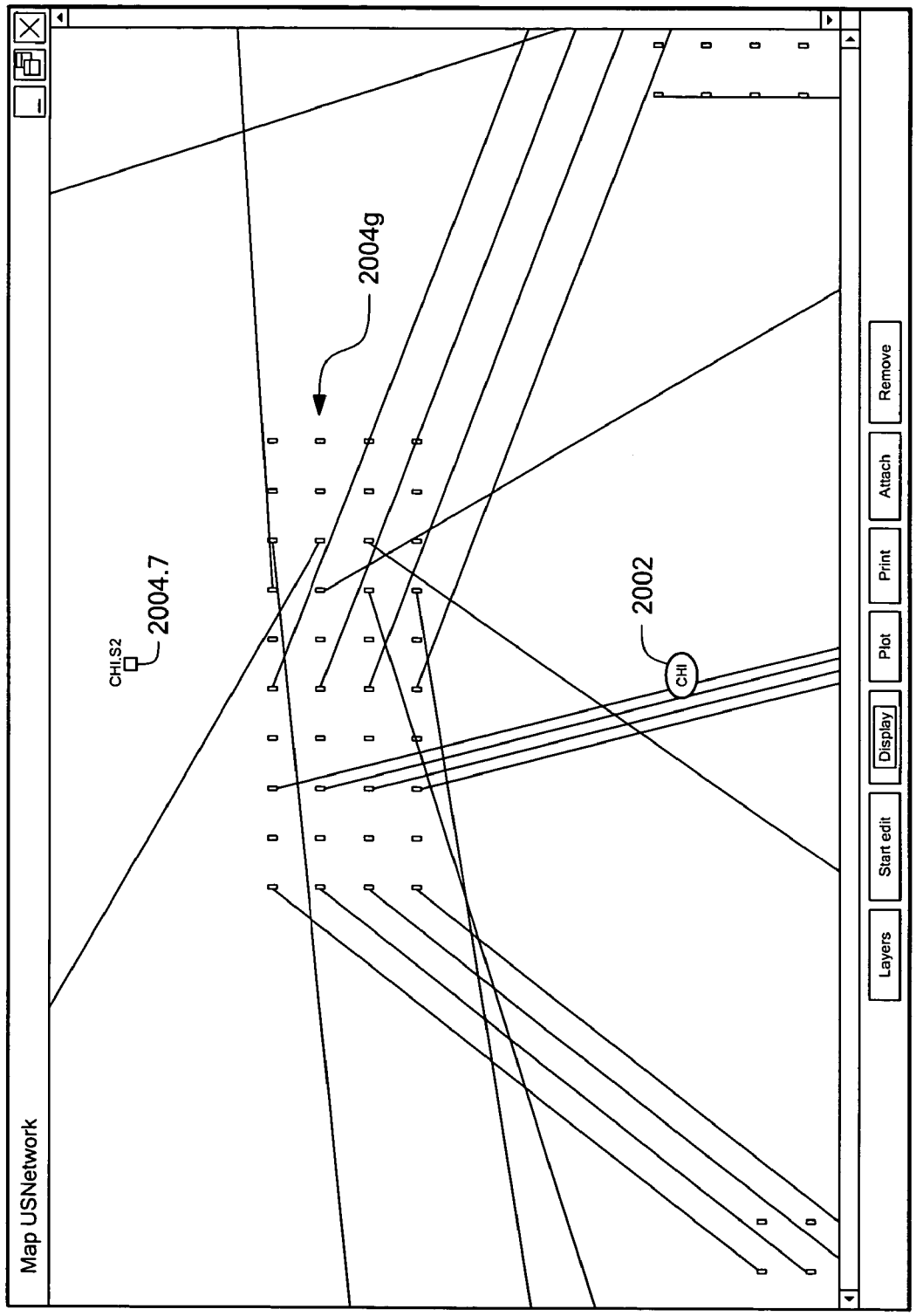
Figure 22:
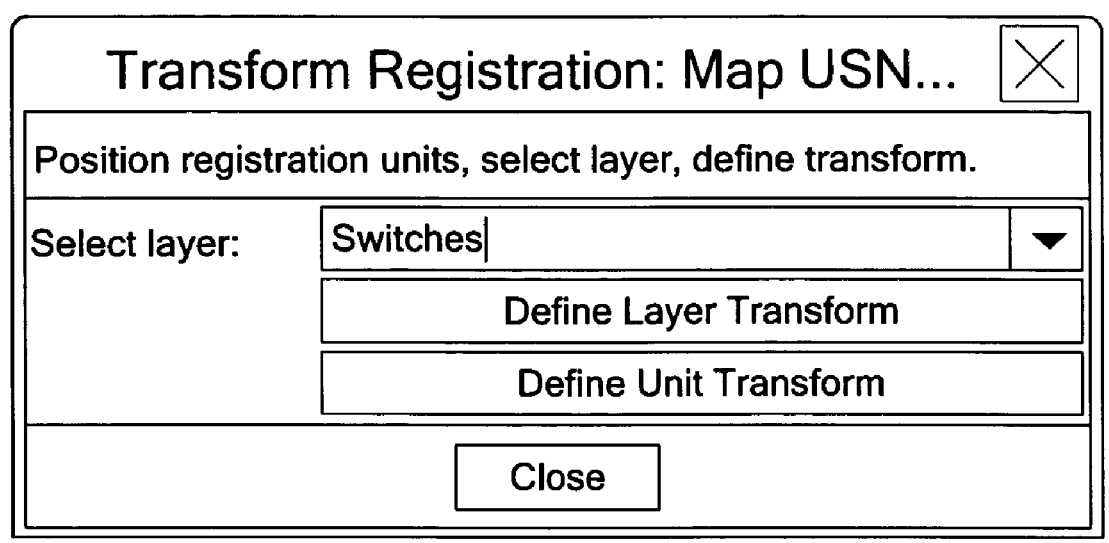

FIG. 21 depicts the same map as FIG. 18 after another unit transform has been applied, using one of the switches CHI.S2 2004.7 as the transform unit. This makes the Switches layer the unit transform layer. Its unit transform parameters scale the map to greater detail, so that the individual switch 2004.7 and its 40 ports 2004.g fill the display area.

Figure 23:
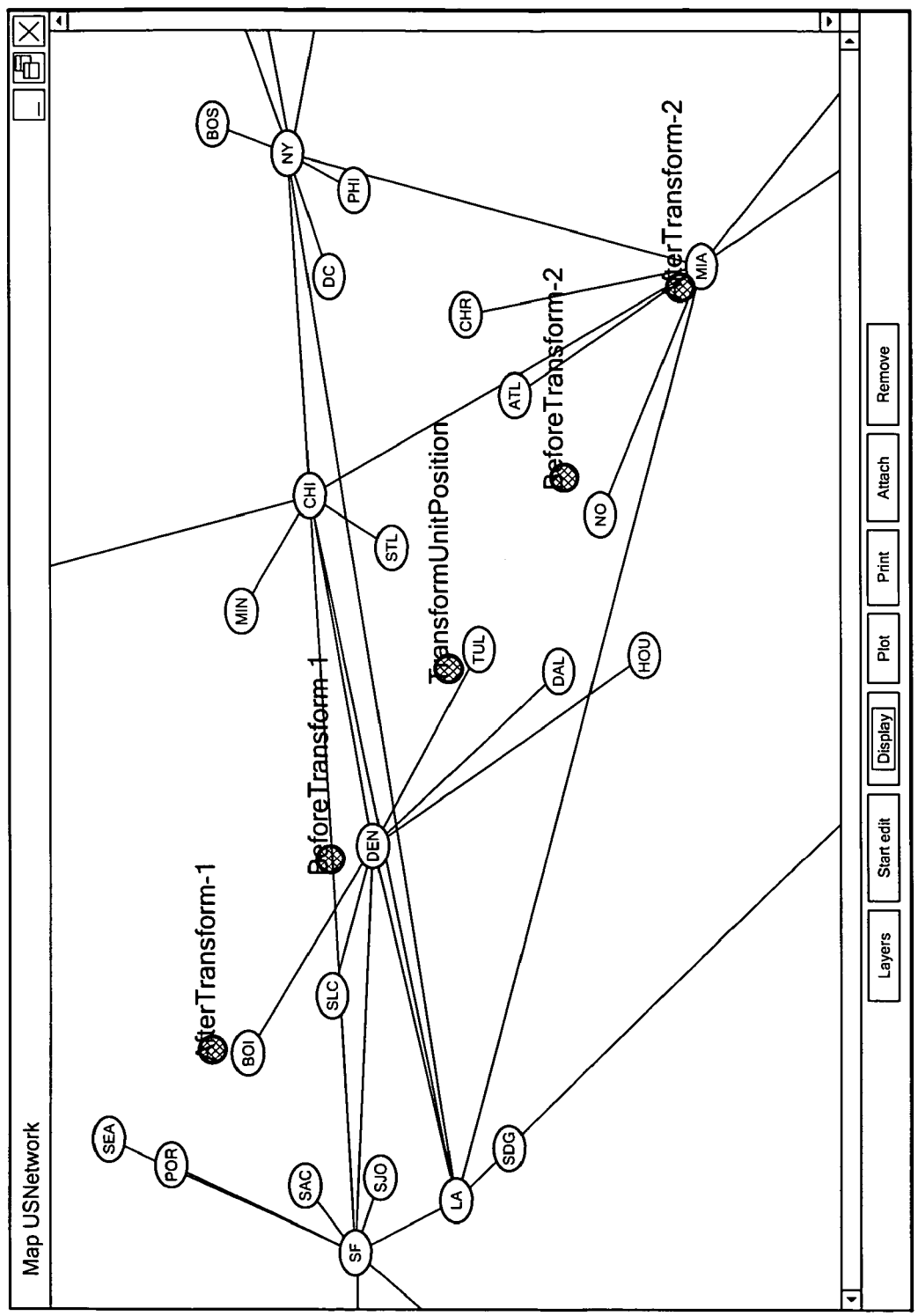

The Transform Registration window (see FIG. 22) is used to define the scale and offset parameters for layer transform and unit transform for point layers on a map. When the Transform Registration window is active, five special transform registration units are added to the map. FIG. 23 depicts the U.S. Network map with the five special registration units in their initial positions.

To define transform parameters, the user selects a layer on the Transform Registration window (see FIG. 22), and positions the special transform registration units by editing the map and dragging them. Once positioned, as described below, the appropriate Define button (Define layer transform, Define unit transform) on the Transform Registration window is used to define the transform on the selected layer.

The special transform registration units are defined as follows.

BeforeTransform-1—the position of unit 1 before the transform occurs.

AfterTransform-1—the position of unit 1 after the transform occurs.

BeforeTransform-2—the position of unit 2 before the transform occurs.

AfterTransform-2—the position of unit 2 after the transform occurs.

TransformUnitPosition—the position in the map where the transform unit should appear when the unit transform is in effect. The default position is the center of the map, but it can be placed anywhere by dragging TransformUnitPosition (see FIG. 23). The rest of the map will be centered around this position when the unit transform is in effect. It is noted that TransformUnitPosition is ignored for layer transforms.

The term "rendering" refers to the appearance of a unit's representation in a view. On map views, point units are rendered as symbols drawn at the unit's position. The appearance of these symbols depends on several characteristics, such as its shape, size, color/shade, and the font of its label. The term "rendering attribute" is used for a particular characteristic that determines how a unit is rendered. Size and color/shade are two rendering attributes. On map views, connection units are rendered as lines connecting two endpoint units. Their rendering attributes include type (solid/dashed), width, and color/shade.

Figure 24:
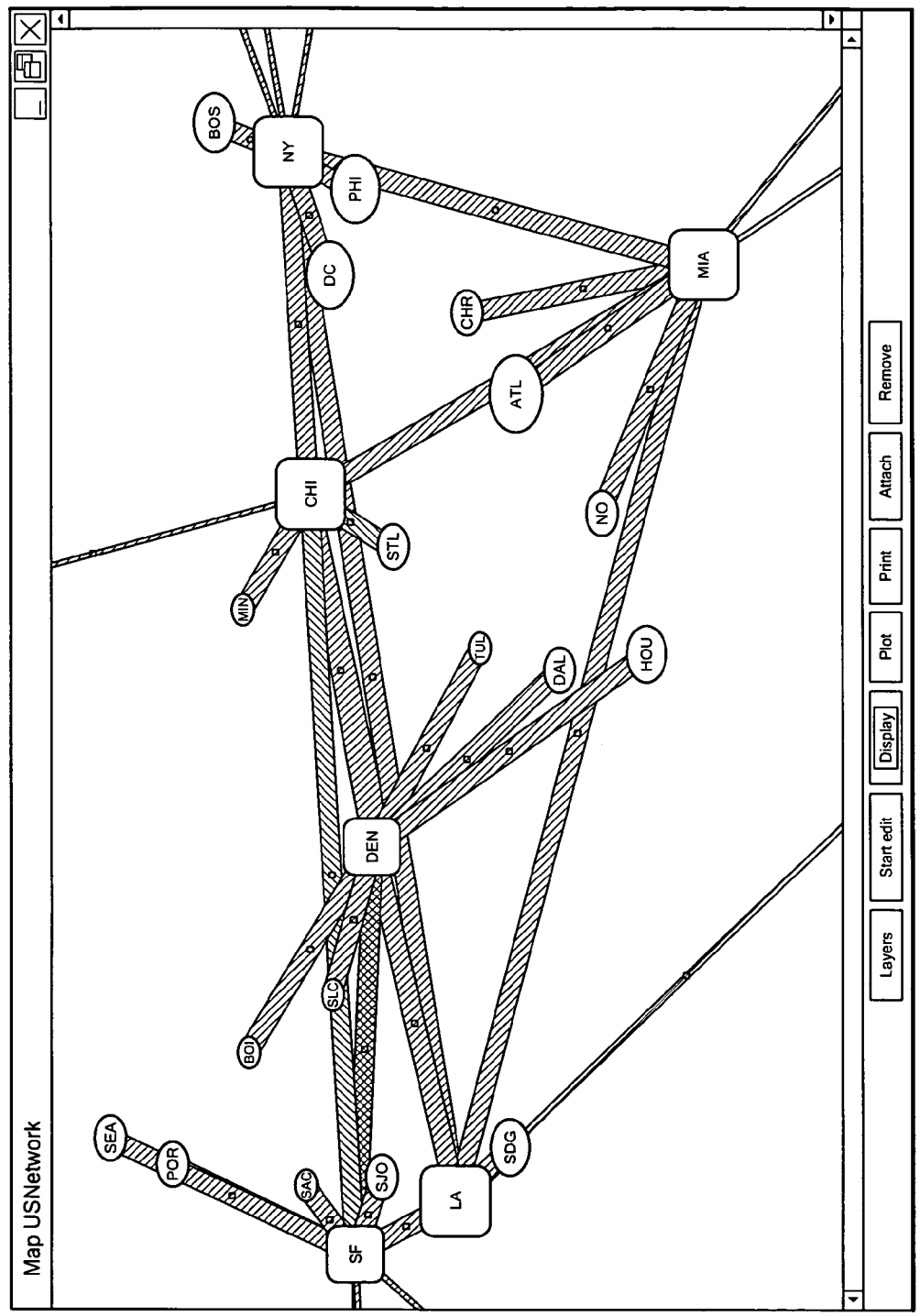
Figure 25:
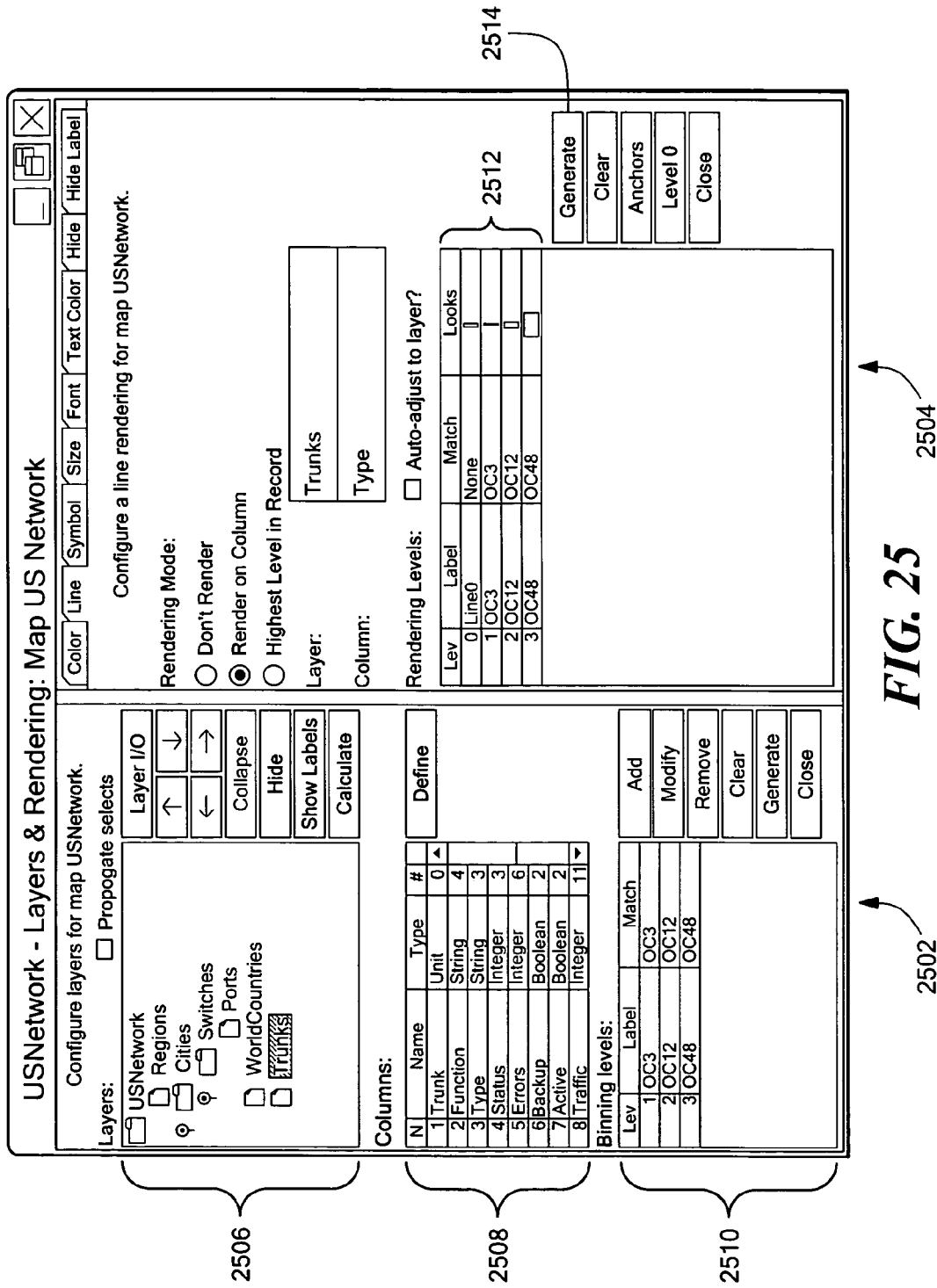

In the U.S. Network map examples described above, point and connection units have been rendered in a default mode that causes all units in the same layer to be rendered the same way. For example, as shown in FIG. 3, all cities are rendered as gray ovals and all trunks are rendered as solid black lines having a 2 pixel width. The data exploration system 100 can render units on maps based on the data associated with the units. This means that expressions of the rendering attributes can be set based on the underlying data values. Units in the same layer with different data values can be made to look different. FIG. 24 depicts the map of the USNetwork, but the cities and the trunks are now rendered based on data as follows.

City size—the larger cities carry more traffic.

City shape—the rounded rectangles are gateway cities; they connect to cities in other regions or to other countries. Ovals are not gateways; they connect to cities within the same region.

City color/shade—the cities in the same region have the same color/shade.

Trunk width—this is used to show the trunk type, which in this context means capacity. For example, OC3 is 1 pixel, OC12 is 4 pixels, and OC48 is 12 pixels.

Trunk color/shade—this is used to show the trunk status. For example, green is good, yellow is marginal, and red is bad.

Although rendering based on data is particularly useful on map views, it is also available on tree and table views. Table I describes the rendering attributes that can be varied with data for each type of view ("N/A" means the rendering attribute is not available on that view format).

TABLE I

| Rendering attribute | Map | Tree | Table |
|---|---|---|---|
| Color/shade | Color/shade of symbol or connection. | Color/shade of node icon. | Background color/shade of cell. |
| Line | Width and type of connection line or symbol border. | Width and type of connection icon. | N/A |
| Symbol | Symbol shape. | Icon shape. | N/A |
| Size | Symbol size. | N/A | N/A |
| Font | Label font, style, size. | Node label font, style, size. | Text font, style, size. |
| TextColor | Label color. | Node label color. | Text color. |
| Hide | Completely hide symbol. | N/A | N/A |
| HideLabel | Completely hide label. | N/A | N/A |

Rendering based on data is controlled as follows. First, data bins are defined for individual layer data columns. These are called "binning levels". Each binning level for a layer data column associates a level number with a data range or match criteria that determines if a particular data value in that column is in that bin. Next, for each layer in a view, a column's binning levels can be associated with the appearance of a particular rendering attribute (color/shade, size, etc.). The specific appearance of a rendering attribute for a specific binning level is called a "rendering level". For example, as shown in the Layers & Rendering window of FIG. 25, the binning level for OC48 in the "Type" column in the Trunks level is 3. The "Line" rendering attribute for the Trunks layer is associated with this column. The Line appearance associated with rendering level 3 is solid having a width of 12 pixels. Both binning levels and rendering levels can be controlled via the Layers & Rendering window.

Specifically, the Layers & Rendering window (see FIG. 25) includes two panels, namely, the Layers panel 2502 and the Rendering panel 2504. The upper part of the Layers panel shows the view's layers in a tree structure (the layer tree 2506) that controls the hierarchical relationship of the layers in the view. The buttons to the right of the layer tree control layer wide operations on these layers that are not directly involved with rendering. It is noted, however, that selecting a layer in the layer tree makes it the target of layer operations on the window, including the binning level and rendering operations.

The columns table 2508 shows the columns in the selected layer. Selecting a column in the columns table makes it the target of column operations on the window, including defining binning levels. The binning table 2510 includes the binning levels of the selected column. Buttons next to the binning table are used to maintain the binning levels. Selecting a binning level makes it the target of these operations, and also the target of rendering operations on the Rendering panel.

The Rendering panel 2504 includes a separate tabbed panel for each rendering attribute available for each view format (map, table, or tree). Table I above lists the rendering attributes used for each view format. Maps use all eight kinds of rendering attributes, hence there are eight tabbed panels (Color/shade, Line, Symbol, Size, Font, TextColor, Hide, and HideLabel) shown in FIG. 25. The illustrative Layers & Rendering window of FIG. 25 exposes the "Line" tabbed panel, but it is understood that the other tabbed panels are similar.

The upper part of the Rendering panel includes radio buttons (Don't Render, Render on Column, Highest Level in Record) used to select how layer data is to be used to render its representation on the view. This is called the rendering mode. "Don't Render" means do not use data binning levels at all. Each unit is represented using its default (e.g., Level 0) appearance. "Render on Column" means use data from a single column to render the attribute. "Highest Level in Record" means use the highest binning level of any of the unit's columns to render the data. Below the radio buttons are fields (Trunks, Type) indicating which layer and column is to be used to render the attribute when "Render on Column" is in effect.

The lower part of the Rendering panel includes a table 2512 showing the rendering levels for the particular rendering attribute for the selected layer. The buttons (Generate, Clear, Anchors, Level 0) next to the table 2512 are used to maintain these rendering levels. In the "Don't Render" mode, the level 0 attribute is used for all units in the selected layer. In the "Render on Column" mode, the rendering attribute's rendering levels are determined using the binning levels from the selected layer and column. In the "Highest Level in Record" mode, the rendering attribute's rendering levels are determined using the highest binning level of any column in the unit's data record.

Rendering based on data is configured and invoked by performing the following steps. It is noted that that these steps do not have to be performed each time rendering is defined. For example, once binning levels or rendering anchors have been defined, they can be used over and over again. Also, they do not all necessarily have to be performed in the order described. For example, rendering anchors can be defined before binning levels are defined. However, all of the steps are necessary to render units on a view based on data binning levels.

First, on the view's layer panel of the Layers and Rendering window, select a data layer and a column to use for rendering. Next, the binning levels are defined for the selected data column. All units in the layer that have a value in the same bin will have a rendering attribute rendered the same way. Each binning level includes the following:

Level number—a number that orders this binning level with respect to other binning levels defined for this column.

Match criteria—for numeric and date column types (e.g., Integer, Double, Date, Time, DateTime), the match criteria defines a lower and an upper bound for the binning level. For most other types (e.g., String, Boolean, Parent types), the match criteria defines a specific value to match.

Descriptive label—a label used to describe the binning level in legends.

Binning levels can be defined individually, or they can be automatically generated based on the column's data itself. In addition, individual binning levels can be modified. The following are three ways of automatically generating binning levels from a column's data:

Discrete Values—generate a separate binning level for each discrete value in the column.

Interval & Range (numeric data types only)—generate binning levels of a given interval spanning a given range from low to high. One or two additional binning levels can also be generated to pick up values either below or above the given range.

Fill In Levels (numeric data types only)—generate binning levels by interpolating missing binning levels from those already there. This fills in missing levels by automatically calculating interval and ranges based on the intervals that have already been defined. The levels that fill each gap each have the same interval.

Binning levels apply to the layer the data column is in. Once defined, they apply to all views the layer is in.

On the Rendering panel 2504, a rendering attribute is then chosen to associate with the selected layer and column. This is done by selecting the appropriate tab (e.g., Color/shade, Line, Symbol, Font). Next, on the selected tab for the rendering attribute, the appearance of that attribute is defined to associate with a particular binning level number. This is called a "rendering anchor". Rendering anchors may be directly associated with each specific binning level, or they may be defined to bracket a range of binning levels, anticipating that the subsequent rendering level generation step will fill in the bracket binning levels with interpolated or copied rendering attribute instances. Rendering levels apply to the specific view. In other words, the same layer/column's binning levels can be rendered differently on different views.

Next, the rendering levels to be used are generated for each binning level of the selected layer and column. This is done by clicking the Generate button 2514 on the selected tab for the rendering attribute. When there is a rendering anchor for a given rendering level, it is used for that rendering level. When there as a gap, the rendering level is determined as follows. For the rendering attributes Color/shade, Line, Size, and TextColor, the rendering level is calculated by interpolating between the rendering anchors that bracket the gap, proportional to the rendering level. If there is no upper rendering anchor, then the lower rendering anchor is copied. If there is no lower rendering anchor, then the Level 0 rendering instance is used for the rendering level. For the rendering attributes Symbol, Font, Hide, and HideLabel, the rendering level is a copy of the lower rendering anchor. There is no interpolation. If there is no lower rendering anchor, then the Level 0 rendering instance is used for the rendering level.

If the "Render on Column" option is in effect for the view, then symbols for units in the selected layer are now rendered using the rendering levels. If the "Highest Level in Record" option is in effect for the view, then symbols for units in the selected layer are now rendered using the rendering levels in conjunction with levels from other columns already defined. It is noted that the "Don't Render" option causes the view to be rendered using the Level 0 rendering instances instead of the rendering levels associated with data values.

Data can be further explored via the data exploration system 100 by setting the positions of point unit symbols based on the underlying data that each symbol represents. This is called "plotting". The basic plotting operation used by the system can be thought of as making a graph of the data in a layer (e.g., a scatter plot) by plotting symbol positions, using data from two layer columns for the east and north axes.

Specifically, for each axis, a distance in map coordinate space is calculated using the value from the data column to interpolate within a specified map coordinate range. That range is set by specifying the minimum and maximum map coordinates of the range and the data values that correspond to them. These range settings default to minimum and maximum data values and almost the full map coordinate range.

Other kinds of arrangements can be made by plotting data from several layers at the same time and by performing a series of plotting operations with each layer (other than the first layer), producing an offset from positions produced by the previous operation. It is noted that the rearrangements of map views by plotting are still maps, i.e., all other map functionality is still in effect, including rendering and showing connection units as lines between point unit symbols.

Figure 26A:
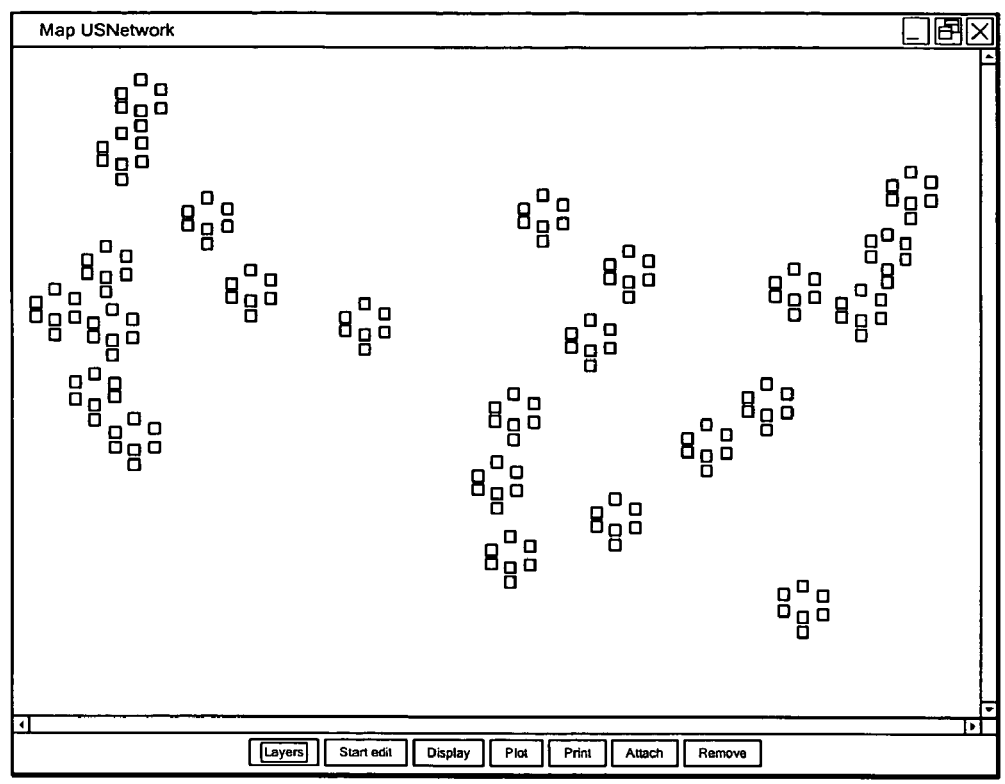
Figure 26B:
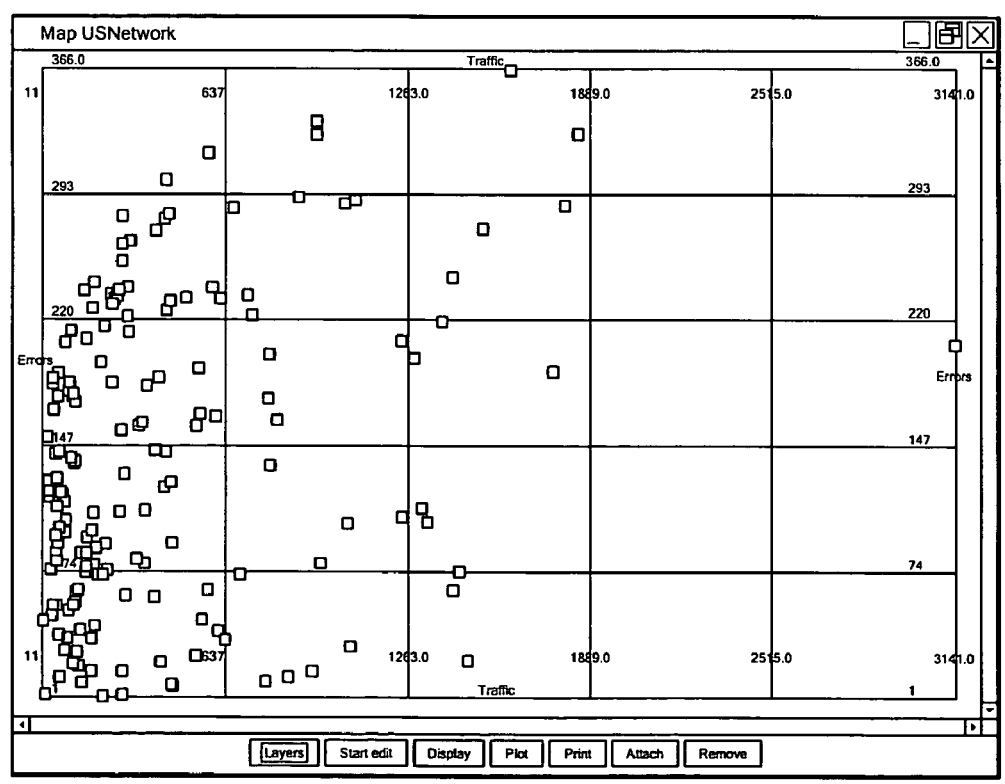

FIGS. 26*a*-26*b* depict an example of the basic system plotting operation, plotting point unit symbols from a single layer and using data from two columns. In this example, the Switches layer is plotted on the USNetwork map. Plotting is used to explore whether there is a relationship between the amount of traffic carried by a switch and the number of errors it detects. FIG. 26*a* depicts the map before plotting. All layers are hidden except for the Switches layer. FIG. 26*b* depicts the switches plotted to new positions. The vertical axis corresponds to "Errors" and the horizontal axis corresponds to "Traffic". Default scaling is used for both axes, using data minima and maxima to plot the symbols to almost the full size of the map. A labeled grid is also shown.

Figure 27:
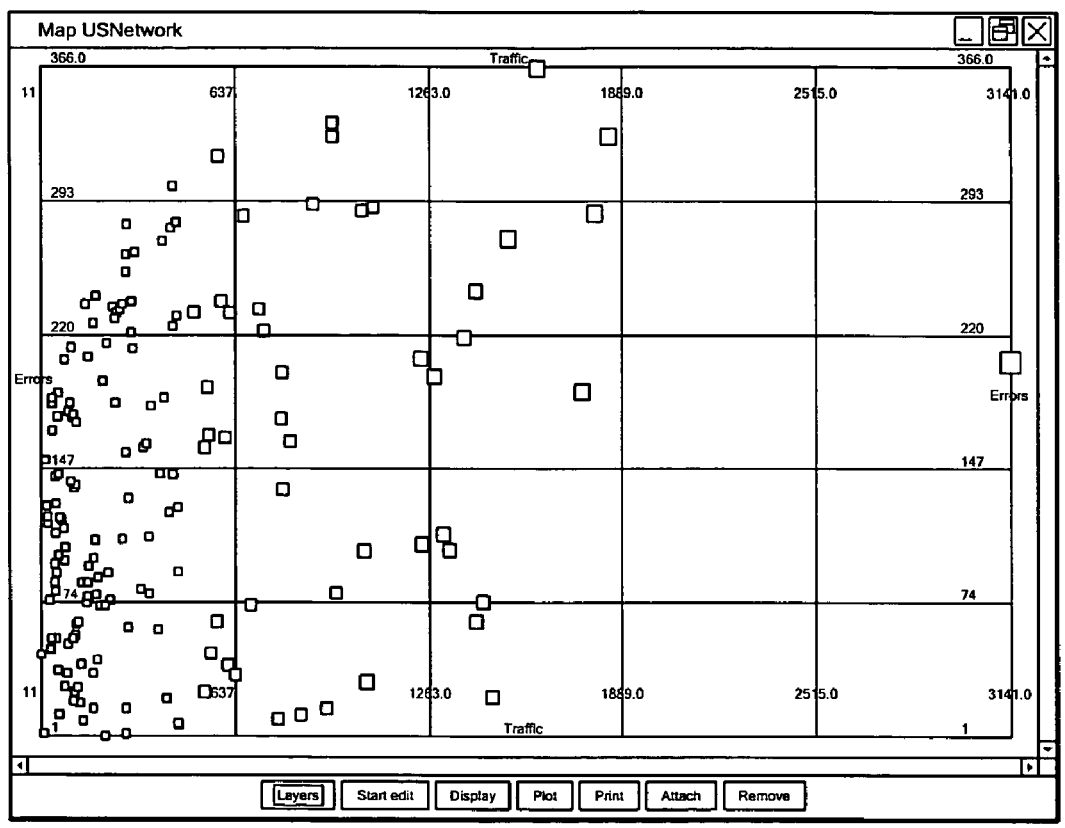

It should be understood that all map view operations are still available after plotting has been performed. FIG. 27 illustrates this by depicting the same map as FIG. 26*b* with the switches plotted in the same way, except that the rendering mode is set to "Rendering On Column" (instead of "Don't Render") and the switch labels are shown. The switch size is dependent on the traffic (which is the same column used for the horizontal axis of the plot, so the larger symbols are to the right). The switch color/shade indicates the switch status.

Figure 28:
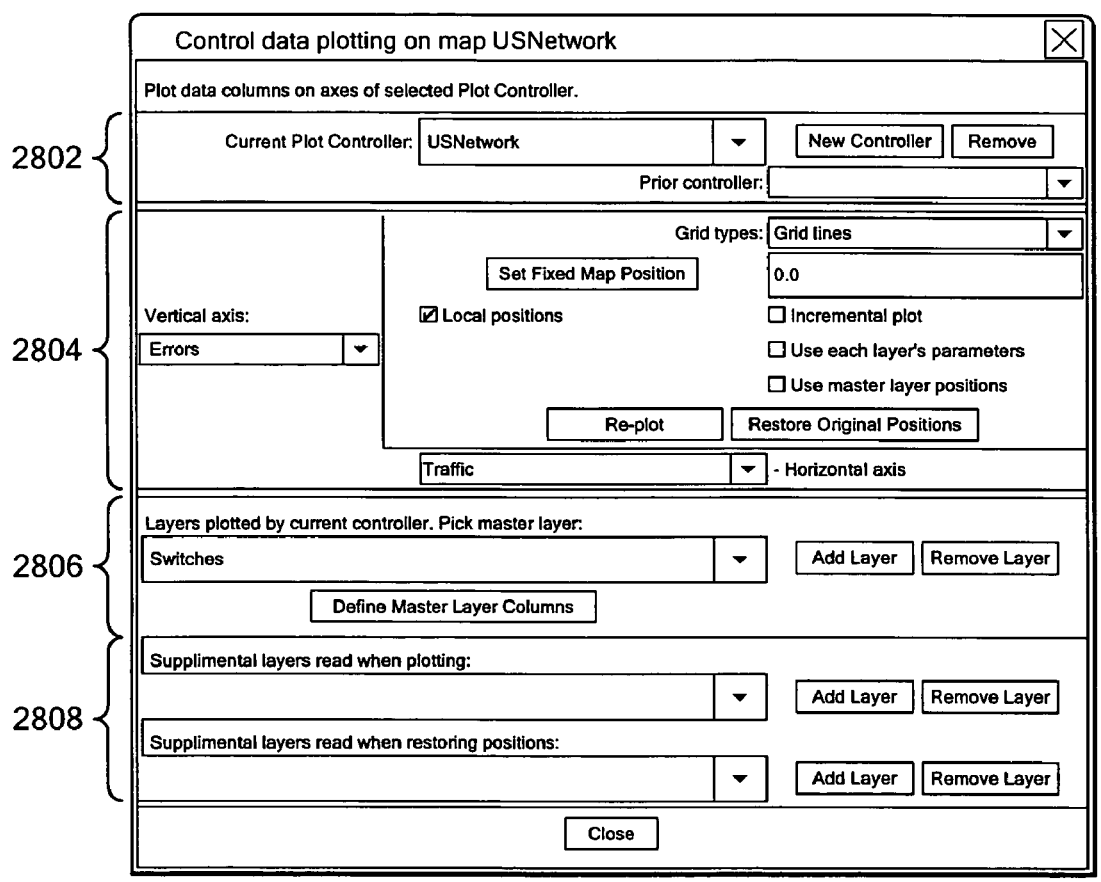

By sequencing together several plotting operations, the data exploration system 100 can generate compound plots. FIG. 28 depicts a Plot Control window used to control a map view's plotting. On the Plot Control window, plotting is controlled by named entities call "plot controllers". A plot controller controls the horizontal and vertical plotting of units in one or more layers, based on the data columns in those layers. The Plot Control window allows the viewing and setting of the parameters associated with a selected plot controller. The Plot Control window of FIG. 28 has the following four sections:

Plot controller section 2802—used to select the plot controller that the window is currently working with. Buttons are provided to create new plot controllers and to remove existing ones. Another plot controller can also be designated as the "Prior Controller", which causes that plot controller's plotting to be performed automatically before the current plot controllers plotting is performed. This allows complex "compound plots" to be constructed.

Plot section 2804—controls the current plot controller's actual plotting. The plot section allows the picking of how each axis is plotted, and detailed control of certain details of the plotting such as the type of grid used. It also has buttons to cause the plot to be performed and to be returned to original "unplotted" positions.

Master layer section 2806—controls the layer(s) whose data is used to perform the plotting done by the current plot controller. One layer is designated as the "master layer". Its data column definitions control the details of how data is plotted on each axis, including the association of a data range with map coordinates. It is the master layer's columns that may be selected for plotting on either the horizontal or the vertical axis. Additional layers can also be plotted, using columns having the same name as the columns in the master layer. Buttons are provided to add and to remove plot layers from the plot controller.

Supplemental layer section 2808—extra layers may be designated to be read when plots are performed, and also when restoring original positions. These supplemental layers are not "plotted" per se. Rather, they are simply read, which allows other activities to be performed at the time of plotting and restoring such as changing connection endpoints.

The plot controller section 2802 of the Plot Control window uses the following fields and buttons to select and to maintain the plot controller used by the associated map:

Current Plot Controller picklist—shows the name of the plot controller that the Plot Control window is currently set to. All other plot controllers are in the picklist. Picking one causes the Plot Control window to use it. A "Use default" pick causes the default plot controller for the associated map to be selected.

Prior Controller picklist—names the plot controller that should be plotted (or original positions restored) before plotting (or restoring) according to the current plot controller. This allows sequences of plots to be constructed. All plot controllers (except the current one) are in the picklist. The blank choice clears any prior plot controller.

New Controller button—allows a new plot controller to be created. The user is asked for a unique name. It will be initialized with the same layers as the current plot controller.

Remove button—removes the current plot controller completely from the system, including removing it from any maps that may currently be using it, or any other plot controllers that reference it.

The plot section 2804 of the Plot Control window uses the following fields, buttons, and checkboxes to control the actual plotting done by the current plot controller:

Vertical axis and Horizontal axis picklists—used to pick the column to be plotted on the particular axis. The columns available for both axes are all of the plotable columns in common between the master layer and the other plot layers for the current plot controller (but not supplemental layers). Plotable columns are Double, Integer, Date, Time, DateTime, and Unit columns that have plotting enabled. There are two additional pick-list choices, namely, No change—unit positions along the axis are unchanged during plotting, and Fixed map position—unit positions for the axis will be constant, using the map coordinate specified in the Set Fixed Map Position field. When a pick is made, the data plot and grid for that axis are immediately changed.

Grid type picklist—selects the type of grid to be displayed when data is plotted. Choices include Grid lines, Tick marks, and None. In the case of plotting a sequence of plot controllers (using the Prior Controller field), one of the plot controllers' grids is used. It is the grid type defined by the first plot controller in the sequence that uses a grid (grid type not "None"), and that does not use "Incremental plot".

Set Fixed Map Position button and field—allows the fixed map coordinate position to specified, which is used when an axis is plotted using the Fixed map position choice. It causes all unit symbols plotted by the controller to use the same map coordinate for that axis, creating a row (fixed vertical position) or column (fixed horizontal position) of symbols. In one embodiment, the full map coordinate range for each axis is 0-10.

Local positions checkbox—controls the scope of position changes during plotting and restoring positions. When unchecked, changes occur on all maps not in the local positions mode. When checked, changes affect only the associated map. This field has substantially the same function as the "Local positions" checkbox on the Map Display Control window.

Incremental plot checkbox—when unchecked, units are positioned as absolute positions using the plot parameters. Checking causes plotting to be incremental offsets along each axis from each unit's current position. Can be used in conjunction with the "Prior Controller" picklist. Incremental plot allows complex compound plots to be constructed.

Use each layer's parameters checkbox—when checked, units in non-master plot layers are plotted using their own plot definition parameters (Plot data range, Plot map range). When unchecked, the master layer's parameters are used for all plot layers in the plot controller.

Use master layer's positions checkbox—when checked, units in non-master plot layers are positioned to the same position as their parent unit in the master layer (if any). Positions of master layer units are unchanged. This operation is done instead of plotting units based on their data columns. This is useful for setting up incremental plots in a sequence when units are to be offset from their parent units.

Re-plot button—plots are executed when an axis column is picked or column parameters are changed using the Column definition window. The Re-plot button causes the currently defined plot to be executed again, which is necessary when other parameters are changed, or original positions are restored. Supplemental plot layer files are also read.

Restore Original Positions button—causes units in the plot layers to be restored to their original "unplotted" positions by reading layer files for each layer that define their positions. Supplemental restore layer files are also read.

The Master layer section 2806 of the Plot Control window uses the following fields and buttons to select the layer(s) whose data is used to perform the plotting done by the current plot controller:

Pick master layer picklist—displays the name of master layer. This is the layer whose data column definitions control the details of how data is plotted on each axis, including association of data range with map coordinates. The other plot layers whose data are plotting according to these parameters along with the master layer are in the picklist. Picking one makes it the master layer.

Define Master Layer Columns button—brings up a Define Layer Columns window for the master layer, which permits control of plot parameters for each column. After changing plot parameters, the Re-Plot button can be used to change the plot itself.

Add Layer button—allows plot layers to be added to the current plot controller. The user is presented with a list of eligible layers to select from. The selected layer is added to the Pick Master Layer picklist. Axis columns are adjusted to make available columns in common between all plot layers now in the current plot controller (including the layer just added).

Remove Layer button—allows plot layers to be removed from plot controller. The user is presented with a list of the current controller's layers to select from. If the master layer is removed, then one of the remaining plot layers (if any) is arbitrarily selected as master layer.

The Supplemental layer section 2808 of the Plot Control window uses the following fields and buttons to select the supplemental layer(s) to be read when the current plot controller performs its plot and when it restores original positions:

Supplemental layers read when plotting picklist—displays names of layers which are re-read when the current plot controller's plot operation is performed. When blank, no supplemental layers are read during plotting.

Add Layer button—adds an additional supplemental plot layer to the current plot controller. The user is asked to pick a layer from a list of eligible layers.

Remove Layer button—removes a supplemental plot layer from the current plot controller.

Supplemental layers read when restoring positions picklist—displays names of layers which are re-read when the current plot controller's restore original positions operation is performed. When blank, no supplemental layers are read while restoring positions.

Add Layer button—adds an additional supplemental restore layer to the current plot controller. The user is asked to pick a layer from a list of eligible layers.

Remove Layer button—removes a supplemental restore layer from the current plot controller.

Figure 29:
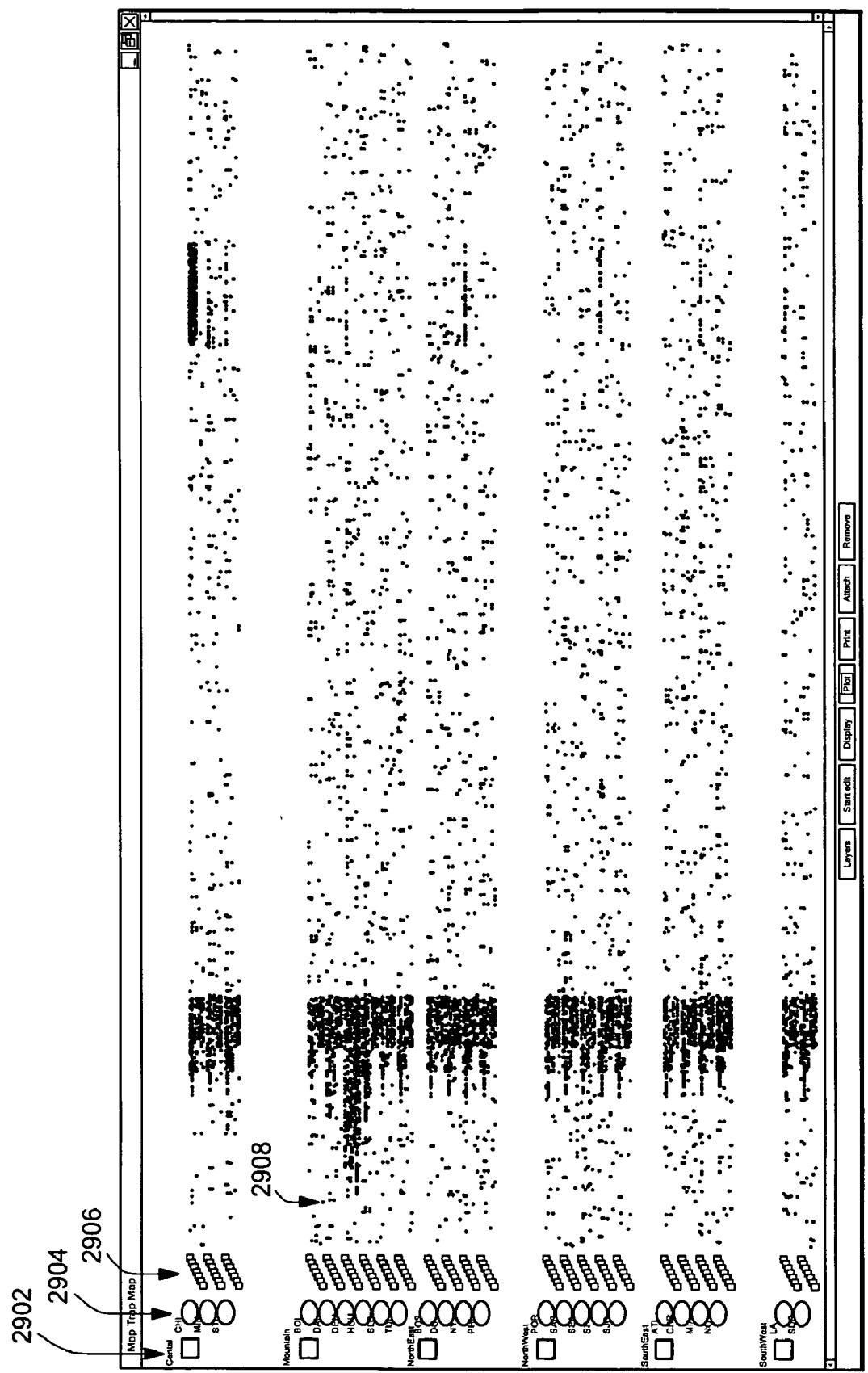

A sophisticated plot example, referred to herein as a "Trap Map", is shown in FIG. 29. The Trap Map explores a different aspect of the same network data used in the USNetwork map. Specifically, as events occur in a network, devices such as switches produce messages that announce what has happened. These messages are typically called "traps". Originating from the switches themselves, traps are received by the management system that monitors the network. Information in each trap message includes its source (e.g., the switch), when the trap was sent (e.g., a date/time stamp), and what happened (e.g., a code). As major events occur in a network (perhaps caused by the proliferation of a virus), many traps can be generated from many switches. Their interpretation can be challenging. The USNetwork used in this illustrative example has 168 switches that together produced over 8,000 traps in a single day.

The data exploration system 100 can be used to sort through the Trap Map shown in FIG. 29. Specifically, each switch 2906 is a separate row on the map. They are grouped by Region 2902 and City 2904. The symbols representing each region 2902, city 2904, and switch 2906 appear on the left side of the map. The small rectangular switch symbols 2906 are staggered horizontally within each city to minimize their overlap. Each trap is represented by a black dot symbol in the same row as the switch that generated it. The horizontal axis for the traps is the Date/Time the trap was generated. In other words, Trap Map shows the distribution of 8,000+ traps over source and time.

As shown in FIG. 29, patterns emerge from the data plot. For example, about 10% into the day (corresponding to the approximate time indicated by numeral 2908), something happened on a single switch that caused it to generate many traps. Frequent trap generation spread to other switches, first within the same city, then to other cities in other regions. But this view of the Trap Map could just be the start of an investigation. All of the data from each trap is available. The Trap Map can be rendered based on that data to show what event was represented by each trap.

FIGS. 30*a*-30*h* depict a sequence of eight plot controller executions used to make the compound plot of FIG. 29. Specifically, FIGS. 30*a*-30*h* depict the progressive arrangement of unit symbols as each of the plot controllers was executed. It is noted that the user does not need to execute all the steps separately. Instead, the last plot controller may be invoked to make the plot. By way of the "Prior Controller" field (see the Plot controller section 2802 depicted in FIG. 28), the entire sequence is executed at once, producing the final plot shown in FIG. 29. To show how the various plot features work together, each step is summarized below.

Figure 30A:
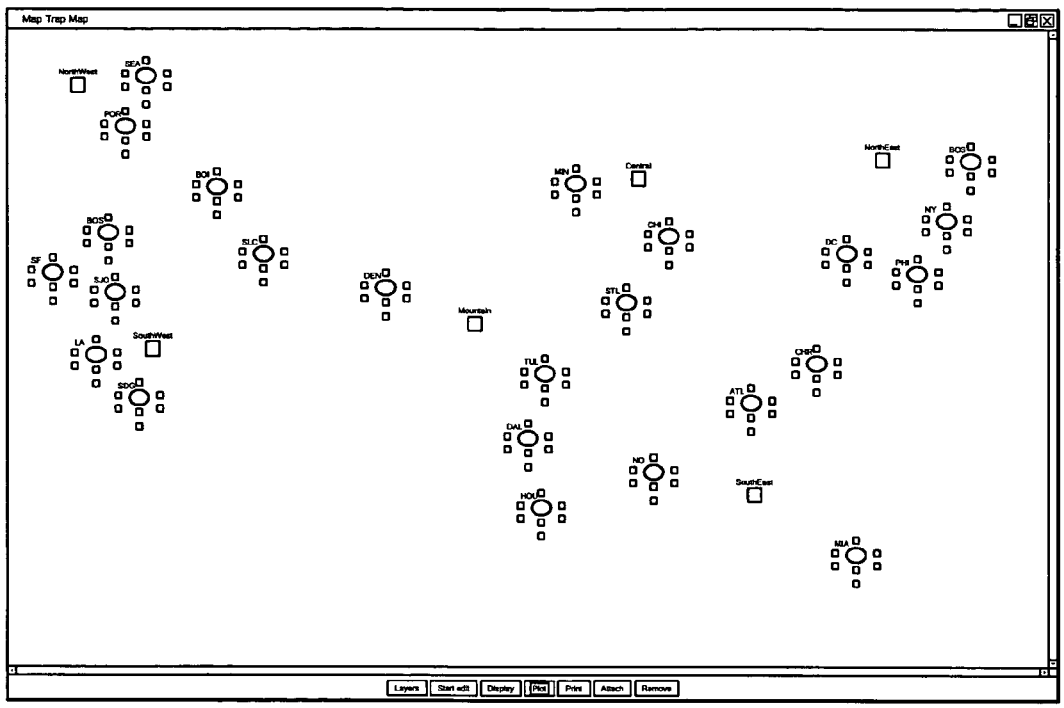

FIG. 30*a*—original appearance of Trap Map, prior to plotting. Regions, Cities, and Switches are at their original positions, as viewed on the USNetwork map examples. On the Trap Map, symbols are smaller, and regions are represented as squares rather than the horizontal rectangles used on USNetwork map.

Figure 30B:
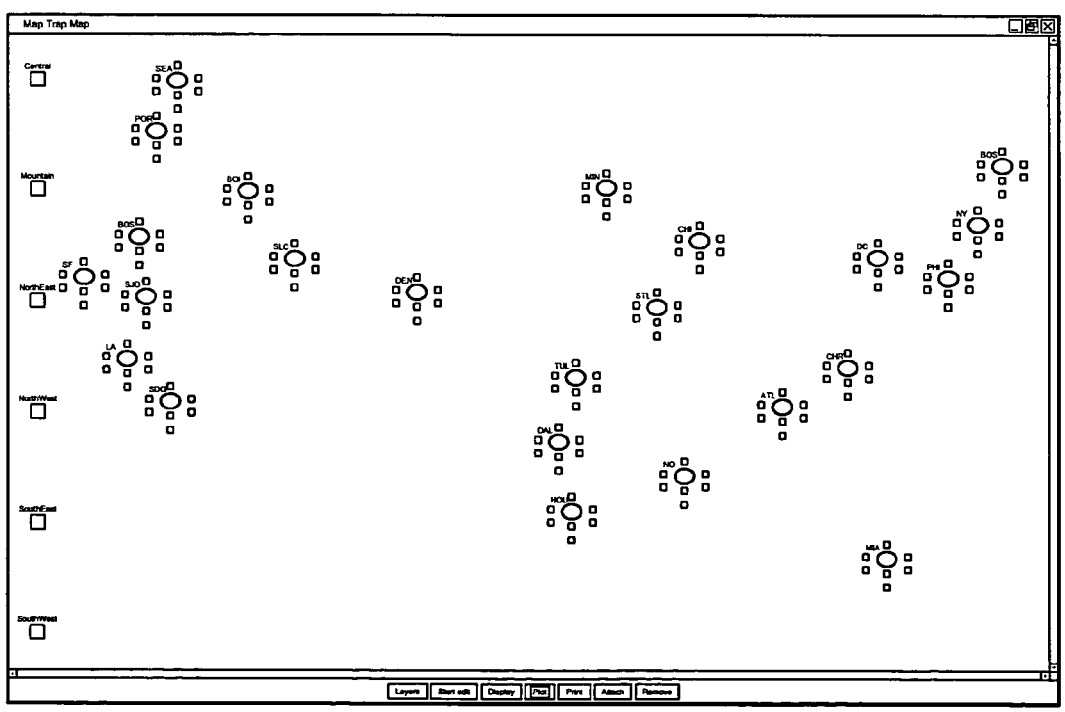

FIG. 30*b*—regions are plotted to be arranged in a single column on the extreme left side of the map. A Fixed Position is used for the horizontal axis and a sequence number (column RegionIndex) for the vertical.

Figure 30C:
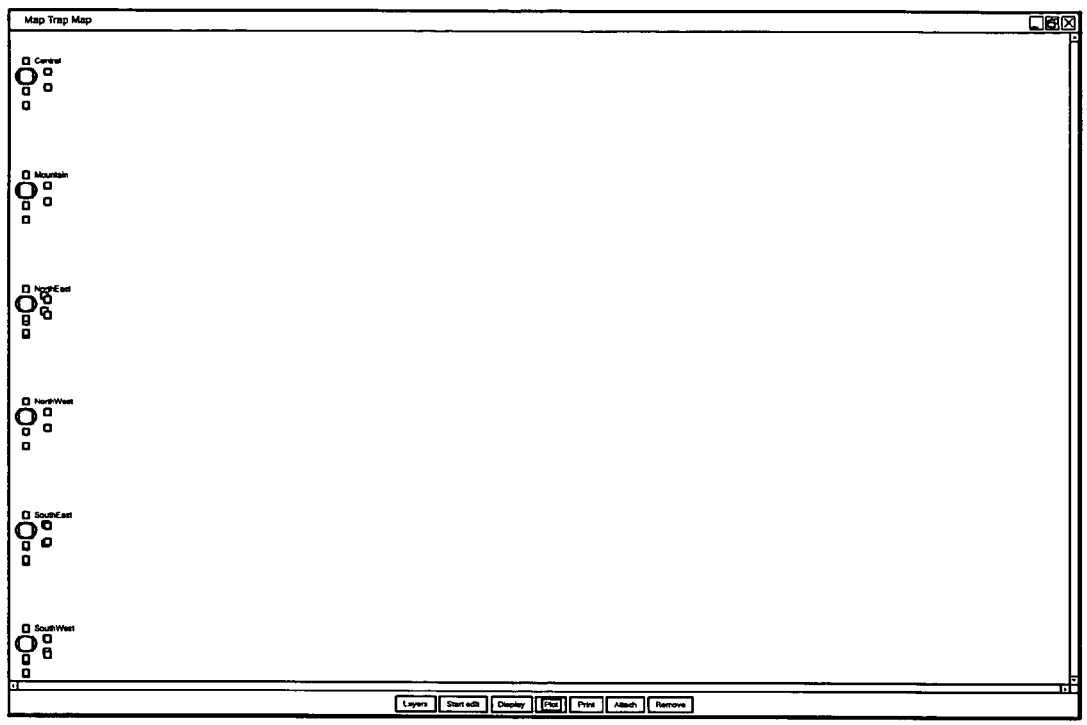

FIG. 30*c*—cities are relocated to the same positions as their parent region. This plot operation uses the "Use master layer positions" feature (see the Plot section 2804 depicted in FIG. 28). It is noted that the switches also change position in this step. This is because the switches use the relative positioning option to be positioned relative to the city that contains it. It is also noted that the switches still have the same relationship to the cities arranged around them.

Figure 30D:
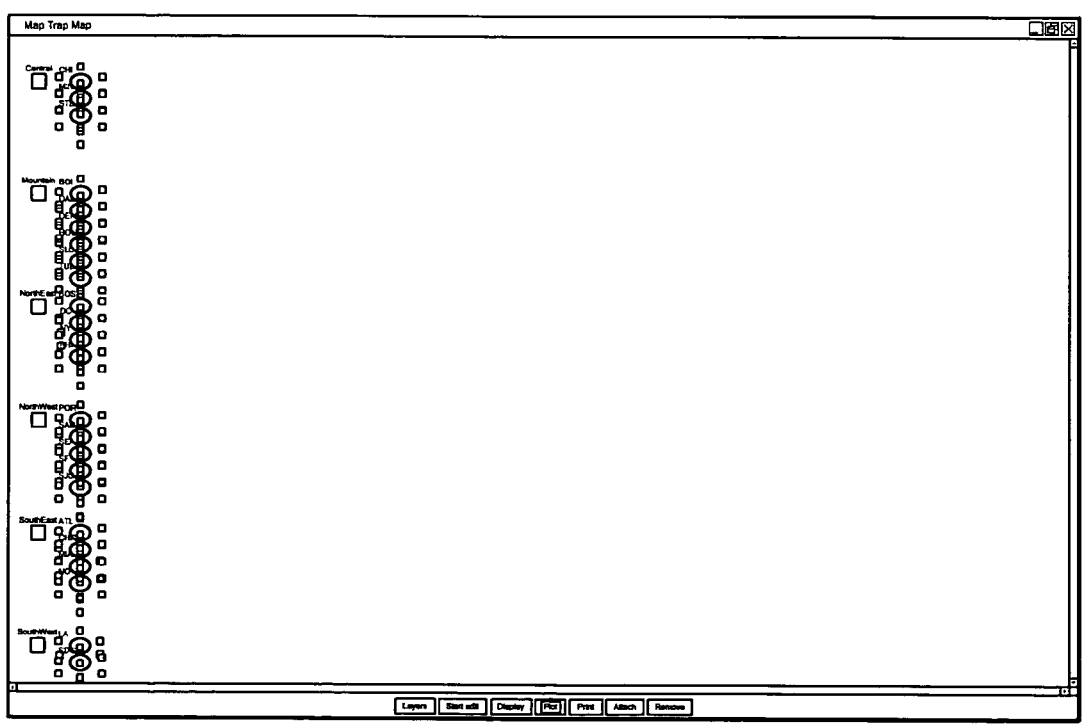

FIG. 30*d*—cities are positioned relative to the region that contains it. The Incremental plot option (see the Plot section 2804 depicted in FIG. 28) is in effect. Each city is offset from its current position (the region position). A Fixed Position is used for the horizontal axis. The vertical axis is a sequence number (column RegionCityIndex). The switches move along with their cities, for the same reason as described with reference to FIG. 30*c*.

Figure 30E:
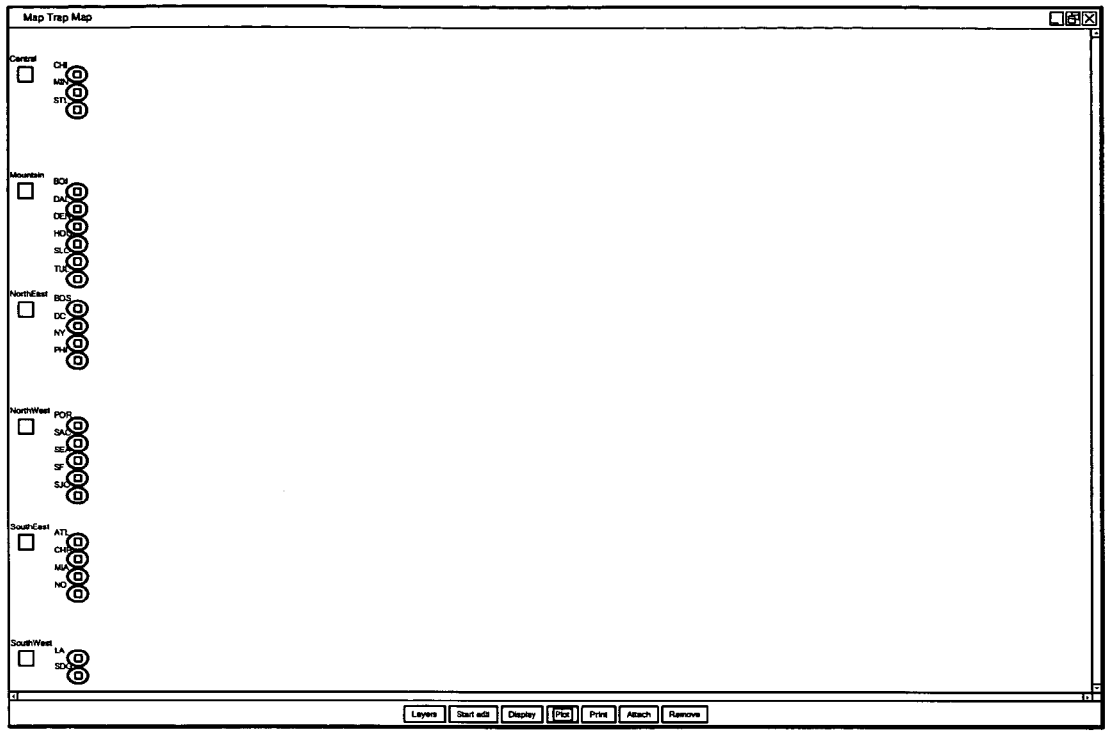

FIG. 30*e*—switches are relocated to the same positions as their parent city. This uses the "Use master layer positions" feature (see the Plot section 2804 depicted in FIG. 28).

Figure 30F:
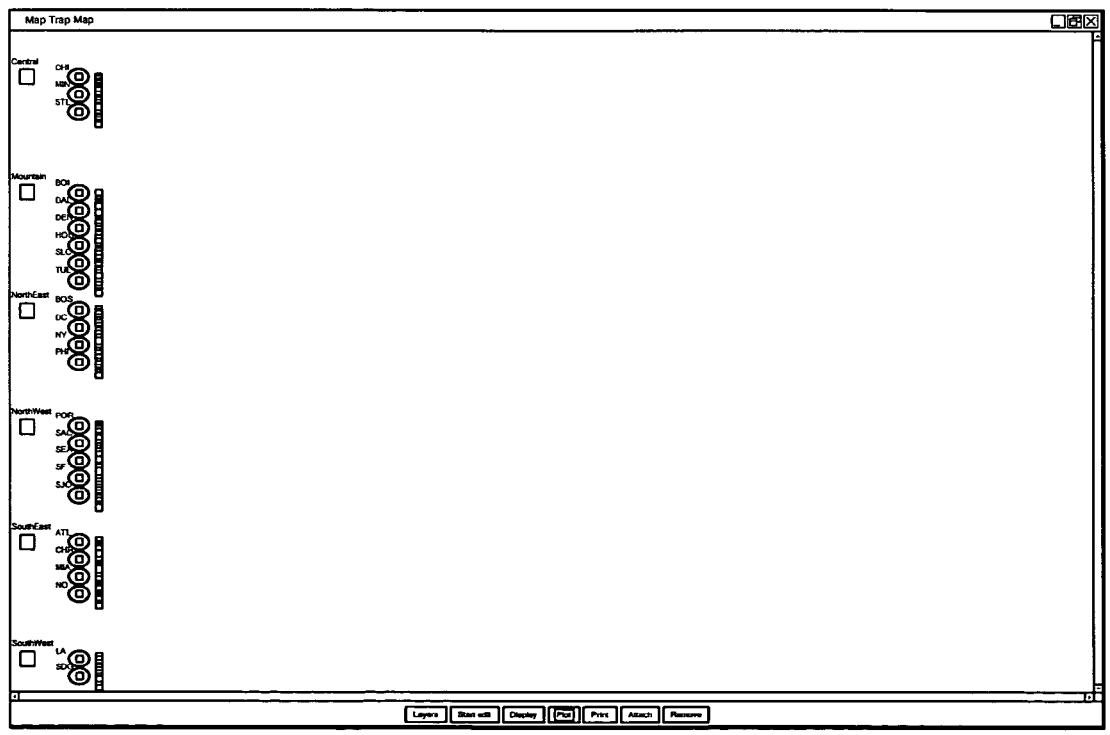

FIG. 30*f*—switches are positioned relative to the city that contains it. The Incremental plot option (see the Plot section 2804 depicted in FIG. 28) is in effect. Each switch is offset from its current position (the city position). A Fixed Position is used for the horizontal axis. The vertical axis is a sequence number (column CityIndex).

Figure 30G:
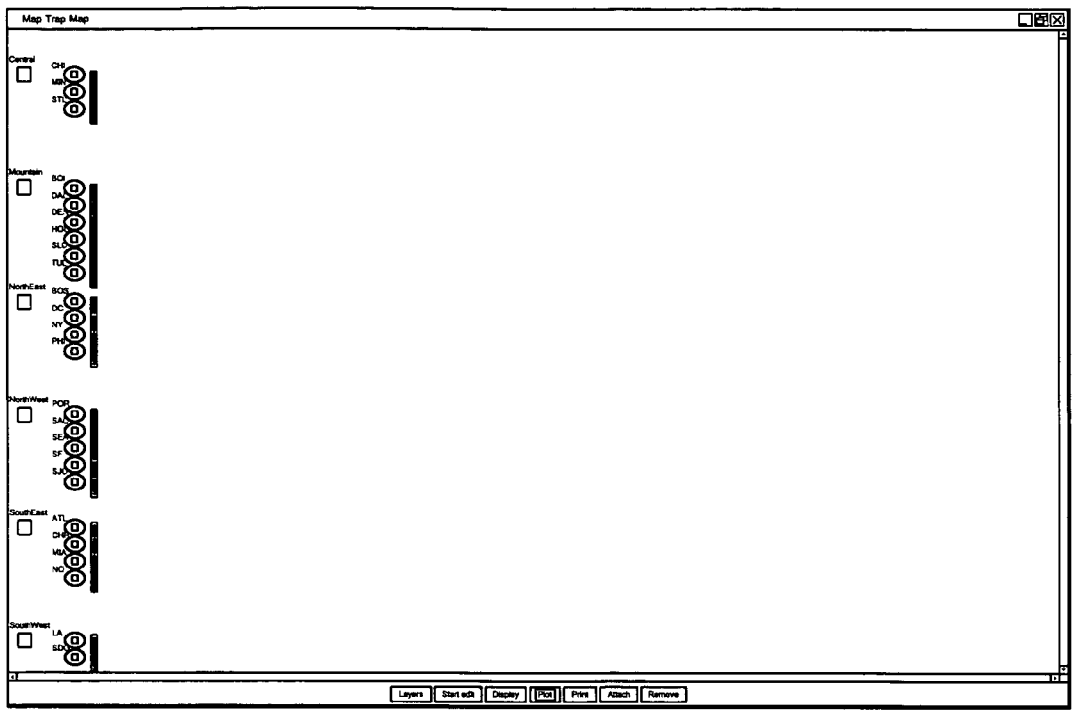

FIG. 30*g*—traps are relocated to the same positions as their parent switch. This uses the "Use master layer positions" feature (see the Plot section 2804 depicted in FIG. 28). The effect of this step is to cause a black dot to be located on top of each switch symbol. The dot is the symbol for all of the traps from that switch, stacked on top of each other.

Figure 30H:
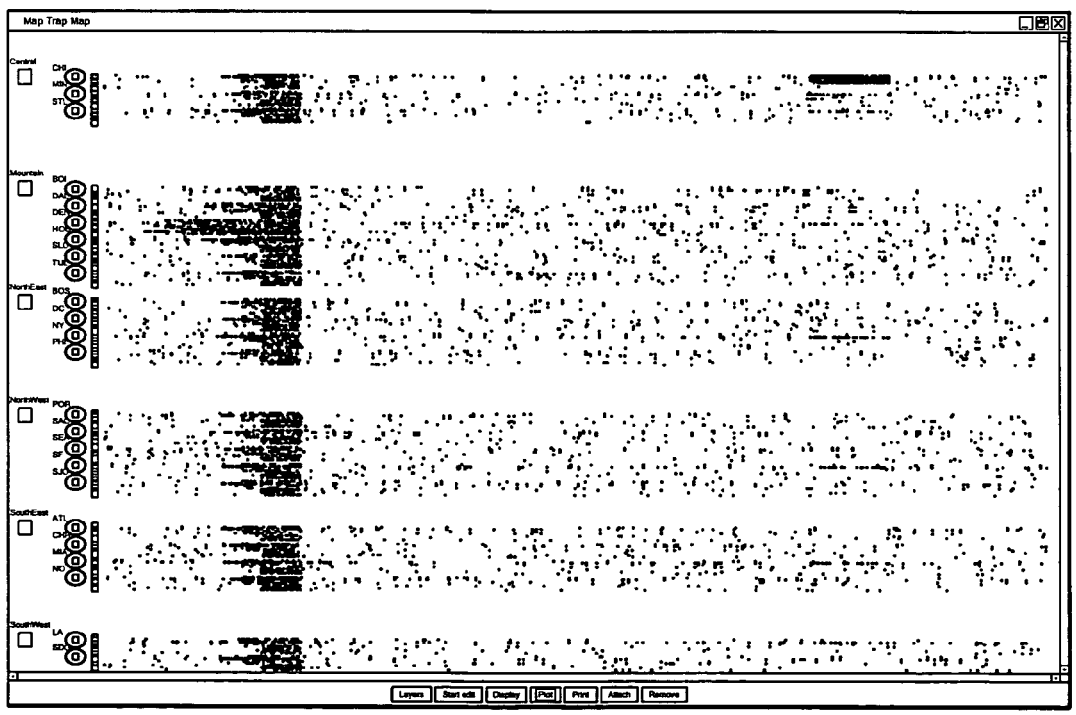

FIG. 30*h*—traps are positioned relative to the switch that generated it. The Incremental plot option (see the Plot section 2804 depicted in FIG. 28) is in effect. Each trap is offset from its current position (the switch position). The horizontal position is offset by the trap time ("When" column). The vertical axis is "No change".

The last step produces the final plot, as shown in FIG. 29. The switches are offset horizontally to reduce the effect of overlap. The Incremental plot option is in effect. The horizontal position is offset by a sequence number (column CityIndex). The vertical axis is "No change".

Tree views display data units in layers as nodes in a hierarchical tree structure. Node icons for point units are the same symbols available on maps. Node icons for connections are vertical lines. The Tree view emphasizes the hierarchical relationships between data in different layers, as expressed by the layer hierarchy, the parent/child data types, and the connectivity relationships.

The hierarchical structure of the tree can be arranged to show the hierarchical relationship between the units represented by the tree's nodes. The node hierarchy of the tree view is controlled by arranging the tree view's layer hierarchy, using the layer tree on the view's Layers & Rendering window (see, e.g., the layer tree 902 depicted in FIG. 9). The layer tree is manipulated in substantially the same way as with map views. When a layer (i.e., a child layer) is made subordinate to another layer (i.e., a parent layer) in the layer tree, nodes representing units in the child layer are made subordinate to nodes representing units in the parent layer. The mouse can now be used on the tree view itself to collapse and expand individual parent nodes, using normal Java tree functionality.

Parent/child relationships between units in parent and child layers are determined in two ways. First, parent/child relationships are expressed by parent data types (Parent, Owner, Relative, OwnerRelative) in the child layer. This is the same as the parent/child relationships used on maps. The connectivity relationships may also be employed. If the child layer is a connection layer and the parent layer a point layer, then nodes representing connections in the child layer are shown as child nodes of nodes representing their endpoint units in the parent layer. If the child layer is a point layer and the parent layer is a connection layer, then nodes representing point units in the child layer are shown as child nodes of nodes representing connections in the parent layer that use them as endpoints. These relationships are described in greater detail below.

Figure 31C:
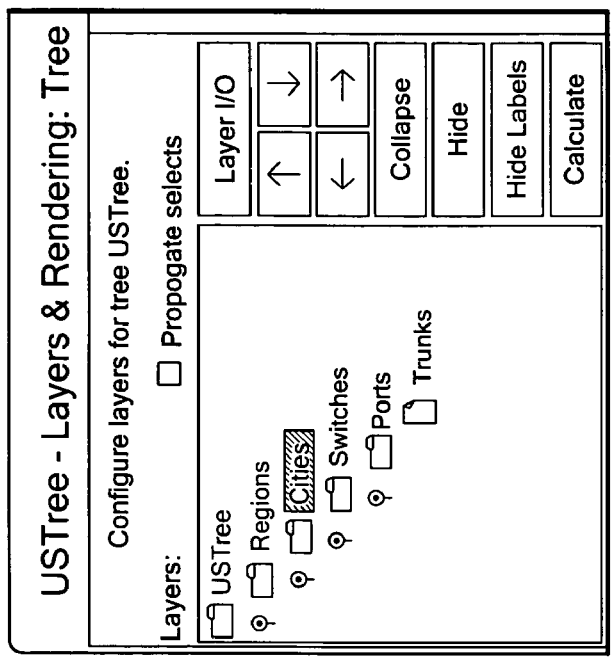
Figure 31B:
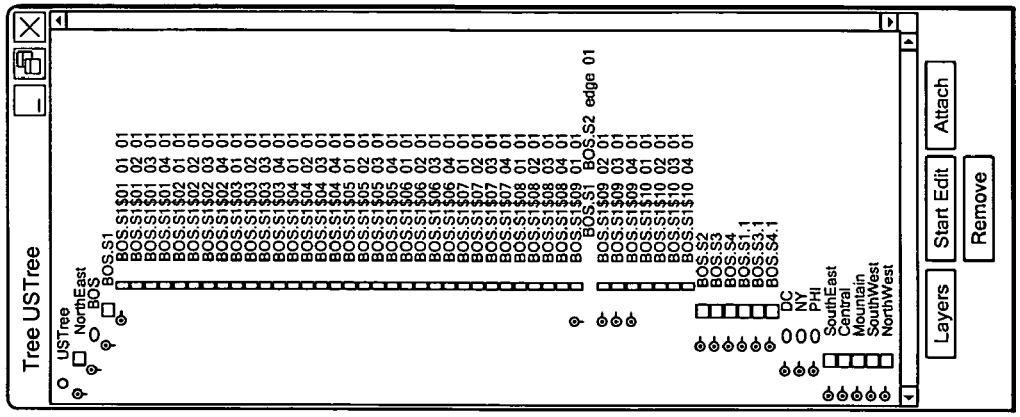
Figure 31A:
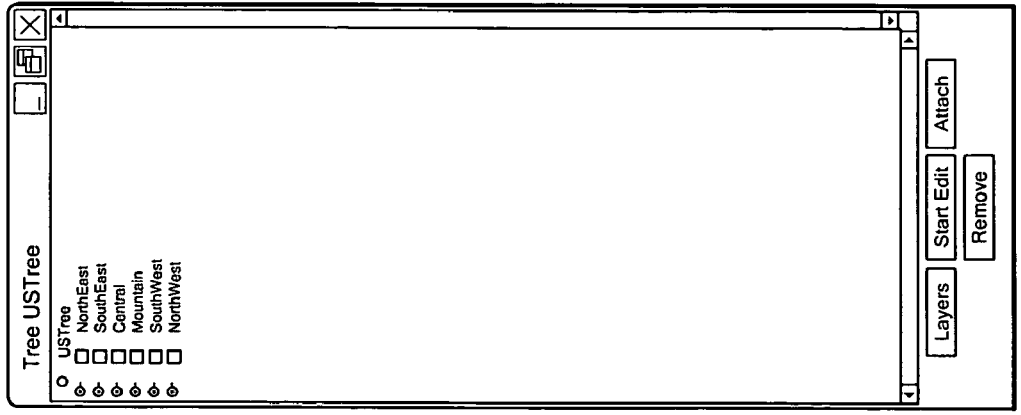

FIGS. 31*a*-31*c* depict two versions of a tree view called USTree. As shown in FIG. 31*c*, this tree view includes point layers Regions, Cities, Switches, and Ports. It also includes connection layer Trunks. The layer tree has been arranged to completely collapse the hierarchy of these layers, i.e., the trunks under the ports they are connected to, the ports under their switches, etc. FIG. 31*a* depicts the nodes completely collasped—no nodes are individually expanded. Only regions are visible. Nodes representing the rest of the network are collapsed under its particular regions.

FIG. 31*b* depicts the USTree structure with several nodes individually expanded. This is done by clicking the mouse on the node handle to the left of each node that has subordinate nodes. The region NorthEast is expended to show its cities. The city BOS is expanded to show its switches. The switch BOS.S1 is expanded to show its ports. The port BOS.S1$09__01__01 is expanded to show the trunk that is connected to it. Accordingly, as shown in FIGS. 31*a*-31*c*, Cities, Switches, and Ports can be collapsed using parent/child data relationships, and Trunks can be collapsed using connectivity relationships.

Figure 32B:
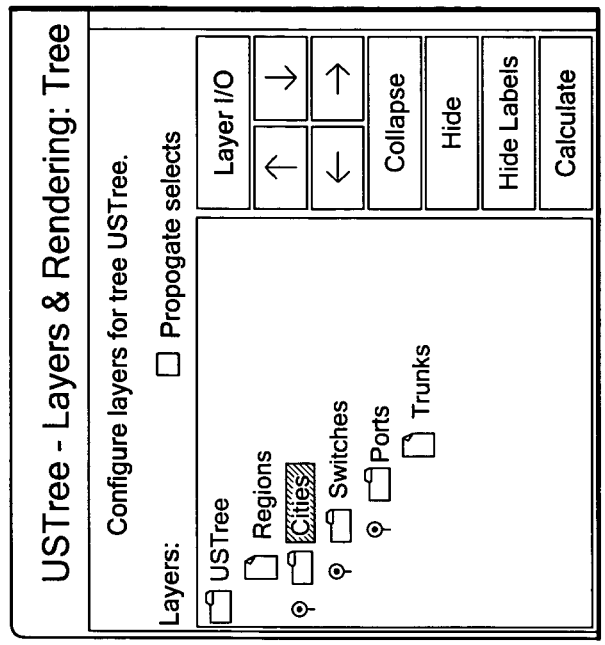
Figure 32A:
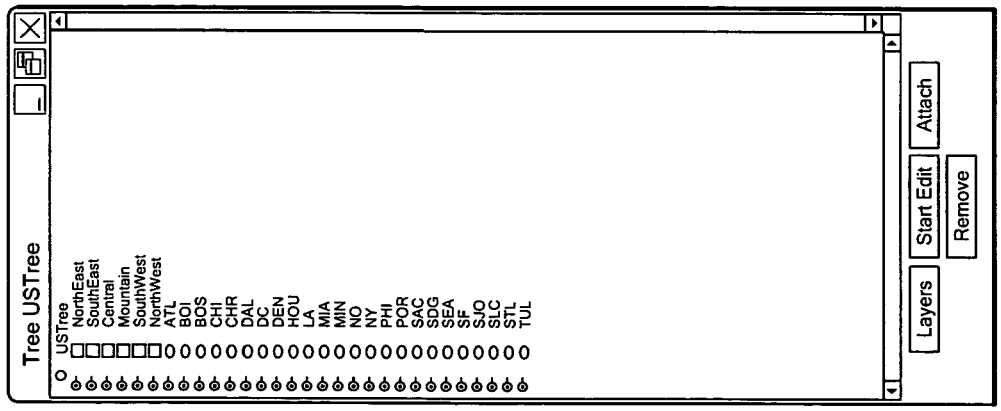

FIGS. 32*a*-32*b* depict the same tree view USTree as that shown in FIGS. 31*a*-31*c*. As shown in FIG. 32*b*, the layer tree has been changed to promote the Cities layer, which is no longer subordinate to the Regions layer. Switches, Ports and Trunks are still collapsed, as in FIG. 31*c*. The tree view of FIG. 32*a* shows this change. Nodes for both Regions and Cities are visible. Nodes for everything else are hidden—they are collapsed under their appropriate city. No nodes are individually expanded.

Figure 33B:
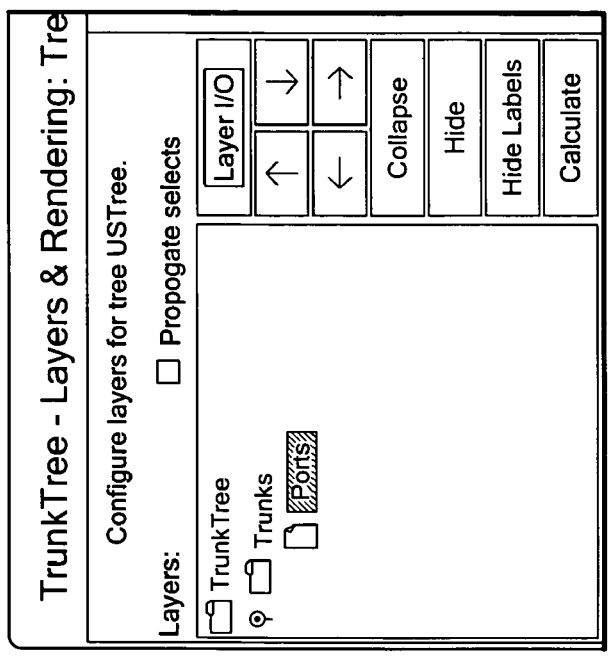
Figure 33A:
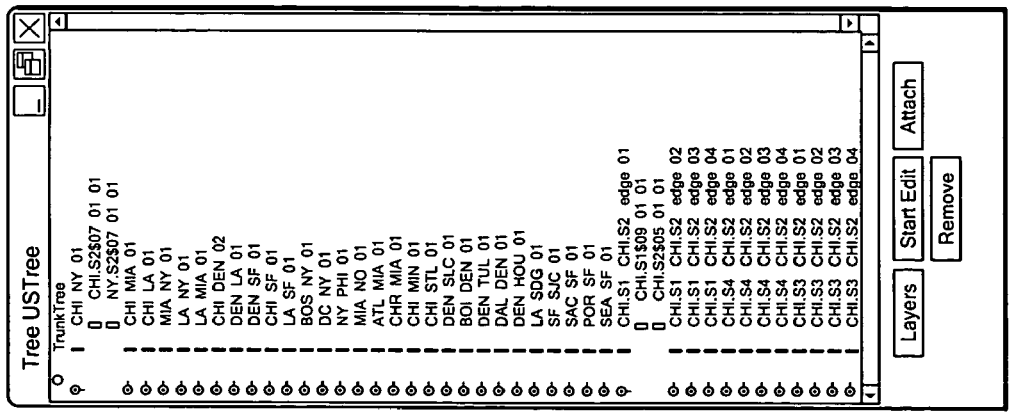

FIGS. 33*a*-33*b* depict a tree view called TrunkTree. As shown in FIG. 33*b*, it includes two layers, Trunks and Ports. The hierarchy is arranged to make the Ports subordinate to the Trunks. This utilizes the connectivity relationship to show the endpoints (ports) of connections (trunks). The nodes in the tree of FIG. 33*a* show this relationship. Trunks are visible. Their ports are collapsed below them. Two of the trunks are individually expanded (CHI_NY__01 and CHI.S1_CH.S2_edge__01), each showing its endpoint ports.

Figure 34:
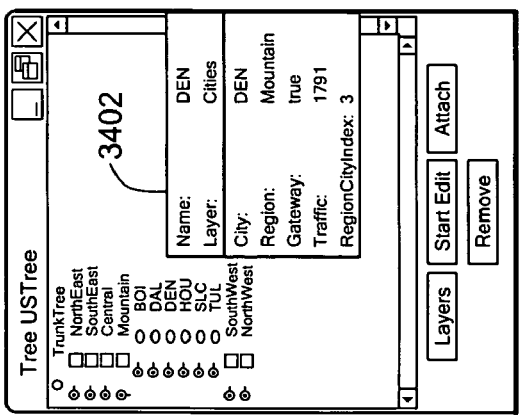

As with map views, right clicking the mouse on a unit's node causes its associated data to be displayed on a popup menu window. This popup window includes the unit's name, layer, and name/value pair for each data field. FIG. 34 depicts the USTree tree view with a popup data window 3402 displaying the data associated with city "DEN".

Figure 35B:
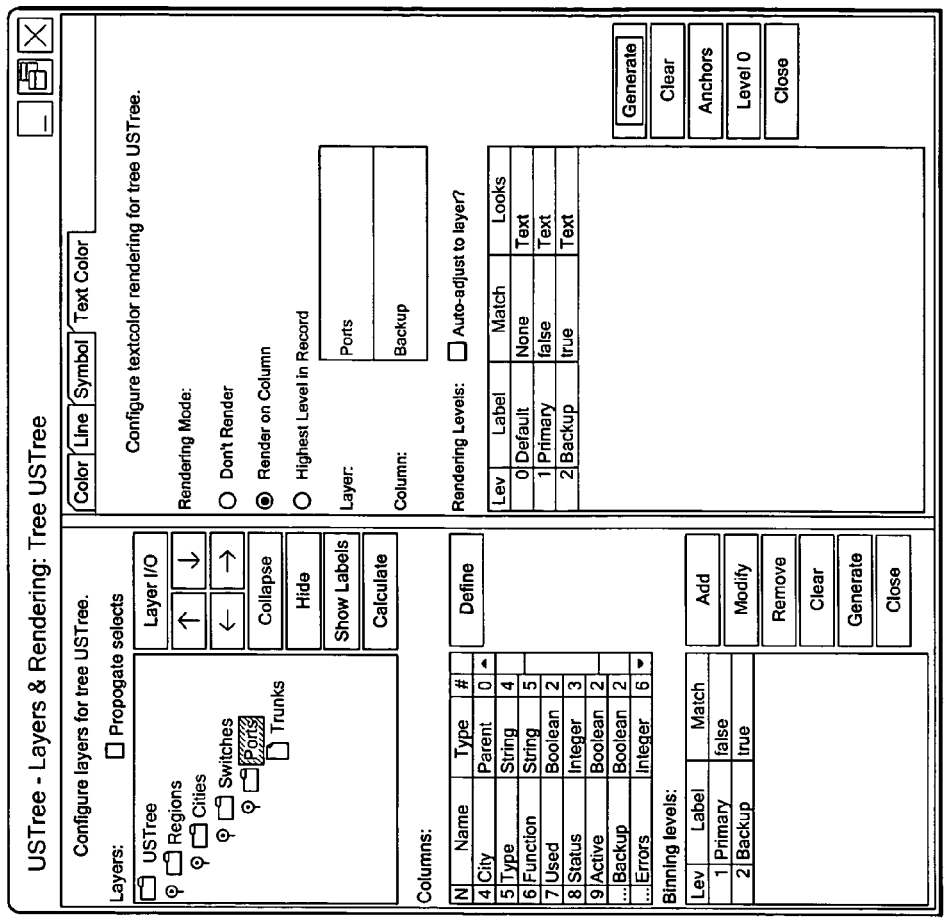
Figure 35A:
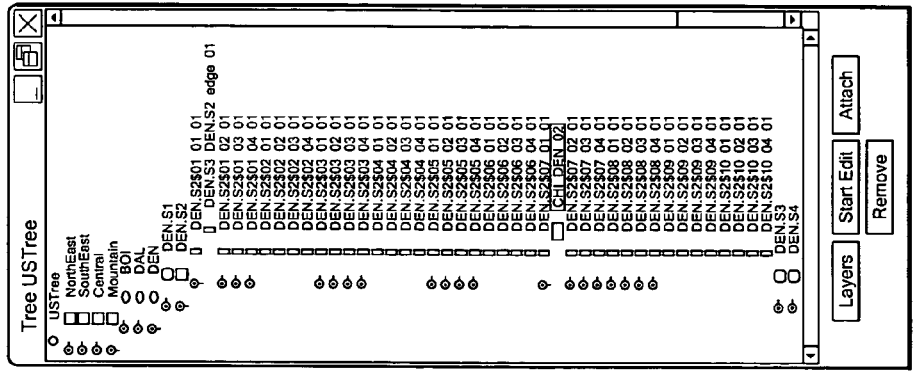

Tree view nodes can be rendered based on data. This feature is controlled in substantially the same way as map views. The rendering attributes that can be controlled include the icon color/shade, the icon symbol type (point units only), the icon line width (connection units only), and the label text color/shade. FIGS. 35*a*-35*b* depict the tree view USTree in the "Render on Column" mode.

Table views display data units as rows in a table. Table columns show the layer's data associated with each unit in the table. FIG. 36 depicts a table view named Cities, displaying the Cities layer. Table views are normally used to view a single layer of data. They can view multiple layers at the same time. In Table views, the layers are of the same type (point or connection) and have the same column structure (all columns have the same name, data type, and order). This is different from map and tree views, which have no similar restrictions on the layers they can contain.

The columns displayed on the table view can be rearranged as follows. First, the Table column display order can be adjusted by dragging the column header to a new column position. This has no effect on the order of columns in the underlying layers, just how they are displayed. Column widths can then be adjusted by dragging the separator between column headers. Clicking the mouse on a table view's column header (containing the column name) sorts the table by that column. Repeated clicks on the same column toggles between ascending and descending sort. Text columns are sorted alphabetically, numeric columns numerically. Cells with missing data sort "less than" than non-missing data. FIG. 37 depicts the same table view Cities as shown in FIG. 36, except it has been sorted by the column "Traffic".

Table view cells can be rendered based on data. This feature is controlled in substantially the same way as the map views. The rendering attributes that can be controlled include the following:

Color/shade—background color/shade of the table cell.
Font—font type, style, and size of the data value's text.
TextColor—Color/shade of data value's text.
FIG. 38 depicts the same Cities table view as in FIG. 37, sorted in the same way. It is rendered based on data.

When in the edit mode, the table cell values can be edited. Double clicking on a cell makes its text editable. For data types that support missing values (Double, Integer, Boolean, Date, Time, DateTime), editing in the keyword "missing" causes that cell's data to be set to missing. Once valid changes have been made, they replace the original value both in the cell and in the underlying data layer. All views that display that data will be updated, including all renderings based on data.

The data exploration system 100 provides features that permit views to be created, saved, organized, and cooperatively explored. Views are created from the system's Main Window (see FIG. 39), which also provides overall program control. Several other features are provided that allow multiple views to be examined at the same time, and which allow operations on one view to produce an effect on other views.

After system initialization, the main system window is displayed. This window is normally present during system operation. Menus provide the overall system control, including the following:

a. Input of projects, and saving current work as a project. A project includes all views and references to all layers that were active within the system at the time the project was saved.

b. Creating new views (Maps, Tables, Trees).
c. Using the help system.
d. Invoking custom Add On functionality.
e. Terminating system operation.

Figure 39:
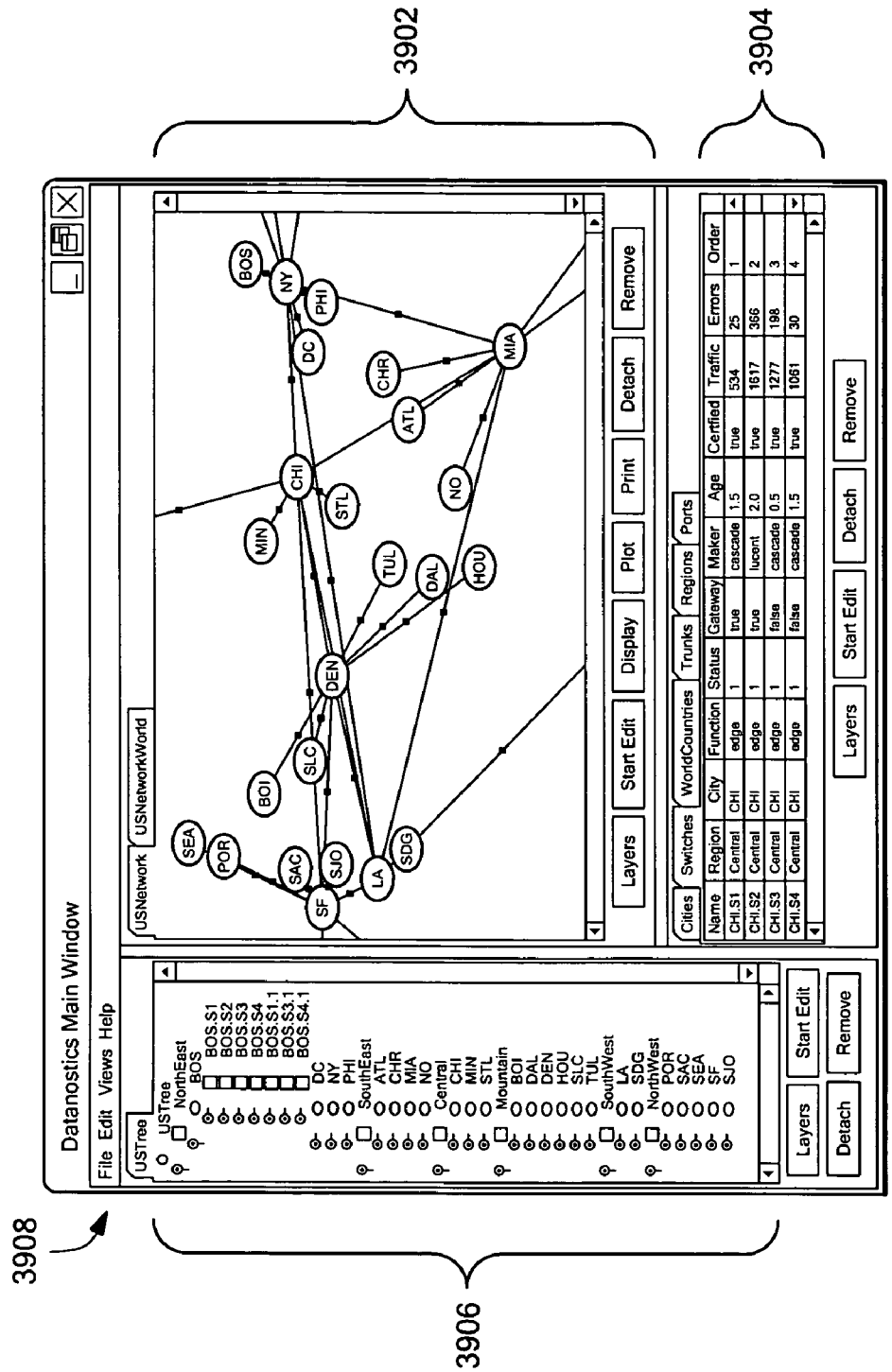

FIG. 39 depicts the system main window. It has three tabbed panels, one for each kind of view—Map 3902, Table 3904, and Tree 3906. System menus provide access to the system functions. Specifically, the File menu provides the following functionality:

Read project—read a project file. This inputs all views and layers previously saved. This is normally the first thing that it done after starting system operation.

Save project—save all current views (attached and detached) and layers to a project file and associated layer files.

Add on: custom menu choices (if any)—Optional menu choices that invoke custom functionality integrated with the system. "Add on" functionality can be used to prepare data in an application specific manner.

The Edit menu provides choices that control system configuration options.

The Views menu can be used to create new views, adding them to the appropriate tabbed panel. An empty view is created and placed on a tab, where it then may be individually loaded with data layers and configured. The Views menu provides the following functionality:

Add map—create a new map view. The user is asked for a unique map name. Empty new map appears as a map tab.

Add tree—create a new tree view. The user is asked for a unique tree name. Empty new tree appears a tree tab.

Add table—create a new table view. The user is asked for a unique table name. Empty new table appears as a table tab.

The Help menu provides the following functionality:

Help window—brings up a new Help window, which provides information organized by Terms, Topics, and Windows.

Disable tool tips—user interface components have "tool tips" associated with them, which is a short phrase describing the component. When enabled, the tool tip is automatically displayed when the mouse lingers over the component. "Disable tool tips" disables the display of tool tips. When disabled, this menu choice changes to "Enable tool tips", which re-enables them.

The Main window has a tabbed panel for each kind of view. If more than one instance of the same kind of view is on the tabbed panel, then clicking the mouse on a view's tab puts that view "on top", so that it can be seen by the user and worked with.

It is noted that one instance of each kind of view can normally be seen by the user at any time. For example, as shown in FIG. 39, the map USNetwork 3902, the tree USTree 3906, and the table Switches 3904 are visible, and all other views are hidden. It may sometimes be desirable to view two maps at the same time so that related arrangements can be directly compared. The data exploration system 100 allows this flexibility by providing the option to display individual views in their own standalone windows. When a view is on a Main window tabbed panel, clicking its Detach button causes that view to be removed from that tabbed panel and placed in its own standalone window. This is called "detaching the view". It can now be sized and viewed along with any other active windows. When detached, the button text changes to "Attach". Clicking the Attach button restores the view back on the appropriate Main window tabbed panel, removing the standalone window. This is called "attaching the view". For example, the-views in FIG. 39 are attached, and the views in FIG. 3 are detached.

Clicking the mouse on a unit's representation on a view causes that representation to be selected, thereby causing the representation to be highlighted. On map views, highlighting is accomplished by placing a "halo" around the unit's map symbol. On table views, it is accomplished by giving highlighted rows a different color/shade background. On tree views, it is accomplished by giving labels of highlighted nodes a different color/shade background. Normally, selecting a unit in a view highlights it only in that view. However, checking the "Propagate selects" checkbox on a view's Layers & Rendering window (see FIG. 9, above the layer tree 902) causes the same unit to be selected in all other views that show the unit. This feature is called "propagate selects".

Figures 40A, 40B:
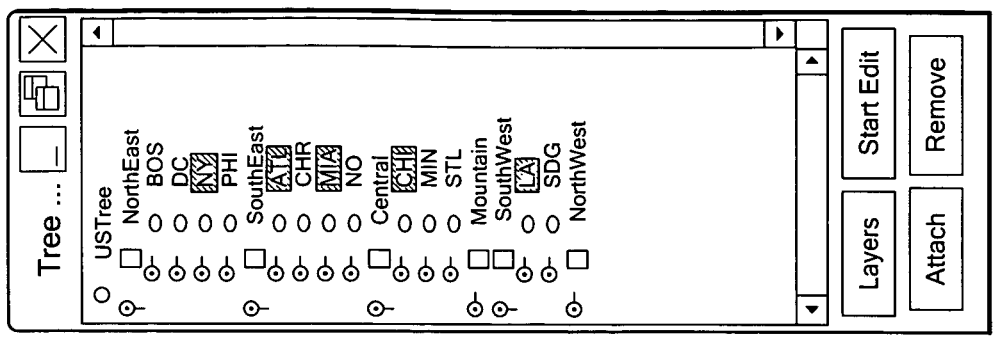
Figure 40C:
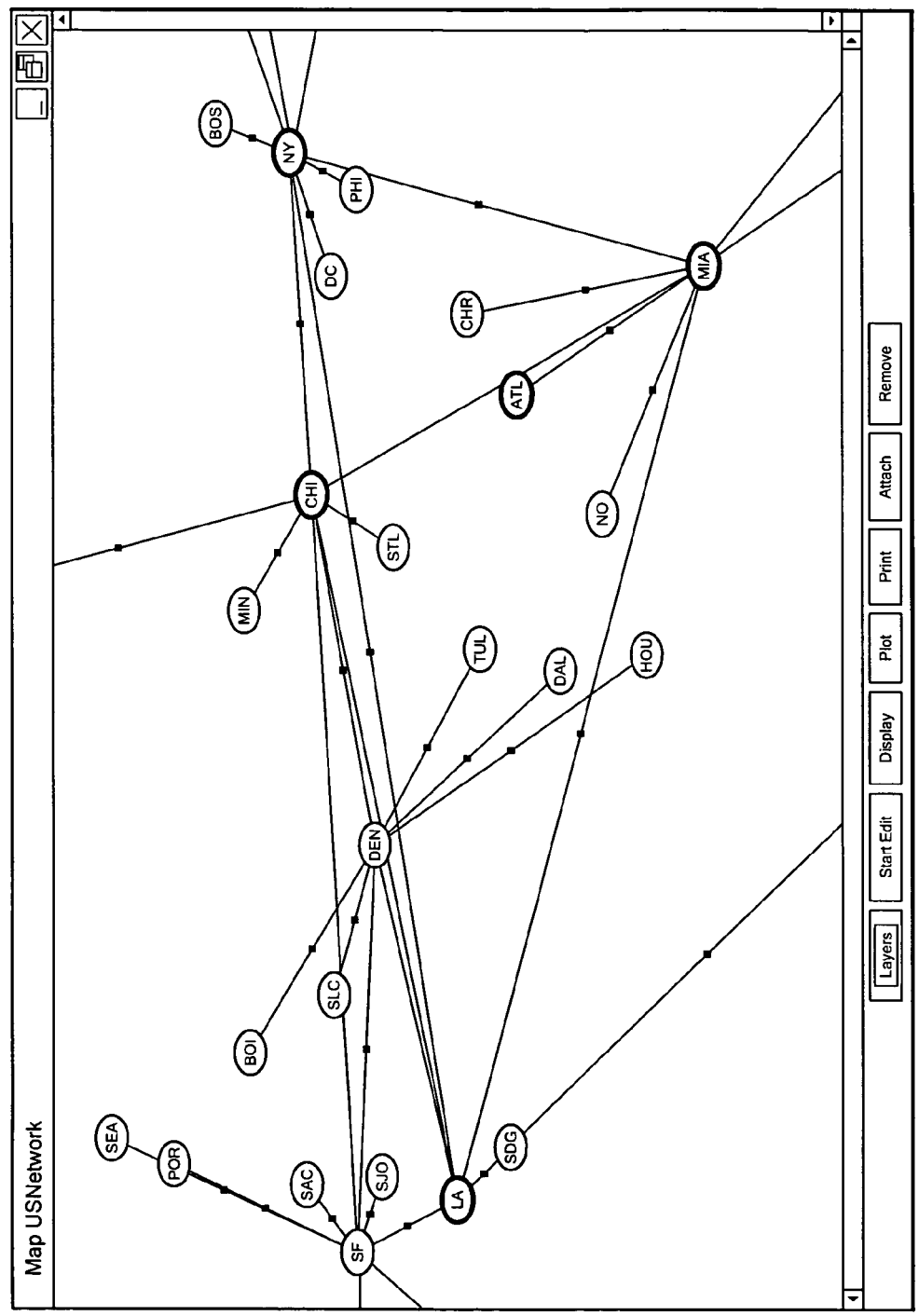

The Propagate selects feature allows units to be located on multiple views, thereby tying information together. This is particularly useful when selecting a range of units (rows) on table views that have been sorted. FIGS. 40a-40c depict an illustrative example. Table Cities (see FIG. 40a) has been sorted by Traffic, and the five cities having the most traffic have been selected. The selects are propagated to map (see FIG. 40c) and tree (see FIG. 40b) views of these cities.

A property of each point unit is its map coordinate position. On map views, this position is used to place the symbol representing the point unit. This position is a property of the unit. As a default, if the position is changed, then the location of the symbols representing this unit on all map views also change.

The "local positions" feature (see the plot section 2804 of the Plot Control window in FIG. 28) allows point units to be repositioned on an individual map view (the local map) without changing the overall position of the point unit. This allows the unit symbols to be positioned on the local map view differently than on other map views. It also keeps the positions on the local map from being changed when unit positions are changed on other map views.

Figure 41A:
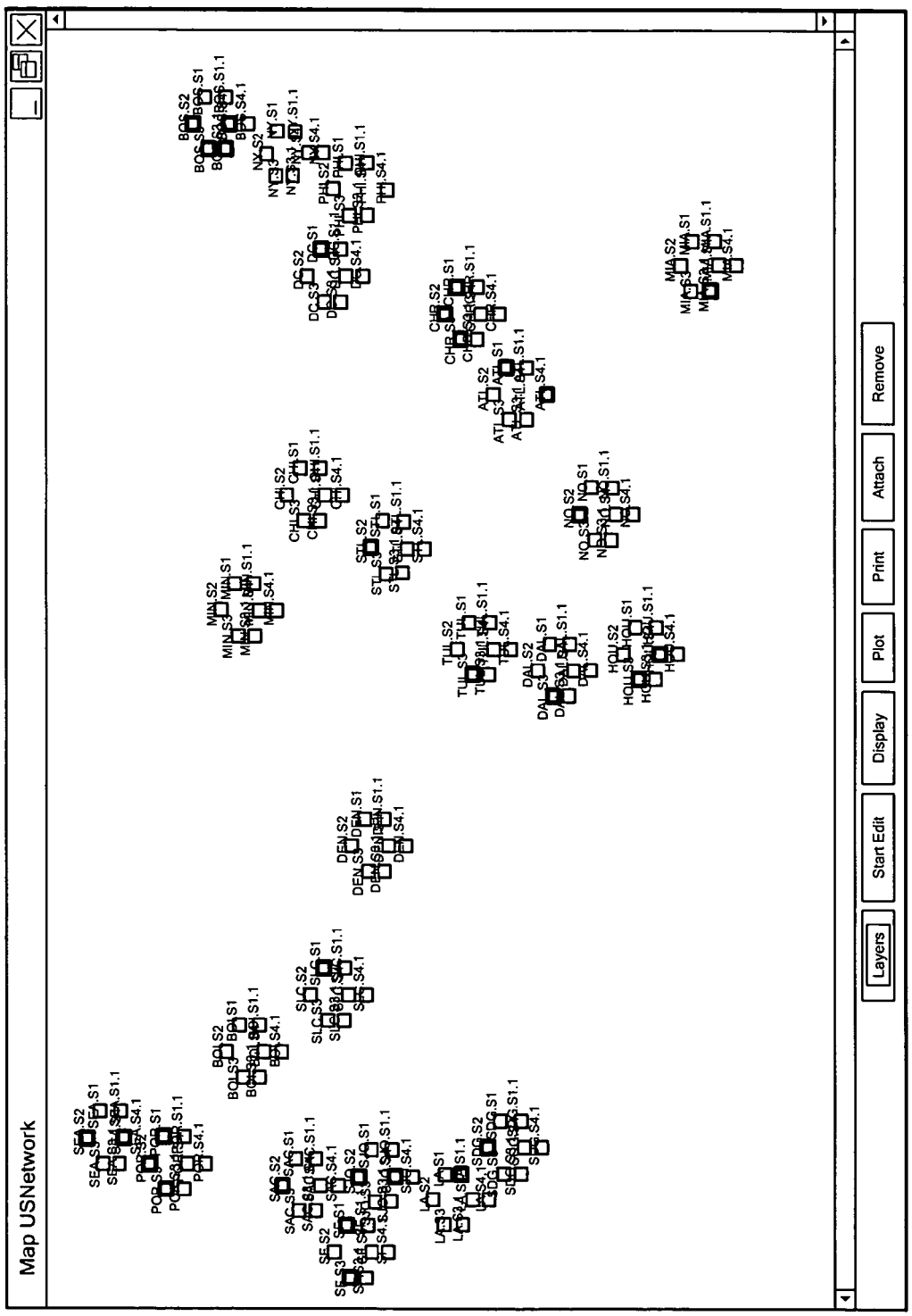
Figure 41B:
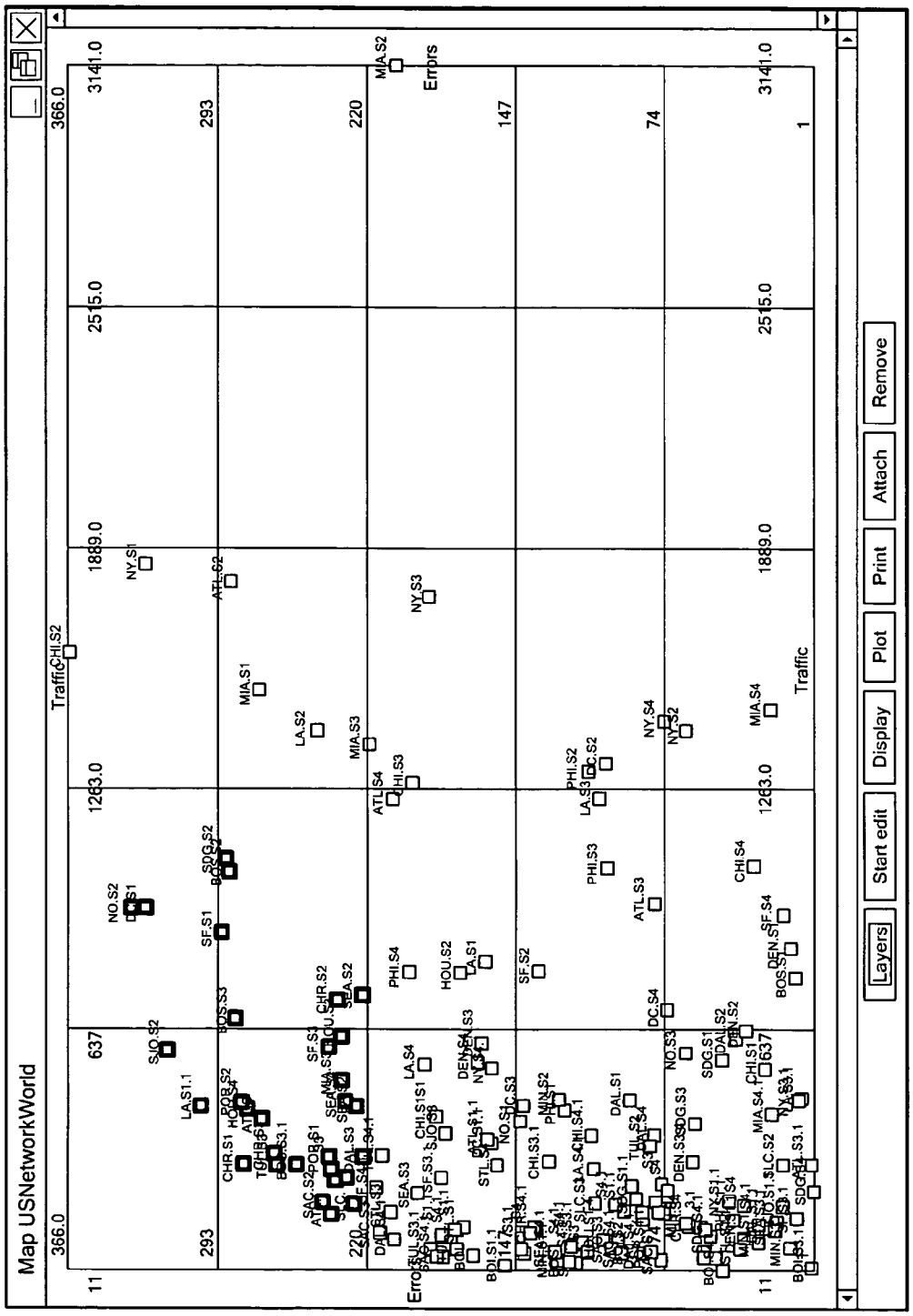

FIGS. 41a-41b depict how local positions permit side-by-side comparisons of data, using different positioning of the same units. Two map views are shown, namely, USNetwork (see FIG. 41a) and USNetworkWorld (see FIG. 41b). Each is displaying the Switches layer. USNetwork (FIG. 41a) depicts the switches at their overall unit positions, which clusters them around their city locations. USNetworkWorld (FIG. 41b) uses local positions. The switches are plotted to positions based on Errors versus Traffic. Both of these map views exist at the same time. This is illustrated using the propagate selects feature to select all switches with high errors but low traffic, and having USNetwork show how these switches are distributed over the network.

Data is organized by layer data when data is brought into the data exploration system 100 from an outside source, and when it is added to individual views. The following describes how layers are created, defined, read from outside sources, and saved. The Layer I/O window is first described because it is the primary user interface component for handling layer maintenance. Major layer maintenance features are then described.

The Layer I/O window (see FIG. 42) is the primary user interface component for handling layer maintenance. It is brought up by clicking the Layer I/O button (to the right of the layer tree 902, see FIG. 9) on the Layers & Rendering window. The Layer I/O window has three major functions, specifically, to select layers to be added and removed from the associated view, to add new layers to the system as a whole (either by reading them from an outside source or by creating and defining them from scratch), and to save existing layers to outside files, including options to save layer configuration, unit positions, and data.

Figure 42:
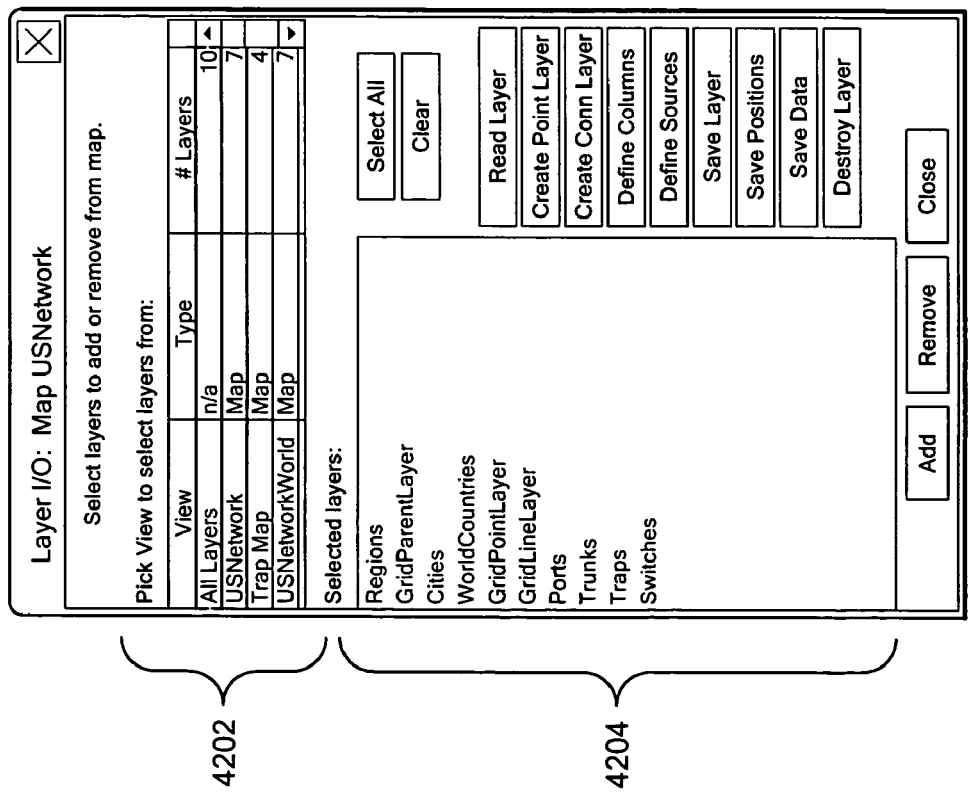

FIG. 42 depicts an exemplary Layer I/O window. It is associated with the USNetwork map view. The Layer I/O window has two sections, the Pick View section 4202 and the Select layers section 4204. The Pick View section 4202 governs the list of layers made available for selection in the Select layers section. The Pick View section 4202 includes a table having all views currently active in the system, plus an additional first row called "All Layers". The layers included in the selected view are listed in the Select layers field below. If All Layers is selected, then all layers active in the system are listed, regardless of which views use them. The Pick View table 4202 includes the following three columns:

View—the name of view, or All Layers.

Type—the type of view, i.e., Map, Table, or Tree.

Layers—the number of layers in the view. The All Layers row shows the total number of layers active in the system.

The Select layers section 4204 lists the layers to be selected, and includes buttons to associate them with the corresponding view and with outside data sources. The Select layers field lists layers eligible for selection, as controlled by the Pick View table above. There are three groups of buttons, each having a related set of functions. The three button groups include the following:

Select All button—selects all layers in the Select layers field.

Clear button—clears all selections in the Select layers field.

Layer maintenance buttons—buttons that allow layers to be created, read from outside sources, have columns defined, saved to files, and completely destroyed.

Layer to view buttons—buttons that add selected layers to or remove selected layers from the associated view. Each button also closes the Layer I/O window.

Add button—adds selected layers to the associated view.

Remove button—removes selected layers from the associated view.

The layer maintenance buttons on the Layer I/O window allow layers to be created, defined, loaded with data, saved for later use, and destroyed. The Layer maintenance buttons include the following:

Read Layer button—read data from an outside source into the system, as controlled by a layer definition file. The File chooser window is used to select the layer definition file. The actual source of the layer's data and the positions themselves are determined by the contents of the layer definition file. For example, the data sources can be delimited text spreadsheet files or databases implementing the Java database connectivity (JDBC) interface.

A layer definition file includes the layer's configuration, except for actual unit data and unit positions. This includes the layer's column structure, binning levels, default rendering attributes, column parameters, default initial states when added to views, and pointers to sources of data and position information itself.

It should be noted that when a "Read project" function is performed from the Main window (File menu), a read layer operation is performed on all layers included in the project. Separate Read Layer button operations do not have to be performed.

Create Point Layer button—create a brand new layer for point units. The user is asked for a unique name for the new layer. The newly created layer is initially empty and does not yet have data columns.

Normally, the next step after creating a layer is to use the Define Columns button to bring up a Define Layer Columns window to add data columns to the new layer.

Create Conn Layer button—create a brand new layer for connection units. This button works in substantially the same way as the Create Point Layer button.

Define Columns button—brings up a Define Layer Columns window to define the selected layer's column structure and parameters.

Define Sources button—brings up a Define Layer Data Source window to pick the actual external data source for the selected layer's data. For example, data sources may be delimited spreadsheet files or databases implementing the JDBC interface.

Save Layer button—saves the selected layer to a layer definition file. The user is asked to select a specific layer definition file; the default is the current layer definition file that will be overwritten (after confirmation). It is noted that the layer's definition is saved, not layer's positions or data. This is what needs to be saved most frequently. The Save Positions or Save Data buttons should be used if either positions or data needs to be saved.

It is further noted that when a Save project function is performed from the Main window (File menu), a save layer operation is performed on all layers currently active in the system—their layer definition files are all updated.

Save Positions button—saves the map positions of the selected layer's units. Positions are saved to a layer positions file. The user is asked to select the positions file. Positions files are automatically read when the layer itself is read.

Save Data button—saves the layer data of the selected layer's units. Data is saved to a delimited spreadsheet file, regardless of the original data source of the layer. The File chooser window is used to select the delimited text spreadsheet file. If the selected file is different the layer's currently defined data source, then the user is asked if he or she wishes to make this the defined data source for the layer (meaning that the data being saved will be read next time the layer is read).

Destroy Layer button—completely destroys the selected layer. The user asked for a confirmation. The layer is completely removed from the current session, including removing it from any views that currently contain it. Further, units included in the layer are also destroyed unless they are included in another layer. Any files associated with the layer (e.g., layer definition files, positions files, data source) are untouched.

Before creating a new layer, some planning and preparation steps are usually taken. These include gathering the data into an accessible location and format for the data exploration system 100 to access. Although data can be entered directly into the system using its editing functionality, this may not be the primary source of the layer data. Layers are normally read from some outside source. The system can be used to read data from the following sources:

Delimited spreadsheets (.csv and .txt files)—spreadsheets should be saved in one of these formats. The layer data itself should be arranged in contiguous columns and rows. The first row includes the name to be used as the layer column name for the column's data. Remaining rows include the data itself. Columns do not have to be in the same order as they will appear in the layer, and there can be extra columns in the spreadsheet, which will be ignored.

Database sources that support the Java JDBC interface—the system connects to the database from the platform on which it is running. The user needs to know how to identify the desired data in that database. This includes knowing the database table and column names of the data.

In the preferred mode of operation, the user plans how unit names are to be obtained from the data. Unit names are typically found in a single data column, but they can also be built from multiple columns using either an Owner column or a formula. The user also plans what data type to use for each column in the layer. This includes understanding how data in this layer will reference data in other layers using the parent data types. In addition, the user plans how units in the layer are to obtain their positions within the system. For connection units, this typically means how the unit will reference its endpoint point units by way of EndPoint and EndOwner columns. For point units, this normally means picking and performing one of the following techniques:

a. Position relative to units in another layer. Base units need to be referenced in a Relative or OwnerRelative column. Offsets from that base unit are normally defined in EastPos and NorthPos columns. In the illustrative USNetwork example, the Switches and Ports layers are positioned in this way (Switches relative to city, Ports relative to switch).

b. Position by map editing. This normally entails dragging the unit symbol to a location consistent with a background image. This means obtaining the background image (e.g., a .jpg or .gif file). In the USNetwork example, Regions, Cities, and WorldCountries layers are positioned in this way.

c. Position by plotting. If units are to be positioned as a function of their associated data, then no special preparation is needed at the time of initial layer definition. The appropriate plotting operation will be performed after the data is read into the layer. In the USNetwork example, the Traps layer is positioned in this way.

d. Positions embedded in original data. The data may already have associated positioning information. For example, data that resides in geographic information systems have associated geographic positioning information. Such information can be mathematically transformed to suitable coordinates and placed in EastPos and NorthPos columns.

Next, the user plans whether the original source of the layer's data is to continue to be its source as the layer is used by the system in ongoing work. Sometimes it is preferable to have ongoing work use a copy of the data, which can be accomplished by saving the layer's data after it has been received from its original source. The user then decides what view to use when creating the new layer. New layers cannot be created "on their own". It is done from an existing view. Create a new view if necessary. New layers are typically created from either a map or a table. A table is preferred if the emphasis is on inspecting the layer's data values directly once it has been read. A map is sometimes preferred if the emphasis in on positioning the data right away. In either case, the actual layer creation steps are substantially the same.

A new layer is created as follows. First, create a new empty layer. On the view's Layer I/O window (see FIG. 42), use either the Create Point Layer or the Create Conn Layer button. A unique layer name will be requested. The new layer should be added to the associated view using the Add button. Next, define the layer's columns. This is done from a Define Layer Columns window (see FIG. 43), opened from the Layer I/O window using the Define Columns button. A column is added for each column the layer is to contain. The column names match their names in the outside source. The data type is appropriate for the data. Further, at least one Unit column is defined. The Define Column window is also used to define other properties of the column. A special case is if the layer has a column that is not to be found from the layer's data source, then a formula must be defined for that column.

The layer's definition is then saved. This is done using the Save Layer button on either the Define Layer Columns window (see FIG. 43) or the Layer I/O window (see FIG. 42). This saves the definition of the layer's column structure. Next, the original data source is defined. This is done using a Define Layer Sources window (see FIG. 44), which is opened from the Layer I/O window using the Define Sources button.

Data units are read into the layer from the Define Layer Sources window (see FIG. 44), or from the Layer I/O window using the Read Layer button (see FIG. 42). If the original data source is not to be the layer's data source during ongoing work, the user can save a copy of the layer's data using the Save Data button on the Layer I/O window. For example, this data can be saved to a comma delimited spreadsheet (.csv file), which is made the current source of the data in the layer's definition.

The current system work environment can be saved as a project. This is done using the Save Project menu choice on the Main window File menu. This saves the reference to the new layer, the current state of the view (now including the new layer), and the updated definition of the new layer (including its source).

For point layers, the user can set the point unit positions either by editing or plotting. When set as desired, they should be saved using the Save Positions button on the Layer I/O window (see FIG. 42).

The Define Layer Columns window (see FIG. 43) is used to maintain the column structure of a layer. Columns can be added, removed, and modified. A layer's overall column structure consists of each column's type, name, and position relative to the other columns. A column's detailed properties control how a column's data is calculated and plotted. The detailed properties may be changed even if the layer includes data. Further, columns may be added and removed when the layer includes data. However, a column's overall structure (type, name, position) can only be modified if the layer is empty.

Figure 43:
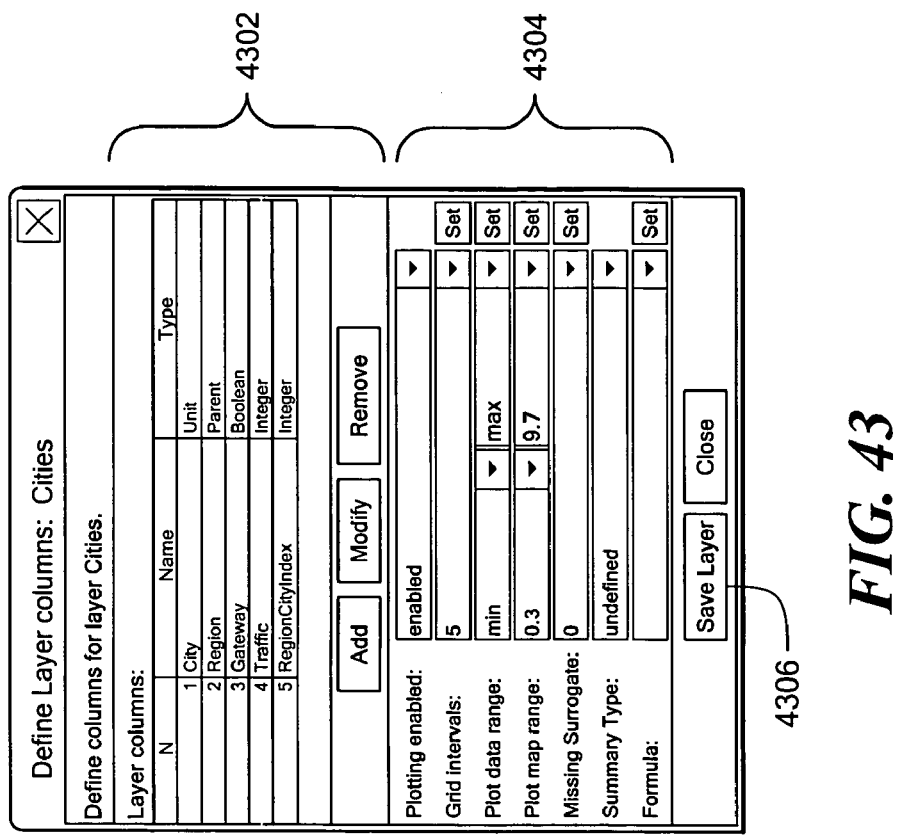

As shown in FIG. 43, the Define Layer Columns window has two major sections, the Layer columns section 4302 and the Column details section 4304. The Layer columns section 4302 includes a table showing the order, name, and type of each column in the layer. Selecting a column makes it the target of the column details section. The Layer columns section 4302 includes an Add button, a Modify button, and a Remove button. The Add button can be used to add a new column to the layer. Clicking the button brings up an Add Column popup window, which allows the columns name, position, and type to be entered. The Modify button allows modification of the selected column's name, position, or type. Clicking the button brings up a Modify Column popup window, which allows these attributes to be modified. The Modify button is typically active for layers that include no data. The Remove button removes the selected column.

The Column details section 4304 controls the detailed parameters for the selected column. This includes the parameters used to control plotting when the column is used for an axis, and a technique used to calculate data fields during calculation operations. Each field is a picklist. Further, each field has a Use default choice that restores the default parameter setting appropriate for the columns. If there is no associated Set button, making a pick causes it to immediately go into effect. Those having a Set button require it to be used to put the parameter into effect. They are used for parameters that have multiple fields (e.g., ranges), or that require typing values directly into the field.

The Define Layer Columns window also includes a Save Layer button 4306. Column detailed parameters are stored as layer parameters as part of a layer's definition. The Save Layer button is provided to allow changes to be conveniently stored.

As shown in FIG. 43, the column details section 4304 has a number of fields used to control plotting. These fields are active for plottable columns. Plottable columns are of type Integer, Double, Date, Time, DateTime, and Unit. Specifically, the Plotting enabled field causes the column to appear on axis picklists on the Plot Control window. Disabling prevents the column from appearing. The Grid intervals field relates to the number of intervals that are divided by grid lines or tick marks on plots for the axis that uses this column. The number of grid intervals is 1 greater than the number of lines that appear. This field can be used to set values other than those in the picklist. The Plot data range field relates to the range of the column's data (lower and upper values) used to plot column's data. The lower and upper values are those associated with the specified map coordinate range. "Min" and "Max" are used to set the range to actual minimum or maximum values in the column in the plot controller master layer. The Plot map range field can be used to map coordinates associated with the previously defined data range values. The full range of the system is typically 0.0 to 10.0 (unit-less numbers representing a fraction of map dimension) for each axis. The Missing surrogate field relates to values used in place of missing column data. When plotting a unit position, something needs to be done for units having a missing value in the column used for an axis. This field allows the forcing of missing values to show up at a fixed and distinct location, or to plot outside of the map range.

The Summary and Formula fields are used to calculate data values. They take effect when the Calculate button (located to the right of the layer tree 902, see FIG. 9) is used on the Layers panel of the Layers & Rendering window. Specifically, the Summary field can be used to summarize a column's data, using either overall layer unit values or layer summarization calculations. Available picks are based on the column type. In general, arithmetical techniques are available for the numeric column types (Double, Integer, Date). The Formula field relates to a spreadsheet style formula used to calculate the value of data cells in the column. When a formula is defined for a column, that column is not required to be found in the layer's data source. Formulae include operators, column references, constants, keywords, and functions. Evaluation of the formula results in an appropriate value for a cell in the column. There are three categories of formulae depending on column type, as follows.

Numeric—column types are Integer, Double, EastPos, NorthPos.

Boolean—column type is Boolean.

String—column types are String, Parent, Owner, Relative, OwnerRelative, EndPoint, EndOwner.

Layers are read from an outside source into the data exploration system 100 under the control of a layer definition file, which includes the layer's configuration except for actual unit data and unit positions. This includes the layer's column structure, binning levels, default rendering attributes, column parameters, default initial states when added to views, and pointers to sources of data and position information itself. In the presently disclosed embodiment, the layer definition file is a delimited text file, either tabbed delimited (.txt) or comma delimited (.csv).

Layers can be read using the Read Layer button on the Layer I/O window (see FIG. 42). Specifically, a file choose window is used to select the layer definition file. Layers are also read as part of performing a Read project operation from the Main window (File menu). All layers included in the project are read at this time, from layer definition files named in the project file.

Although a layer definition file may include the layer's data itself, it normally does not. Instead, the data is read from a separate data source, which is pointed to by the layer definition file. Layer data sources are configured using the Define Layer Sources window, as described below. The data sources include the following:

Text spreadsheets—tabbed delimited (.txt) or comma delimited (.csv) spreadsheet files that can be saved from spreadsheet programs such as Microsoft Excel.

JDBC database—relational database or other source supporting the JDBC interface. This includes most major relational database systems.

If positions for the layer's units have been saved using the Save Positions button on the Layer I/O window, the unit positions are stored in a separate file called a layer positions file. The layer definition file points to the layer positions file, and it is automatically read as part of reading the entire layer. In the presently disclosed embodiment, the layer positions file is a delimited text spreadsheet file having either comma (.csv) or tab (.txt) delimiters.

Figure 44:
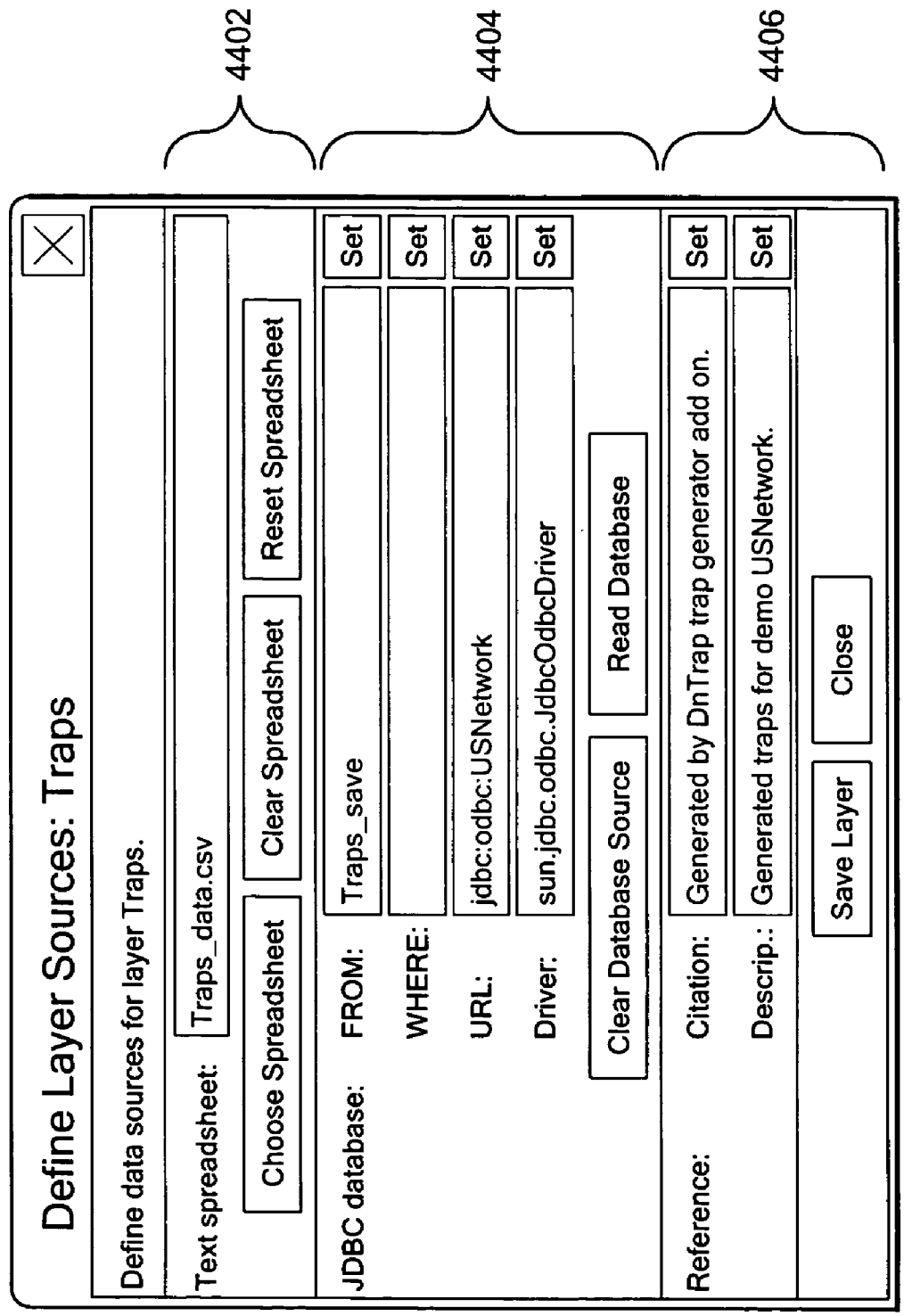

FIG. 44 depicts the Define Layer Sources window that defines both text spreadsheet and JDBC database sources for layer Traps. As shown in FIG. 44, the Define Layer Sources window has three major sections 4402, 4404, and 4406. Two of these sections 4402, 4404 can be used to configure the data source types, e.g., text spreadsheets and JDBC databases. If both are configured, the Text Spreadsheet data source takes precedence when the layer's data is read. The third section 4406 allows information reference information to be entered about the layer and its original source. Specifically, the sections are as follows.

Text Spreadsheet—configures text delimited spreadsheet files. These are either comma delimited files (.csv files) or tab delimited files (.txt files).

JDBC database—configures access to databases supporting the JDBC interface. This includes most major relational database systems, including those implementing the ODBC interface.

Reference—information references citing original source and general description of layer's data. These fields are provided for reference purposes.

The Text Spreadsheet section 4402 includes the following fields and buttons:

Text spreadsheet field—file name of the delimited text spreadsheet to use as the layer's data source. This field is set using the Choose Spreadsheet and Clear Spreadsheet buttons below. Delimited text spreadsheets eligible for use as layer data sources include comma delimited (.csv) or tabbed delimited (.txt) files that can be saved from spreadsheet programs such as Microsoft Excel.

It is noted that an algorithm can be employed in conjunction with using a text spreadsheet as a layer data source. The system ignores all rows in the file until it finds a row sensed as the column header of the data. This row includes cells containing the names of each column in the layer that does not have a formula defined. The columns do not have to be in the same order as the layer, and there can be extra columns besides those expected by the layer. Once this row has been found, all rows immediately following it are read, using cells from each column below each header column cell as data sources. Rows are read until end of file, or a row is found with not enough cells.

Choose Spreadsheet button—uses a file chooser to choose the delimited text spreadsheet data source file. The chosen file is checked to see if it has an appropriate header for the expected data, and whether any valid data rows follow this header. If the chosen file is O.K., then it appears in the Text spreadsheet field and will be used as the data source for the layer when the layer is read. Data itself is not read into the layer at this time.

Clear Spreadsheet button—clear delimited text spreadsheet as the data source for the layer. The Text spreadsheet file is cleared, and the layer does not have a configured delimited text spreadsheet data source.

Read Spreadsheet button—read the data from the defined delimited text spreadsheet file into the layer. O.K. if the layer already has data units, from any source. Newly read data take precedence. This button is normally used to test newly defined text spreadsheet data sources.

The JDBC database section 4404 is used to configure a database implementing the JDBC interface as a data source for the layer. The JDBC interface uses an appropriate driver to connect with the database designated by a URL. The system then expects compatible data columns in the database table (or tables) named in the FROM field. Each layer column that does not have a formula defined has a column in the database having the same name. They also have compatible data types. This JDBC database section includes the following fields and buttons:

FROM field—contains the database table (or tables) to be read. When blank, no JDBC data source is defined. Multi-table joins can be configured by listing more than one table, separated by commas. In this case, the WHERE field is filled out to configure the join criteria. The Set button is used to put FROM field contents into effect. The FROM field is the master field for JDBC data source configuration. Setting this field activates the other fields. When reading an entire single database table using a default driver and URL, the FROM field is the only field that needs to be set.

WHERE field—contains the SQL WHERE clause used either to filter the data being read or to specify a join criteria. This field is left blank when reading an entire single database table. The Set button is used to put WHERE field contents into effect.

URL field—contains the URL used to connect with the database. When a password is required, embed the keyword % PASSWORD % in the URL. The system prompts the user for the password when connecting with the database. The Set button is used to put URL field contents into effect.

Driver field—contains the name of the Java driver class used to access the database. The Set button is used to put the Driver field contents into effect.

Clear Database Source button—clears JDBC database source configuration for layer. The WHERE, URL, and Driver fields will become inactive.

Read Database button—read data into the layer from the currently defined JDBC configuration. When configuring a database source, the Read Database button is used to test the JDBC configuration.

The Reference section is used to capture reference information about the layer and its original data source. The fields in this section are provided for reference purposes. This section includes the following fields and buttons:

Citation field—contains a citation reference to the original source of the layer's data. It can be thought of as a footnote for the layer. The Set button is used to put the Citation field contents into effect.

Description field—contains a general description of the layer. The Set button is used to put the Description field contents into effect.

Two general purpose buttons are provided at the bottom of the window, as follows.

Save Layer button—save the layer's definition. Same as Save Layer button on Layer I/O window. Provided here as a convenience, permitting data source changes to be easily saved.

It is noted that modifications to layers can be saved. From the standpoint of saving layer modifications, layers include three kinds of information, namely, definition information, position'information, and the data itself. Each is described below.

The layer definition information is saved in a layer definition file. A layer definition file includes the layer's configuration except for actual unit data and unit positions. This includes the layer's column structure, binning levels, default rendering attributes, column parameters, default initial states when added to views, and pointers to sources of data and position information itself. This layer definition information is the part of the layer that is modified most often as data is explored. Layer definition files are saved using the Save Layer button found on the Layer I/O, Define Layer Columns, and Define Layer Sources windows (see FIGS. 42-44). Also, layer definition files are saved for all layers currently active in the system when a Save project operation is performed.

The positions of all units in a layer are saved using the Save Positions button on the Layer I/O window (see FIG. 42). Positions should be saved whenever unit repositioning has occurred within the system, and it is desired to preserve these changes.

Layer data can be saved using the Save Data button on the Layer I/O window (see FIG. 42). In the presently disclosed embodiment, data is saved to a delimited spreadsheet file, regardless of the original data source of the layer. The File chooser window is used to select the delimited text spreadsheet file. If the selected file is different the layer's currently defined data source, then the user is asked if he or she wishes to make this the defined data source for the layer (meaning that the data being saved will be read next time the layer is read).

The data exploration system 100 has functionality to derive values and new data units for layer data as a function of other layer data. This functionality enables— a. Enhanced data exploration, using the derived data directly in views.

b. Convenient generation of data to be used in plotting operations. Sequence numbers are particularly useful.

c. Generation of data units that represent summaries of other layer data. These units can then be used on views.

d. Generation of connection units that connect existing point units. These connections can then be used as data units in their own right, representing a relationship between the connected point units. Or they can simply serve as connecting lines, to assist in the making of graph style displays by plotting maps.

e. Permit the layer unit that is displayed when a layer is collapsed on a map to be rendered based on a summary of the layer's data.

On the Define Layer Columns window (see FIG. 43), columns can be configured to control how they should behave when deriving. This is done in two general ways. First, by setting the summarization rule to be used when data is either summarized from data in the data column into either the layer unit or another layer, or summarized into the data column from another layer. Second, by defining a spreadsheet style formula, used to set values of the column's data. Each technique is described in detail below. They take effect when the Calculate button on the Layer I/O window (see FIG. 42) is used.

With respect to column summarization, each column has a summary type, either for overall layer unit values or layer summarization calculations. In general, arithmetical techniques are only available for numeric column types (Double, Integer, Date). They are controlled on the Summary Type field of the Define Layer Columns window (see FIG. 43). When used in an operation that summarizes data from one layer (source) into another (target), the summary type for the target layer's column takes precedence, unless it is set to the undefined setting. In that case, the summary type from the source layer is used.

Each column can have a spreadsheet style formula defined. It is used to calculate the value of data cells in the column. Formulae may be defined for any kind of column. When a formula is defined for a column, that column is not required to be found in the layer's data source. Formulae include operators, column references, constants, keywords, and functions. Evaluation of the formula results in an appropriate value for a cell in the column. There are three categories of formulae, depending on column type, as follows.

Numeric—column types are Integer, Double, EastPos, NorthPos.

Boolean—column type is Boolean.

String—column types are String, Parent, Owner, Relative, OwnerRelative, EndPoint, EndOwner.

Each formula category is described below. Operators, keywords, and functions are each described. In general, column references are made by giving the name of the column in the formula. The column is in the same layer as the formula. As the formula is evaluated, the column reference evaluates to the value of the cell in that column in the current row. If that value is missing, then the entire formula evaluates to a missing value. Column references evaluate to strings that are legal for the particular formula category, i.e., numeric formulae reference numeric columns, Boolean formulae reference Boolean columns, and string columns reference any kind of column.

In the presently disclosed embodiment, function names are case insensitive and column names are case sensitive. If a column name has the same name as a function, then the column name takes precedence. Because column names are case sensitive, the two can be distinguished using capitalization different from the column name for the function name.

There are different categories of functions. Within each formula category, all functions evaluate to a legal value for that formula category. Specifically, regular functions perform operations appropriate for the particular formula category, and normally take arguments that are expressions of that category. Summary functions mimic the summary type behavior. They summarize values in a given column in the layer, which is typically named in the first argument of the function. Remaining arguments (if any) are optional column references, which are sort keys to group the rows to be summarized, ranging in the order of significance. Logical functions evaluate to the result of their last two arguments, each of which is an expression of the appropriate formula category, depending on the result of a logical test appropriate for the given function and whose inputs are given by the first one or two arguments. If the logical test evaluates to "true", then the first expression is used. If the logical test evaluates to "false", then the second expression is used.

The Calculate button on the Layer I/O window (see FIG. 42) causes layer data in the selected layer to be calculated, using column formulae and, optionally, data in related layers. There are several types of calculation operations, depending on whether the selected layer has subordinate layers in the layer tree. In all cases, the formulae in the selected layer are executed. The data exploration system 100 can calculate new units, as controlled by the layer hierarchy, summarization type, and column formulae.

The calculation types include the following:

Calculate formula—selected layer has no subordinate layers. Only the formulae in the selected layer are executed. No other layers are involved.

Summarization—selected point layer has a single subordinate point layer at the immediate next lower level. Calculate column values based on related columns from the immediate subordinate layer in layer tree. Columns are matched by having same column name. Summarization type and eligibility are controlled by column summarization parameters. Grouping is done by column in subordinate layer having the same name as Unit column in selected layer.

Join—the selected point layer has two subordinate point layers at the immediate next lower level. The columns of the two subordinate layers are combined (joined) into the selected layer (called the join layer). The join layer takes columns having the same name from either of two subordinate layers. If one of the subordinate layers includes units that are subordinate to units in the other subordinate layer, then the units of that layer (the child layer) are used as units in the join layer. Values for columns of the parent unit in the other layer (the parent layer) are repeated for each child layer unit in the join layer. If subordinate layers do not have parent-child unit relationships, then join layer will get a unit for each unit in the first subordinate layer.

Join connect—the same as join, except the selected layer is a connection layer (layer containing EndPoint columns). Units in the join layer (connections) are connection units connecting units in each of the subordinate layers. A connection is made between each child unit to its parent unit.

Connect units—the selected connection layer (the layer containing EndPoint columns) has a single subordinate point layer at the next lower level. Adjacent subordinate layer units in the given order and group are connected. Order and grouping are done by the first column in a subordinate layer having the same name as a column in the selected layer (the connect layer). If there is no such column, then all adjacent subordinate layer units are connected, in the order that they occur in the layer. Data columns are matched by having the same column name. The summarization type is used to control how the data fields are filled out.

Clicking the Start edit button on a view (map, table, or tree, see FIGS. 3-5) opens an edit window for that view and puts the view into edit mode. Edit mode allows units to be added and removed from layers currently being used by the view. In addition, edit mode on map views permits the editing of units directly on the map. Edit mode on tables permits data values in the table's cells to be changed. Closing the edit window, or clicking the edit button on the view again (now labeled End Edit), terminates the edit mode, returning the view to display mode.

Figure 45A:
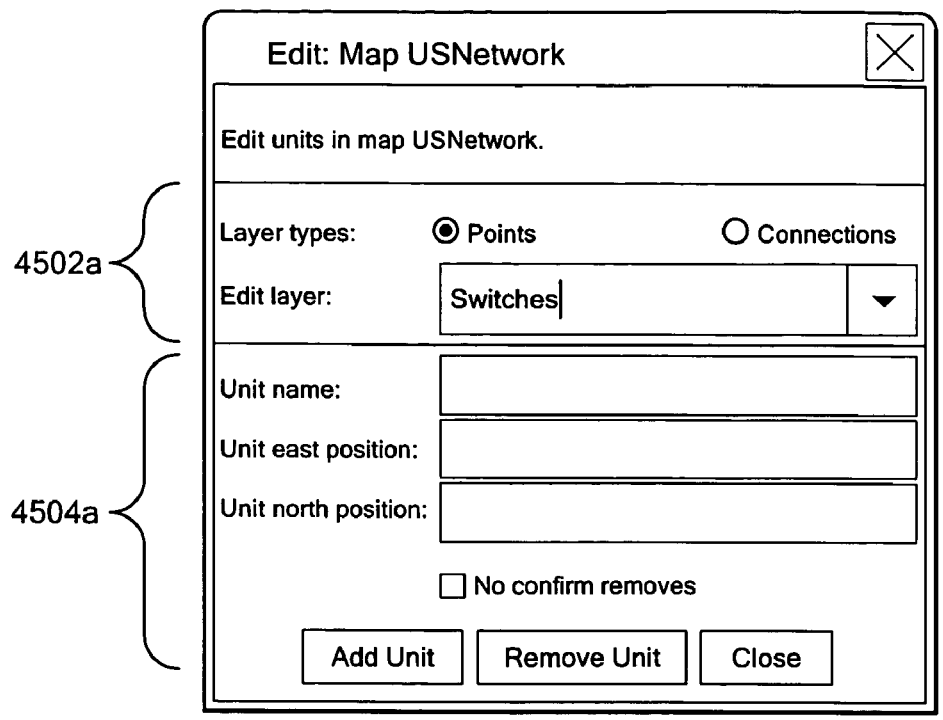
Figure 45B:
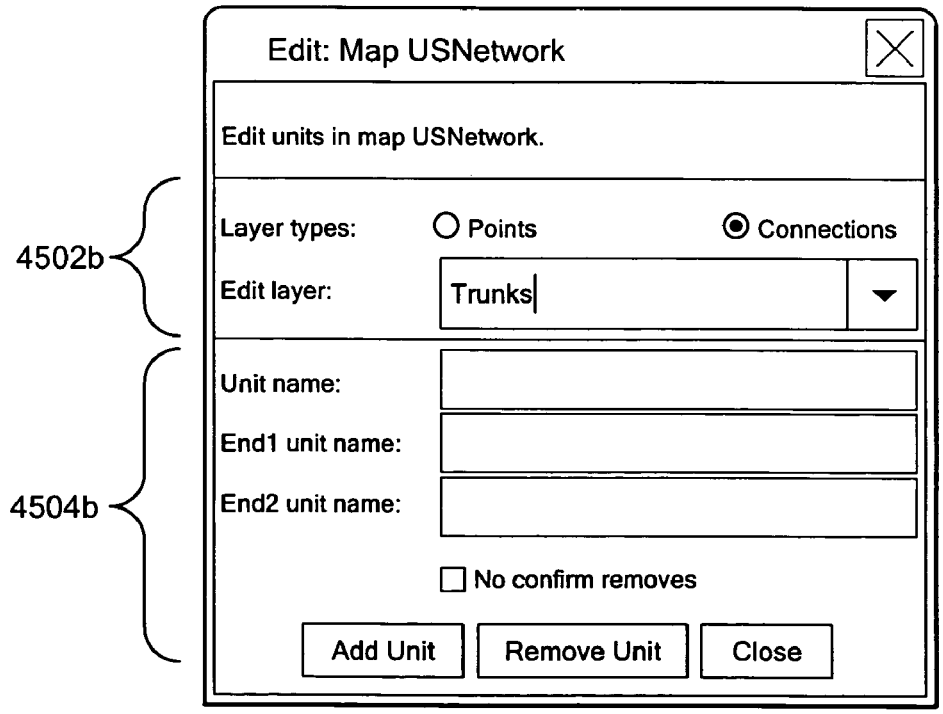

On any type of view in the edit window, layers may be selected for editing and units may be added and removed from them. FIGS. 45a-45b depict two illustrative examples of edit windows. FIG. 45a depicts the window appearance when point units are being edited, and FIG. 45b depicts the window appearance when connection units are being edited.

As shown in FIGS. 45a-45b, an edit window has two sections, a Layers section 4502a-4502b and a Units section 4504a-4504b. The Layers section controls which layer is currently being editing, including whether point layers or connection layers are being edited. This section is used both when editing units directly from the edit window and when "map editing". The Units section allows units to be added and removed to the selected layer directly from the edit window. Another way of adding and removing units by editing is by "map editing" using the mouse, as describe below.

The layers section 4502a-4502b of the edit window is used to select the type of layer to be edited and the specific layer itself. It includes the following fields and buttons:

Layer types radio buttons Points and Connections—these radio buttons control the type of layer being edited. They also control the kind of positioning information expected in the Units section when creating new units from the edit window itself. Comparing the two windows of FIGS. 45a and 45b, it can be observed that point units require map coordinates, and connection units require endpoint units. The Points and Connections radio buttons control the specific map editing menu picks and editing sequence.

Edit layer picklist—allows selecting of the specific layer on the view to be edited. This is called the edit layer.

When the Points radio button is selected, the available layers are the view's point layers. When the Connections radio button is selected, the available layers are connection layers. A layer is selected before units can be created or removed. A specific layer does not have to be selected to drag a unit to a new position on a map view, or to edit a data value on a table view.

The units section 4504a-4504b of the edit window is used to add and to remove units to/from the selected layer, using only the edit window itself. This can be done from any kind of view. It includes the following fields, checkbox, and buttons:

Unit name field—the user enters the unit name when adding a new unit, and the name of an existing unit in the selected layer when removing a unit.

Unit east position and Unit north position fields (Points only)—positioning information for new point units. The user enters new point units east and north map coordinates when adding a new point unit. Map coordinates in each dimension typically range from 0.0 to 10.0, as fractional parts of a map's base size.

End1 unit name and End2 unit name fields (Connections only)—positioning information for new connection units. When adding a new connection unit, the user enters names of existing point units to be used as the new connection's endpoints. These endpoint units do not have to be in the associated view.

No confirm removes checkbox—checking disables asking confirmation of each Remove Unit. Normally confirmation is requested when removing units, including when removing units directly from a map using map editing. Checking this box suppresses this confirmation and simply removes the unit.

Add Unit button—adds unit to the edit layer. The Unit name field and appropriate positioning fields are filled out. If all fields valid, then the unit is added to the edit layer and associated view.

Remove Unit button—removes unit named in the Unit name field from the edit layer. The Unit name field is filled out and the unit exists in the edit layer. Confirmation is requested unless the No confirm removes checkbox is checked.

As well as having the editing functionality available on all view types via the edit window, maps can be editing directly using the mouse. This is done when the map is in the edit mode, in association with the edit window. When in the edit mode, right clicking causes a popup menu to be displayed (the edit popup) that includes menu buttons that initiate editing operations. The choices depend on where the mouse is clicked (on a point or connection or neither) and the layer settings on the edit window. Adding or removing units requires that an edit layer be selected on the edit window.

The mouse driven map editing functionality includes the following:

Dragging—point unit positions can be changed by dragging their symbols to new locations. Several units can be dragged at the same time by selecting multiple units.

Adding point units—point units can be added to the map (and the point edit layer shown on the edit window) by invoking the Add point unit menu button on the edit popup when right clicking at the new units location. The current edit layer is a point layer. The user is asked for the new unit's name.

Adding connection units—connections can be added when the current edit layer is a connection layer. New connections are added by invoking the Add new connection menu button when right clicking on the point unit that will be the connection's first endpoint. The user is asked for the new unit's name. After the name has been entered, the second endpoint is selected by clicking on its point symbol (or by dragging to it from the first endpoint unit).

Removing units—units can be removed from a map by invoking the Remove point or Remove connection menu button when right clicking on the point symbol or the connection control point to be removed. The unit is in the edit layer. Confirmation is requested unless the No confirm removes checkbox is checked on the edit window.

It will be appreciated by those of ordinary skill in the art that further modifications to and variations of the above-described data exploration system may be made without departing from the inventive concepts disclosed herein. Accordingly, the invention should not be viewed as limited except as by the scope and spirit of the appended claims.

What is claimed is:

1. A data exploration and analysis system for facilitating a user's analysis and comprehension of information relationships within one or more groups of data units, comprising:
   at least one processor;
   at least one software program;
   at least one memory operative to store the software program and the one or more groups of data units;
   at least one input device; and
   at least one output device,
   wherein each of the at least one memory, the at least one input device, and the at least one output device is communicably coupled to the processor, and
   wherein the processor executes the software program out of the memory, and cooperates with the input device and the output device:
   to obtain the one or more groups of data units from at least one data source;
   to organize the respective groups of data units in a plurality of layers, and to arrange the respective layers in a hierarchy,
   wherein each of the plurality of layers has a corresponding vertical position in the hierarchy, the vertical positions of the respective layers defining an order of precedence of the layers in the hierarchy, and
   wherein at least one of the plurality of layers has a corresponding horizontal position in the hierarchy, the at least one layer having the corresponding horizontal position in the hierarchy being subordinate to at least one other layer in the order of precedence, the subordinate layer being referred to as a child layer, the other layer to which the child layer is subordinate being referred to as a parent layer;
   to output, in a map format via the output device, at least one visual output representation of the respective groups of data units organized in the parent and child layers, each data unit in the parent and child layers being representable by a first symbol in the map format;
   to output, in a layer tree format via the output device, a visual output representation of the respective parent and child layers, each of the parent and child layers being represented by a second symbol in the layer tree format, the respective second symbols representing the parent and child layers being arranged in the layer tree format based on the corresponding vertical and horizontal positions of the parent and child layers in the hierarchy; and
   in response to one or more user inputs provided by the input device, to select any one or more of the child layers represented by the respective second symbols in the layer tree format, and to manipulate the horizontal position of the second symbol representing each selected child layer in the layer tree format, thereby collapsing or expanding at least one of the first symbols in the map format representing at least one data unit in the selected child layer,
   whereby the collapsed or expanded first symbol representing the at least one data unit in the selected child layer is made hidden or visible, respectively, in the map format of the visual output representation of the respective groups of data units.

2. The system of claim 1 wherein the processor further executes the software program to output, in a second tree format via the output device, at least one visual output representation of the respective groups of data units organized in the parent and child layers, each data unit in the parent and child layers being representable by a third symbol in the second tree format.

3. The system of claim 2 wherein the processor further executes the software program, in response to one or more user inputs provided by the input device, to collapse at least one of the third symbols in the second tree format representing at least one data unit in the selected child layer by manipulating the horizontal position of the second symbol representing the selected child layer in the layer tree format.

4. The system of claim 1 wherein each first symbol has a corresponding position in the map format of the visual output representation, and wherein the processor further executes the software program for performing a linear transform operation on selected ones of the first symbol positions.

5. The system of claim 4 wherein the linear transform operation is performed on selected first symbol positions in the respective layers according to formulae expressible as EastTransform=(eastScale*eastPos)+eastOffset NorthTransform=(northScale*northPos)+northOffset, wherein "EastTransform", "eastScale", "eastPos", and "eastOffset" correspond to a horizontal axis of the map format, and "NorthTransform", "northScale", "northPos", and "northOffset" correspond to a vertical axis of the map format, wherein "eastScale" and "northScale" correspond to predetermined scale values along the horizontal and vertical axes, respectively, wherein "eastpos" and "northpos" correspond to original position coordinates of the selected first symbol position relative to the horizontal and vertical axes, respectively, wherein "eastOffset" and "northOffset" correspond to predetermined offset values along the horizontal and vertical axes, respectively, and wherein "EastTransform" and "NorthTransform" correspond to resulting position coordinates of the selected first symbol position as a result of the linear transform operation.

6. The system of claim 4 wherein the linear transform operation is performed on the position of each first symbol representing a data unit included in a respective group of data units.

7. The system of claim 1 wherein the processor further executes the software program for obtaining the one or more groups of data units from a data source selected from the group consisting of a delimited text spreadsheet file, and a database implementing a Java database connectivity (JDBC) interface.

8. The system of claim 1 wherein each group of data units includes a first plurality of data units, and wherein the processor further executes the software program for calculating a second plurality of data units using a predetermined formula based on at least a portion of the first plurality of data units included in a respective data group.

9. The system of claim 1 wherein the processor further executes the software program out of the memory, and cooperates with the input device:

in response to one or more user inputs provided by the input device, to modify the order of precedence of the layers by manipulating the vertical position of at least one of the second symbols representing the parent and child layers in the layer tree format.

10. The system of claim 1 wherein the processor further executes the software program out of the memory, and cooperates with the input device:

in response to one or more user inputs provided by the input device, to undo the collapsing of the least one of the first symbols in the map format representing at least one data unit in the selected child layer by further manipulation of the horizontal position of the second symbol representing the selected child layer in the layer tree format.

11. A method of facilitating a user's analysis and comprehension of information relationships within one or more groups of data units, for use in a data exploration and analysis system including at least one processor, at least one software program, at least one memory for storing the software program and the one or more groups of data units, at least one input device, and at least one output device, each of the at least one memory, the at least one input device, and the at least one output device being communicably coupled to the processor, the method comprising the steps of:

executing the software program, by the processor, to obtain the one or more groups of data units from at least one data source, and to store the one or more groups of data units in the memory;

executing the software program, by the processor, to organize the respective groups of data units in a plurality of layers, and to arrange the respective layers in a hierarchy, wherein each of the plurality of layers has a corresponding vertical position in the hierarchy, the vertical positions of the respective layers defining an order of precedence of the layers in the hierarchy, wherein at least one of the plurality of layers has a corresponding horizontal position in the hierarchy, the at least one layer having the corresponding horizontal position in the hierarchy being subordinate to at least one other layer in the order of precedence, the subordinate layer being referred to as a child layer, the other layer to which the child layer is subordinate being referred to as a parent layer;

executing the software program, by the processor, to output, in a map format via the output device, at least one visual output representation of the respective groups of data units organized in the parent and child layers, each data unit in the parent and child layers being representable by a first symbol in the map format;

executing the software program, by the processor, to output, in a layer tree format via the output device, a visual output representation of the respective parent and child layers, each of the parent and child layers being represented by a second symbol in the layer tree format, the respective second symbols representing the parent and child layers being arranged in the layer tree format based on the corresponding vertical and horizontal positions of the parent and child layers in the hierarchy; and in response to one or more user inputs provided by the input device, executing the software program, by the processor, to select any one or more of the child layers represented by the respective second symbols in the layer tree format, and to manipulate the horizontal position of the second symbol representing each selected child layer in the layer tree format, thereby collapsing or expanding at least one of the first symbols in the map format representing at least one data unit in the selected child layer, whereby the collapsed or expanded first symbol representing the at least one data unit in the selected child layer is made hidden or visible, respectively, in the map format of the visual output representation of the respective groups data units.

12. The method of claim 11 further including executing the software program, by the processor, to output, in a second tree format via the output device, at least one visual output representation of the respective groups of data units organized in the parent and child layers, each data unit in the parent and child layers being representable by a third symbol in the second tree format.

13. The method of claim 12 further including executing the software program, by the processor, in response to one or more user inputs provided by the input device, to collapse at least one of the third symbols in the second tree format representing at least one data unit in the selected child layer by manipulating the horizontal position of the second symbol representing the selected child layer in the layer tree format.

14. The method of claim 11 wherein each first symbol has a corresponding position in the map format of the visual output representation, and further including executing the software program, by the processor, for performing a linear transform operation on selected ones of the first symbol positions.

15. The method of claim 14 wherein the linear transform operation is performed on selected first symbol positions in the respective layers according to formulae expressible as EastTransform=(eastScale*eastPos)+eastOffset NorthTransform=(northScale*northPos)+northOffset, wherein "EastTransform", "eastScale", "eastPos", and "eastOffset" correspond to a horizontal axis of the map format, and "NorthTransform", "northScale", "northPos", and "northOffset" correspond to a vertical axis of the map format, wherein "eastScale" and "northScale" correspond to predetermined scale values along the horizontal and vertical axes, respectively, wherein "eastpos" and "northpos" correspond to original position coordinates of the selected first symbol position relative to the horizontal and vertical axes, respectively, wherein "eastOffset" and "northOffset" correspond to predetermined offset values along the horizontal and vertical axes, respectively, and wherein "EastTransform" and "NorthTransform" correspond to resulting position coordinates of the selected first symbol position as a result of the linear transform operation.

16. The method of claim 14 wherein the linear transform operation is performed on the position of each first symbol representing a data unit included in a respective data group of data units.

17. The method of claim 11 further including executing the software program, by the processor, for obtaining the one or more groups of data units from a data source selected from the group consisting of a delimited text spreadsheet file, and a database implementing a Java database connectivity (JDBC) interface.

18. The method of claim 11 wherein each group of data units includes a first plurality of data units, and further including executing the software program, by the processor, for calculating a second plurality of data units using a predetermined formula based on at least a portion of the first plurality of data units included in a respective data group.

19. The method of claim 11 further including executing the software program, by the processor, in response to one or more user inputs provided by the input device, to modify the order of precedence of the layers by manipulating the vertical position of at least one of the second symbols representing the parent and child layers in the layer tree format.

20. The method of claim 11 further including executing the software program, by the processor, in response to one or more user inputs provided by the input device, to undo the collapsing of the least one of the first symbols in the map format representing at least one data unit in the selected child layer by further manipulation of the horizontal position of the second symbol representing the selected child layer in the layer tree format.

* * * * *

UNITED STATES PATENT AND TRADEMARK OFFICE
CERTIFICATE OF CORRECTION

PATENT NO. : 7,587,685 B2
APPLICATION NO. : 11/059432
DATED : September 8, 2009
INVENTOR(S) : James H. Wallace It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1210 days.

Signed and Sealed this

Twenty-first Day of September, 2010

David J. Kappos
*Director of the United States Patent and Trademark Office*

UNITED STATES PATENT AND TRADEMARK OFFICE
CERTIFICATE OF CORRECTION

PATENT NO. : 7,587,685 B2  Page 1 of 1
APPLICATION NO. : 11/059432
DATED : September 8, 2009
INVENTOR(S) : James H. Wallace It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1210 days.

Column 13, line 66, "U.S. Network" should read --USNetwork--;

Column 14, line 36, "U.S. Network" should read --USNetwork--;

Column 25, line 46, "the-views" should read --the views--;

Column 33, line 54, "position'information" should read --position information-- ;

Column 39, claim 5, line 38, ""eastpos" and "northpos"" should read --"eastPos" and "northPos"--; and Column 42 claim 15, line 1, ""eastpos" and "northpos"" should read --"eastPos" and "northPos"--.

Signed and Sealed this

Sixteenth Day of November, 2010

David J. Kappos
*Director of the United States Patent and Trademark Office*